US008615582B2

(12) United States Patent
McClure et al.

(10) Patent No.: US 8,615,582 B2
(45) Date of Patent: Dec. 24, 2013

(54) SYSTEM AND METHOD FOR NETWORK VULNERABILITY DETECTION AND REPORTING

(75) Inventors: Stuart C. McClure, Ladera Ranch, CA (US); George Kurtz, Coto de Caza, CA (US); Robin Keir, Mission Viejo, CA (US); Marshall A. Beddoe, San Clemente, CA (US); Michael J. Morton, Anaheim Hills, CA (US); Christopher M. Prosise, Mission Viejo, CA (US); David M. Cole, Huntington Beach, CA (US); Christopher Abad, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/397,514

(22) Filed: Feb. 15, 2012

(65) Prior Publication Data
US 2012/0151594 A1    Jun. 14, 2012

Related U.S. Application Data

(60) Continuation of application No. 12/476,082, filed on Jun. 1, 2009, now Pat. No. 8,135,830, which is a division of application No. 11/521,113, filed on Sep. 14, 2006, now Pat. No. 7,543,056, which is a division of application No. 10/050,575, filed on Jan. 15, 2002, now Pat. No. 7,152,105.

(60) Provisional application No. 60/349,193, filed on Jan. 15, 2002.

(51) Int. Cl.
*G06F 15/173* (2006.01)

(52) U.S. Cl.
USPC .............................. 709/224; 709/200; 726/23

(58) Field of Classification Search
USPC ............................. 709/224, 200; 726/23, 25
See application file for complete search history.

(56) References Cited

U.S. PATENT DOCUMENTS

| 4,954,941 A | 9/1990 | Redman |
| 4,999,806 A | 3/1991 | Chernow et al. |

(Continued)

FOREIGN PATENT DOCUMENTS

| EP | 477039 | 3/1992 |
| EP | 1143665 | 10/2001 |

(Continued)

OTHER PUBLICATIONS

"Active Watch: Hosted Web Performance Monitoring Service"; copyright date 2000. (Cited in U.S. Appl. No. 10/335,490).

(Continued)

*Primary Examiner* — El Hadji Sall
(74) *Attorney, Agent, or Firm* — Patent Capital Group

(57) ABSTRACT

A system and method provide comprehensive and highly automated testing of vulnerabilities to intrusion on a target network, including identification of operating system, identification of target network topology and target computers, identification of open target ports, assessment of vulnerabilities on target ports, active assessment of vulnerabilities based on information acquired from target computers, quantitative assessment of target network security and vulnerability, and hierarchical graphical representation of the target network, target computers, and vulnerabilities in a test report. The system and method employ minimally obtrusive techniques to avoid interference with or damage to the target network during or after testing.

19 Claims, 27 Drawing Sheets

(56) References Cited

U.S. PATENT DOCUMENTS

| | | |
|---|---|---|
| 5,175,732 A | 12/1992 | Hendel et al. |
| 5,237,614 A | 8/1993 | Weiss |
| 5,581,764 A | 12/1996 | Fitzgerald et al. |
| 5,649,187 A | 7/1997 | Hornbuckle |
| 5,699,275 A | 12/1997 | Beasley et al. |
| 5,742,829 A | 4/1998 | Davis et al. |
| 5,764,913 A | 6/1998 | Jancke et al. |
| 5,771,347 A | 6/1998 | Grantz et al. |
| 5,781,534 A | 7/1998 | Perlman et al. |
| 5,799,002 A | 8/1998 | Krishnan |
| 5,805,897 A | 9/1998 | Glowny |
| 5,809,329 A | 9/1998 | Lichtman et al. |
| 5,852,812 A | 12/1998 | Reeder |
| 5,854,794 A | 12/1998 | Pawlowski |
| 5,860,012 A | 1/1999 | Luu |
| 5,875,186 A | 2/1999 | Belanger et al. |
| 5,881,236 A | 3/1999 | Dickey |
| 5,892,903 A | 4/1999 | Klaus |
| 5,919,247 A | 7/1999 | Van Hoff et al. |
| 5,931,946 A | 8/1999 | Terada et al. |
| 5,933,646 A | 8/1999 | Hendrickson et al. |
| 5,933,826 A | 8/1999 | Ferguson |
| 5,968,176 A | 10/1999 | Nessett et al. |
| 5,974,454 A | 10/1999 | Apfel et al. |
| 5,987,610 A | 11/1999 | Franczek et al. |
| 5,987,611 A | 11/1999 | Freund |
| 5,991,802 A | 11/1999 | Allard et al. |
| 6,016,499 A | 1/2000 | Ferguson |
| 6,029,247 A | 2/2000 | Ferguson |
| 6,052,710 A | 4/2000 | Saliba et al. |
| 6,061,740 A | 5/2000 | Ferguson et al. |
| 6,073,142 A | 6/2000 | Geiger et al. |
| 6,073,214 A | 6/2000 | Fawcett |
| 6,078,945 A | 6/2000 | Hinsley |
| 6,094,679 A | 7/2000 | Teng et al. |
| 6,108,649 A | 8/2000 | Young et al. |
| 6,115,743 A | 9/2000 | Cowan et al. |
| 6,138,157 A | 10/2000 | Welter et al. |
| 6,151,643 A | 11/2000 | Cheng et al. |
| 6,151,708 A | 11/2000 | Pedrizetti et al. |
| 6,157,618 A | 12/2000 | Boss et al. |
| 6,185,689 B1 | 2/2001 | Todd et al. |
| 6,202,207 B1 | 3/2001 | Donohue |
| 6,205,552 B1 | 3/2001 | Fudge |
| 6,219,675 B1 | 4/2001 | Pal et al. |
| 6,229,540 B1 | 5/2001 | Tonelli et al. |
| 6,243,766 B1 | 6/2001 | Sliger et al. |
| 6,256,668 B1 | 7/2001 | Slivka et al. |
| 6,263,362 B1 | 7/2001 | Donoho et al. |
| 6,266,774 B1 | 7/2001 | Sampath et al. |
| 6,269,456 B1 | 7/2001 | Hodges et al. |
| 6,272,677 B1 | 8/2001 | Lam et al. |
| 6,279,113 B1 | 8/2001 | Vaidya |
| 6,279,156 B1 | 8/2001 | Amberg et al. |
| 6,281,790 B1 | 8/2001 | Kimmel et al. |
| 6,282,175 B1 | 8/2001 | Steele et al. |
| 6,282,546 B1 | 8/2001 | Gleichauf et al. |
| 6,282,709 B1 | 8/2001 | Reha et al. |
| 6,282,712 B1 | 8/2001 | Davis et al. |
| 6,298,445 B1 | 10/2001 | Shostack et al. |
| 6,301,668 B1 | 10/2001 | Gleichauf et al. |
| 6,307,841 B1 | 10/2001 | Rowles et al. |
| 6,311,278 B1 | 10/2001 | Raanan et al. |
| 6,321,337 B1 | 11/2001 | Reshef et al. |
| 6,324,656 B1 | 11/2001 | Gleichauf et al. |
| 6,334,190 B1 | 12/2001 | Silverbrook et al. |
| 6,347,375 B1 | 2/2002 | Reinert et al. |
| 6,356,941 B1 | 3/2002 | Cohen |
| 6,380,851 B1 | 4/2002 | Gilbert et al. |
| 6,408,391 B1 | 6/2002 | Huff et al. |
| 6,415,321 B1 | 7/2002 | Gleichauf et al. |
| 6,425,006 B1 | 7/2002 | Chari et al. |
| 6,460,050 B1 | 10/2002 | Pace et al. |
| 6,487,666 B1 | 11/2002 | Shanklin et al. |
| 6,493,871 B1 | 12/2002 | McGuire et al. |
| 6,546,493 B1 | 4/2003 | Magdych et al. |
| 6,574,737 B1 | 6/2003 | Kingsford et al. |
| 6,584,569 B2 | 6/2003 | Reshef et al. |
| 6,684,253 B1 | 1/2004 | Whitaker et al. |
| 6,704,874 B1 | 3/2004 | Porras et al. |
| 6,718,359 B2 | 4/2004 | Zisapel et al. |
| 6,721,713 B1 | 4/2004 | Guheen et al. |
| 6,725,046 B2 | 4/2004 | Park |
| 6,735,701 B1 | 5/2004 | Jacobson |
| 6,751,661 B1 | 6/2004 | Geddes |
| 6,754,895 B1 | 6/2004 | Bartel et al. |
| 6,766,458 B1 | 7/2004 | Harris et al. |
| 6,785,821 B1 | 8/2004 | Teal |
| 6,789,202 B1 | 9/2004 | Ko et al. |
| 6,859,793 B1 | 2/2005 | Lambiase |
| 6,862,286 B1 | 3/2005 | Tames et al. |
| 6,862,581 B1 | 3/2005 | Lambiase |
| 6,920,558 B2 | 7/2005 | Sames et al. |
| 6,947,398 B1 | 9/2005 | Ahmed et al. |
| 6,957,348 B1 | 10/2005 | Flowers et al. |
| 6,976,068 B2 | 12/2005 | Kadam et al. |
| 6,988,208 B2 | 1/2006 | Hrabik et al. |
| 6,990,660 B2 | 1/2006 | Moshir et al. |
| 7,000,247 B2 | 2/2006 | Banzhof |
| 7,003,561 B1 | 2/2006 | Magdych et al. |
| 7,024,548 B1 | 4/2006 | O'Toole |
| 7,058,968 B2 | 6/2006 | Rowland et al. |
| 7,069,581 B2 | 6/2006 | Fu et al. |
| 7,073,198 B1 * | 7/2006 | Flowers et al. .................. 726/25 |
| 7,089,589 B2 | 8/2006 | Chefalas et al. |
| 7,096,498 B2 | 8/2006 | Judge |
| 7,096,502 B1 | 8/2006 | Fox et al. |
| 7,096,503 B1 | 8/2006 | Magdych et al. |
| 7,124,181 B1 | 10/2006 | Magdych et al. |
| 7,146,642 B1 | 12/2006 | Magdych et al. |
| 7,152,105 B2 | 12/2006 | McClure et al. |
| 7,178,166 B1 | 2/2007 | Taylor et al. |
| 7,243,148 B2 | 7/2007 | Keir et al. |
| 7,257,630 B2 | 8/2007 | Cole et al. |
| 7,260,844 B1 | 8/2007 | Tidwell |
| 7,290,275 B2 | 10/2007 | Baudoin et al. |
| 7,308,712 B2 | 12/2007 | Banzhof |
| 7,315,801 B1 * | 1/2008 | Dowd et al. ..................... 703/13 |
| 7,346,922 B2 | 3/2008 | Miliefsky |
| 7,346,929 B1 | 3/2008 | Hammond |
| 7,506,155 B1 | 3/2009 | Stewart et al. |
| 7,536,456 B2 | 5/2009 | Williams et al. |
| 7,543,056 B2 | 6/2009 | McClure et al. |
| 7,574,740 B1 | 8/2009 | Kennis |
| 7,624,422 B2 | 11/2009 | Williams et al. |
| 7,624,442 B2 | 11/2009 | Dellow et al. |
| 7,627,891 B2 | 12/2009 | Williams et al. |
| 7,664,845 B2 | 2/2010 | Kurtz et al. |
| 7,673,043 B2 | 3/2010 | Keir et al. |
| 7,680,880 B2 | 3/2010 | Landfield |
| 7,823,147 B2 | 10/2010 | Moshir et al. |
| 8,091,117 B2 | 1/2012 | Williams et al. |
| 8,135,823 B2 | 3/2012 | Cole et al. |
| 8,135,830 B2 | 3/2012 | McClure et al. |
| 8,201,257 B1 | 6/2012 | Andres et al. |
| 2001/0014150 A1 | 8/2001 | Beebe et al. |
| 2001/0020254 A1 | 9/2001 | Blumenau et al. |
| 2001/0034846 A1 | 10/2001 | Beery |
| 2001/0034847 A1 | 10/2001 | Gaul, Jr. |
| 2001/0049793 A1 | 12/2001 | Sugimoto |
| 2002/0005092 A1 | 1/2002 | Collins et al. |
| 2002/0010679 A1 | 1/2002 | Felsher |
| 2002/0010855 A1 | 1/2002 | Reshef et al. |
| 2002/0019945 A1 | 2/2002 | Houston et al. |
| 2002/0026591 A1 | 2/2002 | Hartley et al. |
| 2002/0035542 A1 | 3/2002 | Tumey et al. |
| 2002/0053020 A1 | 5/2002 | Teijido et al. |
| 2002/0061001 A1 | 5/2002 | Garcia-Luna-Aceves et al. |
| 2002/0068559 A1 | 6/2002 | Sharma et al. |
| 2002/0082778 A1 | 6/2002 | Barnett et al. |
| 2002/0083337 A1 | 6/2002 | Welcher et al. |
| 2002/0087882 A1 | 7/2002 | Schneier et al. |
| 2002/0100036 A1 | 7/2002 | Moshir et al. |
| 2002/0103658 A1 | 8/2002 | Angal et al. |

(56) References Cited

U.S. PATENT DOCUMENTS

| | | |
|---|---|---|
| 2002/0104014 A1 | 8/2002 | Zobel et al. |
| 2002/0116639 A1 | 8/2002 | Chefalas et al. |
| 2002/0138271 A1 | 9/2002 | Shaw |
| 2002/0147803 A1 | 10/2002 | Dodd et al. |
| 2002/0178382 A1 | 11/2002 | Mukai et al. |
| 2002/0178383 A1 | 11/2002 | Hrabick et al. |
| 2002/0184533 A1 | 12/2002 | Fox et al. |
| 2002/0188481 A1 | 12/2002 | Berg et al. |
| 2003/0014664 A1 | 1/2003 | Hentunen |
| 2003/0028803 A1 | 2/2003 | Bunker et al. |
| 2003/0046128 A1 | 3/2003 | Heinrich |
| 2003/0056113 A1 | 3/2003 | Korosec |
| 2003/0056116 A1 | 3/2003 | Bunker, V et al. |
| 2003/0061506 A1 | 3/2003 | Cooper et al. |
| 2003/0065942 A1 | 4/2003 | Lineman et al. |
| 2003/0101353 A1 | 5/2003 | Tarquini et al. |
| 2003/0120935 A1 | 6/2003 | Teal et al. |
| 2003/0126472 A1 | 7/2003 | Banzhof |
| 2003/0135749 A1 | 7/2003 | Gales et al. |
| 2003/0140250 A1 | 7/2003 | Taninaka et al. |
| 2003/0154269 A1 | 8/2003 | Nyanchama et al. |
| 2003/0163728 A1 | 8/2003 | Shaw |
| 2003/0172145 A1 | 9/2003 | Nguyen |
| 2003/0188189 A1 | 10/2003 | Desai et al. |
| 2003/0195861 A1 | 10/2003 | McClure et al. |
| 2003/0196097 A1 | 10/2003 | Korosec et al. |
| 2003/0196123 A1 | 10/2003 | Rowland et al. |
| 2003/0200357 A1 | 10/2003 | Yanosy |
| 2003/0204632 A1 | 10/2003 | Willebeek-LeMair et al. |
| 2003/0208606 A1 | 11/2003 | Maguire et al. |
| 2003/0212779 A1 | 11/2003 | Boyter et al. |
| 2003/0212909 A1 | 11/2003 | Chandrashekhar et al. |
| 2003/0217039 A1 | 11/2003 | Kurtz et al. |
| 2003/0220940 A1 | 11/2003 | Futoransky et al. |
| 2003/0233438 A1 | 12/2003 | Hutchinson |
| 2004/0003266 A1 | 1/2004 | Moshir et al. |
| 2004/0010709 A1 | 1/2004 | Baudion et al. |
| 2004/0015728 A1 | 1/2004 | Cole et al. |
| 2004/0019803 A1 | 1/2004 | Jahn |
| 2004/0042470 A1 | 3/2004 | Cooper et al. |
| 2004/0064731 A1 | 4/2004 | Nguyen et al. |
| 2004/0073810 A1 | 4/2004 | Dettinger et al. |
| 2004/0078384 A1 | 4/2004 | Keir et al. |
| 2004/0098621 A1 | 5/2004 | Raymond |
| 2004/0098623 A1 | 5/2004 | Scheidell |
| 2004/0103309 A1 | 5/2004 | Tracy et al. |
| 2004/0111643 A1 | 6/2004 | Farmer |
| 2004/0117478 A1 | 6/2004 | Triulzi et al. |
| 2004/0123145 A1 | 6/2004 | Baffes et al. |
| 2004/0143753 A1 | 7/2004 | Hernacki et al. |
| 2004/0170153 A1 | 9/2004 | Stewart et al. |
| 2004/0187032 A1 | 9/2004 | Gels et al. |
| 2004/0221178 A1 | 11/2004 | Aaron et al. |
| 2004/0225524 A1 | 11/2004 | Narasimhan et al. |
| 2004/0250116 A1 | 12/2004 | Strickland et al. |
| 2005/0002379 A1 | 1/2005 | Bye |
| 2005/0008001 A1 | 1/2005 | Williams et al. |
| 2005/0010821 A1 | 1/2005 | Cooper et al. |
| 2005/0015622 A1 | 1/2005 | Williams et al. |
| 2005/0015623 A1 | 1/2005 | Williams et al. |
| 2005/0022012 A1 | 1/2005 | Bluestone et al. |
| 2005/0022028 A1 | 1/2005 | Hall |
| 2005/0037733 A1 | 2/2005 | Coleman et al. |
| 2005/0044037 A1 | 2/2005 | Lawrence et al. |
| 2005/0044389 A1 | 2/2005 | Oliphant |
| 2005/0091542 A1 | 4/2005 | Banzhof |
| 2005/0111466 A1 | 5/2005 | Kappes et al. |
| 2005/0114649 A1 | 5/2005 | Challener et al. |
| 2005/0125685 A1 | 6/2005 | Samuelson et al. |
| 2005/0138433 A1 | 6/2005 | Linetsky |
| 2005/0188419 A1 | 8/2005 | Dadhia et al. |
| 2005/0201297 A1 | 9/2005 | Peikari |
| 2005/0216957 A1 | 9/2005 | Banzhof et al. |
| 2005/0257267 A1 | 11/2005 | Williams et al. |
| 2006/0080653 A1 | 4/2006 | Siwatu et al. |
| 2006/0101517 A1 | 5/2006 | Banzhof et al. |
| 2006/0136327 A1 | 6/2006 | You |
| 2006/0191012 A1 | 8/2006 | Banzhof et al. |
| 2006/0206757 A1 | 9/2006 | Russell et al. |
| 2006/0282388 A1 | 12/2006 | Solomon et al. |
| 2007/0011319 A1 | 1/2007 | McClure et al. |
| 2007/0016955 A1 | 1/2007 | Goldberg et al. |
| 2007/0162973 A1 | 7/2007 | Schneier et al. |
| 2007/0250595 A1 | 10/2007 | Landfield |
| 2007/0283007 A1 | 12/2007 | Keir et al. |
| 2007/0283441 A1 | 12/2007 | Cole et al. |
| 2009/0259748 A1 | 10/2009 | McCure et al. |
| 2011/0029966 A1 | 2/2011 | Moshir et al. |
| 2012/0079106 A1 | 3/2012 | Williams et al. |
| 2012/0079107 A1 | 3/2012 | Williams et al. |
| 2012/0144476 A1 | 6/2012 | McClure et al. |
| 2012/0144493 A1 | 6/2012 | Cole et al. |
| 2012/0144494 A1 | 6/2012 | Cole et al. |
| 2012/0151595 A1 | 6/2012 | McClure et al. |
| 2012/0151596 A1 | 6/2012 | McClure et al. |
| 2012/0185945 A1 | 7/2012 | Andres et al. |

FOREIGN PATENT DOCUMENTS

| | | |
|---|---|---|
| WO | WO 99/67931 | 12/1999 |
| WO | WO 01/65330 | 9/2001 |
| WO | WO 03/058457 | 7/2003 |
| WO | WO 03/060717 | 7/2003 |
| WO | WO 2005/094490 | 10/2005 |
| WO | WO 2006/049841 | 5/2006 |
| WO | WO 2006/091425 | 8/2006 |

OTHER PUBLICATIONS

"Ahead of the Service Pack"; from www.networkcomputing.co.uk website via link in "UpdateEXPERT: Product Reviews & Testimonials"; Nov. 2000.

"ASPs: Leasing software"; copyright date 2000-2001. (Cited in U.S. Appl. No. 10/335,490).

"Benefits of Software Leasing"; Dec. 15, 1998.

Craig Smith and Peter Grundl, Know Your Enemy: Passive Fingerprinting, Sep. 3, 2001*, available at <http://www.project.honeynet.org/papers/finger/>.

Fyodor, "Remote OS detection via TCP/IP Stack FingerPrinting," Oct. 18, 1998, retrieved from http://nmap.org/nmap-fingerprinting-article.txt on Feb. 25, 2011.

Fyodor, The Art of Port Scanning, Phrack Magazine, vol. 7, Issue 51, Sep. 1, 1997*, available at <http://www.insecure.org/nmap/p51-11.txt>.

"Host Vulnerability Summary Report", archived Sep. 17, 2000 in Web.archive.org., web.archive.org/web/20000917072216/document.iss.net/literature/InternetScanner/reports/Technician.sub.--Host.sub.--Vulnerability.sub.--Summary.sub.- --Report.pdf.

"Internet Security Systems Internet Scanner", archived Jun. 6, 2001 in Web.archive.org., web.archive.org/web/2001060422406/documents.iss.net/literature/InternetSc- anner/is.sub.--ps.pdf. (Cited in U.S. Appl. No. 11/009,782).

ISS SAFEsuite products: Internet Scanner, archived Aug. 20, 2000 in Web.archive.org., web.archive.org/web/20000820203428/www.iss.net/securing.sub.--e-business/- security.sub.--pr . . . .

"Leasing Software"; no later than Feb. 27, 2001.

Magic Solutions®, The Leader in Service Management, © 2003, 8 pages.

Magic Total Service Desk, brochure dated Apr. 2001, 2 pages.

Beddoe et al., "The Siphon Project: An Implementation of Stealth Target Acquisition & Information Gathering Methodologies", Blackhat USA Conference 2001, presented Jul. 11, 2001*, available at <http://www.blackhat.com/html/bh-usa-01/bh-usa-01-speakers.html>.

"Microsoft Security Glossary", www.microsoft.com/security/glossary.mspx, published Oct. 29, 2002, updated Dec. 19, 2005.

"Network Vulnerability Assessment Report", archived Sep. 17, 2000 in Web.archive.org., web.archive.org/web/20000917072109/documents.iss.net/literature/InternetScanner/reports/Line.sub.--Mgmt.sub.--Vulnerability.sub.--Assessment.sub.--- Report.pdf.

(56) References Cited

OTHER PUBLICATIONS

"Newly Released PatchLink Update 4.0 . . . ", from biz.yahoo.com; Oct. 14, 2002.
"Novell ZENworks Grows Up", Feb. 7, 2000.
"Q. What is Qchain.exe?", from www.ntfaq.com; Jul. 23, 2001.
"Ready for Windows 2000 Service Pack 1? St. Bernards Software's SPQuery 4.0 is Here Just in Time," Business Wire, Aug. 2, 2000, www.findarticles.com/p/articles/mi_0EIN/is_August_2/ai_63819686/print.
"Review Spquery", in Network Computing, Nov. 2000, www.networkcomputer.co.uk/back.sub.--iss/prod.sub.--update/reviews/spquer- y4.1,htm.
"SPQuery v4.1"; from www.networkcomputing.co.uk web site via link in "UpdateEXPERT: Product Reviews & Testimonials"; Nov. 2000.
Spitzner, L., "Passive Fingerprinting Symantec Connect", May 2, 2002, retrieved from www.securityfocus.com/infocus/1224 on Feb. 25, 2011.
"Systems Management Server Product Overview, Features", from www.Microsoft.com; Jan. 29, 2002, Feb. 8, 1999.
"The Open Software Description Format (OSD)"; Aug. 11, 1997.
"To Setup Secure PC Network", archives Aug. 16, 2000 in Web.archive.org., web.archive.org/web/20000816192628/www.citadel.com/downloads/SPC+readme.t- xt.
"UpdateEXPERT: Product Reviews & Testimonials" from www.stbernard.com web site; various-dates are listed.
Burnback, "Patching up bad patches", from www.zdnet.com; Nov. 22, 2002.
CERT™ Advisories, "CERT/CC Advisories 1988-2000," http://web.archive.org/web/20000815055129/http://www.cert.org/advisories/-, 2000, 34 pages.
Computer Associates ManageIT news release; May 8, 2000.
Coopee, "Building a strong foundation"; Network World Fusion, Jan. 31, 2000.
Fonseca, B., "Web performance tools get upgrade"; Aug. 29, 2000.
Welter, Peter, "Web Server Monitoring White Paper," Freshwater Software, Inc. news release; Jan. 18, 1998.
Gravitix The Patch Finder, archived Aug. 15, 2000, in Web Archive.org., web.archive.org/web/2000815094824/www.patchlink.com/proudcts/gravitix.asp-.
HFNetChk, pp. 1-21; copyright date 2001.
InfraDesk.TM. page; Dec. 21, 2000.
Kearns, D., "Patch tracking"; Jun. 27, 2001.
Manzuik, Steve, "Ultimate Security Toolkit", in NTSecurity, May 16, 2000, web.archive.org/web/2001160751/www.ntsecurity.net/Articles/Index.cfm?ArticleId=92902&SearchString=cyber.
Marimba Castanet; copyright 2000.
Moshir, "Non-invasive Automatic Offsite Updating System and Method" U.S. Appl. No. 60/234,680, filed Sep. 22, 2000.
Mueller, "PatchLink Helps Keep Windows Closed", from www.networkcomputing.com; Sep. 2, 2002.
NetworkDeltaWeb$^{SM}$ page; copyright date 2000. (Cited in U.S. Appl. No. 10/335,490).
Pages numbered as 1-27, from www.bigfix.com; no later than Nov. 25, 2002. (Cited in U.S. APpl. No. 10/335,490).
PatchLink Menu: Gravitix Overview; copyright date 2001. (Cited in U.S. Appl. No. 10/335,490).
PatchLink Press Release; Jun. 18, 2001. (Cited in U.S. Appl. No. 10/335,490).
PatchLink Press Release; Mar. 27, 2000. (Cited in U.S. Appl. No. 10/335,490).
PatchLink™ Update 4.0 White Paper: Cross-platform Security Patch Management; copyright date 2002.
Proctor; no later than Jan. 8, 2001. (Cited in U.S. Appl. No. 10/335,490).
"Remedy Customer Relationship Solutions™," May 1999, 46 sheets (two pages per sheet).
Robinson, C., "PatchLink.com Brings Remote Management Online"; Dec. 4, 2000.
SafePatch Description, pp. 1-3; Oct. 2000. (Cited in U.S. Appl. No. 10/335,490).
SafePatch; Oct. 2000.
Shipley, G., "Tools From the Underground"; May 29, 2000.
sourceforge.net pp. 1-2; copyright date 1999, 2000, 2001.
SPQuery Users Manual, 1st quarter 2001.
St. Bernard, St. Bernard Software Simplifies NT Service Pack Management with SPQuery, Apr. 29, 2000 Business Wire.
Stephen Swoyer, Hotfix Management Tools Maturing, Nov. 19, 2001, ENT News.
Sturdevant, C., "ZENWorks Cuts Legwork in NetWare Shops"; Mar. 13, 2000. (Cited in U.S. Appl. No. 10/335,490).
Systems Management Server; Executive Overview, date unknown. (Cited in U.S. Appl. No. 10/335,490).
Technical Comparison of Systems Management Server 2.0 and Novell's ZENworks 2.0; copyright date 2000.
Timbale—Marimba introduces new version of Timbale Software, pp. 1-2; Dec. 21, 2000.
Topaz, The Intelligent Choice for Access Control, GEInterlogix InfoGraphics news release; Oct. 4, 1999.
Topaz White Paper; Valloy Incorporation, copyright date 2000.
WebConsole Core 4.0 for NetWare, archived May 11, 2000, in Web Archive.org, web.archive.org/web/20000511133746/www.patchlink.com/products/wcnw.sub.--- product.
Webopedia.com definitions; copyright date 2001.
Welcome to Windows Update page; copyright date 2001.
winfingerprint pp. 1-3; no later than Sep. 10, 2001.
www.hostedhelpdesk.com pp. 1-4; no later than Jan. 8, 2001.
www.microsoft.com/smsmgmt_pages. pp. 1-27; Jun. 23, 1999. (Cited in U.S. Appl. No. 10/335,490).
www.mspassociation.org web pages, pp. 1-6; no later than Nov. 28, 2001.
www.rhsolution.com pp. 1-4; no later than Jan. 8, 2001.
www.shavlik.com pp. 1-12; copyright date 2001.
www.sitepatrol.com pp. 1-2; no later than Nov. 28, 2001.
www.thestandard.com article; Dec. 21, 2000.
www.triactive.com page; no later than Nov. 28, 2001.
Product Information from GuardedNet Website, copyright 2003, www.guarded.net.
Product Information from ArcSight Website, www.arcsight.com; at least as early as May 23, 2002.
Peng Lui; "Engineering a distributed intrusion tolerant database system using COTS components" IEEE, vol. 2, 22-24, Apr. 2003, p. 284-289.
Wolfe et al., "Maintaining remote services and resources over the Internet and other networks" Jun. 10-12, 2002; IEEE, p. 137-138.
Edwards, Mark Joseph, "Useful SPQuery 3.0 automates Finding, installing hotfixes," Infoworld, Jun. 21, 1999 www.infoworld.com/cgi-bin/displayArchive.pl?/99/25/c04-25.46htm.
"About CVE: Common Vulnerabilities and Exposures (CVE) is:" http://www.cve.mitre.org/about/ Mar. 22, 2004.
CERT® Incident Notes IN-2000-07, "Exploitation of Hidden File Extensions," CERT Software Engineering Institute, Carnegie Mellon University, Jul. 27, 2000.
Allen, Julia, "State of the Practice of Intrusion Detection Technologies," Networked Systems Survivability Program, Jan. 2000.
Zhang, Guoqing et al."An Information Protection System for Intranets." Proceedings of the Seventh International Symposium on Computers and Communications(2002).
Dan Kuykendall, a/k/a Seek3r, "Legal Docs: The response to their complaint", <www.kuykendall.org>, printed Oct. 25, 2002, pp. 2-4.
Declaration of Dan Kuykendall in Opposition to OSC Re: Preliminary Injunction, *Foundstone, Inc.*, v. *NT OBJECTives, Inc.*, Case No. 02CC15350 (Sup. Ct. Cal.), dated Oct. 23, 2002, pp. 3-4.
Declaration of Eric Caso in Opposition to OSC Re: Preliminary Injunction, *Foundstone, Inc*, v. *NT OBJECTives, Inc.*, Case No. 02CC15350 (Sup. Ct. Cal.), dated Oct. 23, 2002, pp. 2-5 & Exhibits B, C and D.
Declaration of Jassen D. Glaser in Opposition to OSC Re: Preliminary Injunction, *Foundstone, Inc.* v. *NT OBJECTives, Inc.*, Case No. 02CC15350 (Sup. Ct. Cal.), dated Oct. 23, 2002, pp. 6-10 & Exhibits F, G.

(56) References Cited

OTHER PUBLICATIONS

Declaration of Michael J. Morton in Opposition to OSC Re: Preliminary Injunction, *Foundstone, Inc.* v. *NT OBJECTives, Inc.*, Case No. 02CC15350 (Sup. Ct. Cal.), dated Oct. 23, 2002, pp. 2-5.
Declaration of Stuart McClure in Support of Plaintiff's Application for Temporary Restraining Order and Preliminary Injunction, *Foundstone, Inc.* v. *NT OBJECTives, Inc.*, Case No. 02CC15350 (Sup. Ct. Cal.), dated Oct. 4, 2002, pp. 2-5.
Memorandum of Points and Authorities in Support of Defendants' Opposition to Plaintiff's OSC Re: Preliminary Injunction, *Foundstone, Inc.* v. *NT OBJECTives, Inc.*, Case No. 02CC15350 (Sup. Ct. Cal.), dated Oct. 23, 2002, pp. 9-10.
Plaintiff Foundstone's Supplemental Reply in Support of Order to Show Cause Re: Preliminary Injunction, *Foundstone, Inc.* v. *NT OBJECTives, Inc.*, Case No. 02CC15350 (Sup. Ct. Cal.), dated Oct. 28, 2002, pp. 2-3.
Plaintiff's Memorandum of Points and Authorities in Support of Application for Temporary Restraining Order, Preliminary Injunction, *Foundstone, Inc.* v. *NT OBJECTives, Inc.*, Case No. 02CC15350 (Sup. Ct. Cal.), dated Oct. 4, 2002, pp. 9-13.
Plaintiff's Reply in Support of Motion for Preliminary Injunction, *Foundstone, Inc.* v. *NT OBJECTives, Inc.*, Case No. 02CC15350 (Sup. Ct. Cal.), dated Oct. 25, 2002, pp. 5-8.
International Search Report and Written Opinion from PCT Application No. PCT/US05/09689 mailed Jan. 25, 2007.
International Preliminary Report on Patentability in PCT Application No. PCT/US05/009689 issued on Feb. 13, 2007.
Written Inquiry from Japanese Patent Application No. 2003/0560745 mailed on Jul. 14, 2010.
Office Action issued in Japanese Patent Application No. 2003/0560745 mailed Jan. 9, 2008.
Decision of Rejection in Japanese Patent Application Serial No. 2003-0560745 mailed on Jul. 23, 2008.
Office Action from Canadian Patent Application No. 2,473,444 mailed on Nov. 15, 2007.
Office Action in Chinese Patent Application No. 028285425 mailed on Dec. 8, 2006.
International Search Report for PCT/USO4/04292 dated Jan. 14, 2005, 1 page.
Supplemental Search Report from European Application No. 04711110.9-1244 mailed on May 17, 2010.
Communication Pursuant to Article 94(3) EPC in EP Application No. 04711109.-1244 mailed on Dec. 14, 2012.
Office Action Summary from Australian application No. 2002245262 which was mailed on Sep. 15, 2006.
The International Preliminary Examination Report from PCT/US02/01093 mailed Oct. 27, 2003.
The International Search Report from PCT/US02/01093 mailed Aug. 5, 2002.
Non-Final Office Action in U.S. Appl. No. 10/050,675 mailed on Jan. 20, 2006.
Response to Non-Final Office Action dated Jan. 20, 2006 in U.S. Appl. No. 10/050,675, filed Apr. 17, 2006.
Notice of Allowance in U.S. Appl. No. 10/050,675 mailed on Jul. 17, 2006.
Supplemental Notice of Allowance in U.S. Appl. No. 10/050,675 mailed on Sep. 27, 2006.
Non-Final Office Action in U.S. Appl. No. 11/521,113 mailed on May 16, 2008.
Response to Non-Final Office Action dated May 16, 2008 in U.S. Appl. No. 11/521,113, filed Aug. 18, 2008.
Notice of Allowance and Examiner Interview Summary in U.S. Appl. No. 11/521,113 mailed on Dec. 2, 2008.
Non-Final Office Action in U.S. Appl. No. 11/521,113 mailed on Dec. 29, 2008.
312 Amendment in in U.S. Appl. No. 11/521,113, filed Mar. 2, 2009.
Applicant Summary of Interview with Examiner in U.S. Appl. No. 12/476,082, filed Jan. 21, 2011.
Notice of Allowance and Examiner Interview Summary in U.S. Appl. No. 12/476,082, filed Feb. 9, 2011.
Request for Continued Examination in U.S. Appl. No. 12/476,082, filed Feb. 25, 2011.
Notice of Allowance in U.S. Appl. No. 12/476,082 mailed on Mar. 10, 2011.
Request for Continued Examination and Amendment in U.S. Appl. No. 12/476,082, filed Jun. 10, 2011.
Notice of Allowance in U.S. Appl. No. 12/476,082 mailed on Aug. 8, 2011.
Request for Continued Examination in U.S. Appl. No. 12/476,082, filed Nov. 7, 2011.
Notice of Allowance in U.S. Appl. No. 12/476,082 mailed on Jan. 23, 2012.
U.S. Appl. No. 13/397,560, filed Feb. 15, 2012 and entitled "System and Method for Network Vulnerability Detection and Reporting", Inventors Stuart C. McClure, et al.
Non-Final Office Action in U.S. Appl. No. 13/397,560 mailed on Mar. 19, 2013.
U.S. Appl. No. 13/397,605, filed Feb. 15, 2012 and entitled "System and Method for Network Vulnerability Detection and Reporting," Inventors Stuart C. McClure, et al.
Non-Final Office Action in U.S. Appl. No. 13/397,605 mailed on Apr. 10, 2013.
U.S. Appl. No. 13/397,653, filed Feb. 15, 2012 and entitled "System and Method for Network Vulnerability Detection and Reporting," Inventors Stuart C. McClure et al.
Non-Final Office Action in U.S. Appl. No. 13/397,653 mailed on Mar. 14, 2013.
Response to Non-Final Office Action dated Mar. 14, 2013 in U.S. Appl. No. 13/397,653, filed Jun. 14, 2013.
Non-Final Office Action in U.S. Appl. No. 10/387,221 mailed on Sep. 22, 2006.
Response to Non-Final Office Action dated Sep. 22, 2006 in U.S. Appl. No. 10/387,221, filed Dec. 22, 2006.
Notice of Allowance in U.S. Appl. No. 10/387,221 mailed on Feb. 14, 2007.
Non-Final Office Action in U.S. Appl. No. 11/748,445 mailed on Mar. 9, 2010.
Response to Non-Final Office Action dated Mar. 9, 2010 in U.S. Appl. No. 11/748,445, filed Jun. 9, 2010.
Final Office Action in U.S. Appl. No. 11/748,445 mailed on Aug. 20, 2010.
Response to Final Office Action dated Aug. 20, 2010 in U.S. Appl. No. 11/748,445, filed Jan. 20, 2011.
Examiner Interview Summary in U.S. Appl. No. 11/748,445 mailed on Feb. 4, 2011.
Examiner Interview Summary in U.S. Appl. No. 11/748,445 mailed on Feb. 7, 2011.
Applicant Summary of Interview with Examiner in U.S. Appl. No. 11/748,445, filed Feb. 9, 2011.
Advisory Action in n U.S. Appl. No. 11/748,445 mailed on Feb. 18, 2011.
Request for Continued Examination in U.S. Appl. No. 11/748,439, filed Feb. 18, 2011.
Notice of Allowance in U.S. Appl. No. 11/748,439, filed Mar. 16, 2011.
Request for Continued Examination in U.S. Appl. No. 11/748,439, filed Jun. 13, 2011.
Notice of Allowance in U.S. Appl. No. 11/748,439 mailed on Jun. 22, 2011.
Request for Continued Examination in U.S. Appl. No. 11/748,439, filed Sep. 22, 2011.
Notice of Allowance in U.S. Appl. No. 11/748,439 mailed on Oct. 28, 2011.
U.S. Appl. No. 13/371,353, filed Feb. 10, 2012, entitled "System and Method for Network Vulnerability Detection and Reporting", inventors David M. Cole, et al.
Non-Final Office Action on U.S. Appl. No. 13/371,353 mailed on Feb. 15, 2013.
Response to Non-Final Office Action dated Feb. 15, 2013 in U.S. Appl. No. 13/371,353, filed May 15, 2013.
U.S. Appl. No. 13/371,378, filed Feb. 13, 2012, entitled "System and Method for Network Vulnerability Detection and Reporting", Inventors David M. Cole, et al.

(56) References Cited

OTHER PUBLICATIONS

Non-Final Office Action in U.S. Appl. No. 13/371,378 mailed on Mar. 1, 2013.
Response to Non-Final Office Action dated Mar. 1, 2013 in U.S. Appl. No. 13/371,378, filed Jun. 3, 2013.
Non-Final Office Action in U.S. Appl. No. 10/387,358 mailed on Dec. 19, 2005.
Response to Non-Final Office Action dated Dec. 19, 2005 in U.S. Appl. No. 10/387,358, filed Mar. 20, 2006.
Non-Final Office Action in U.S. Appl. No. 10/387,358 mailed on Nov. 17, 2006.
Response to Non-Final Office Action dated Nov. 17, 2006 in U.S. Appl. No. 10/387,358, filed Feb. 20, 2007.
Final Office Action in U.S. Appl. No. 10/387,358 mailed on Apr. 23, 2007.
Response to Final Office Action dated Apr. 23, 2007 in U.S. Appl. No. 10/387,358, filed Jun. 25, 2007.
Supplemental Response to Final Office Action dated Apr. 23, 2007 in U.S. Appl. No. 10/387,358, filed Jul. 2, 2007.
Advisory Action in U.S. Appl. No. 10/387,358 mailed on Aug. 2, 2007.
Notice of Appeal in U.S. Appl. No. 10/387,358, filed Sep. 24, 2007.
Appeal Brief Filed in U.S. Appl. No. 10/387,358, filed Jan. 24, 2008.
Notice of Defective Appeal Brief in U.S. Appl. No. 10/387,358 mailed on Jul. 8, 2008.
Appeal Brief Filed in U.S. Appl. No. 10/387,358, filed Jul. 23, 2008.
Non-Final Office Action in U.S. Appl. No. 10/387,358, filed Sep. 29, 2008.
Response to Non-Final Office Action dated Sep. 29, 2008 in U.S. Appl. No. 10/387,358, filed Jan. 29, 2009.
Final Office Action in U.S. Appl. No. 10/387,358 mailed on Apr. 2, 2009.
Request for Continued Examination and Amendment in U.S. Appl. No. 10/387,358, filed Jul. 2, 2009.
Notice of Allowance and Examiner Interview Summary in U.S. Appl. No. 10/387,358 mailed on Sep. 17, 2009.
Supplemental Notice of Allowance in U.S. Appl. No. 10/387,358 mailed on Nov. 4, 2009.
312 Amendment in U.S. Appl. No. 10/387,358, filed Dec. 17, 2009.
Non-Final Office Action in U.S. Appl. No. 10/387,223 mailed on Sep. 22, 2006.
Response to Non-Final Office Action dated Sep. 22, 2006 in U.S. Appl. No. 10/387,223, filed Dec. 22, 2006.
Notice of Allowance in U.S. Appl. No. 10/387,223 mailed on Feb. 14, 2007.
Non-Final Office Action in U.S. Appl. No. 11/748,445 mailed on Jul. 24, 2009.
Response to Non-Final Office Action dated Jul. 24, 2009 in U.S. Appl. No. 11/748,445, filed Oct. 26, 2009.
Notice of Allowance in U.S. Appl. No. 11/748,445 mailed on Dec. 28, 2009.
Non-Final Office Action in U.S. Appl. No. 10/813,917 mailed on May 4, 2007.
Response to Non-Final Office Action dated May 4, 2007 in U.S. Appl. No. 10/813,917, filed Aug. 6, 2007.
Final Office Action in U.S. Appl. No. 10/813,917 mailed on Oct. 17, 2007.
Response to Final Office Action dated Oct. 17, 2007 in U.S. Appl. No. 10/813,917, filed Dec. 21, 2007.
Advisory Action in U.S. Appl. No. 10/813,917 mailed on Jan. 25, 2008.
Request for Continued Examination and Amendment in U.S. Appl. No. 10/813,917, filed Mar. 19, 2008.
Non-Final Action in U.S. Appl. No. 10/813,917 mailed on Jun. 10, 2008.
Response to Non-Final Action dated Jun. 10, 2008 in U.S. Appl. No. 10/813,917, filed Sep. 3, 2008.
Final Office Action in U.S. Appl. No. 10/813,917 mailed on Dec. 12, 2008.
Pre-Brief Conference Request and Notice of Appeal in U.S. Appl. No. 10/813,917, filed Mar. 12, 2009.
Pre-Brief Appeal Conference Decision in U.S. Appl. No. 10/813,917 mailed on Apr. 13, 2008.
Request for Continued Examination and Amendment in U.S. Appl. No. 10/813,917, filed May 13, 2009.
Non-Final Office Action in U.S. Appl. No. 10/813,917 mailed on Aug. 7, 2009.
Response to Non-Final Office Action dated Aug. 7, 2009 in U.S. Appl. No. 10/813,917, filed Dec. 7, 2009.
Final Office Action in U.S. Appl. No. 10/813,917 mailed on Feb. 22, 2010.
Request for Continued Examination and Amendment in U.S. Appl. No. 10/813,917, filed Jun. 22, 2010.
Non-Final Office Action in U.S. Appl. No. 10/813,917 mailed on Oct. 7, 2010.
Notice of Appeal in U.S. Appl. No. 10/813,917, filed Feb. 24, 2011.
Non-Final Office Action in U.S. Appl. No. 10/813,917 mailed on Jul. 7, 2011.
Response to Non-Final Office Action dated Jul. 6, 2011 in U.S. Appl. No. 10/813,917, filed Oct. 6, 2011.
Notice of Allowance in U.S. Appl. No. 10/813,917 mailed on Feb. 9, 2012.
U.S. Appl. No. 11/410,730, filed Apr. 25, 2006.
Non-Final Office Action in U.S. Appl. No. 11/410,730 mailed on Apr. 29, 2009.
Response to Non-Final Office Action dated Apr. 29, 2009 in U.S. Appl. No. 11/410,730, filed Aug. 31, 2009.
Notice of Allowance in U.S. Appl. No. 11/410,730 mailed on Dec. 16, 2009.
312 Amendment in U.S. Appl. No. 11/410,730, filed Jan. 14, 2010.
U.S. Appl. No. 13/432,722, filed Mar. 28, 2012 entitled "System and Method of Managing Network Security Risks", inventors Steven G. Andres, et al.
Non-Final Office Action in U.S. Appl. No. 13/432,722 mailed on Mar. 26, 2013.
Non-Final Office Action in U.S. Appl. No. 10/335,490 mailed on Nov. 18, 2004.
Response to Non-Final Office Action dated Nov. 18, 2004 in U.S. Appl. No. 10/335,490, filed Dec. 10, 2004.
Examiner Interview Summary in U.S. Appl. No. 10/335,490 mailed on Dec. 21, 2004.
Non-Final Office Action in U.S. Appl. No. 10/335,490 mailed on Mar. 23, 2005.
Response to Non-Final Office Action dated Mar. 23, 2005 in U.S. Appl. No. 10/335,490, filed May 4, 2005.
Supplemental Amendment to Non-Final Action dated Mar. 23, 2005 in U.S. Appl. No. 10/335,490, filed Jun. 30, 2005.
Examiner Interview Summary in U.S. Appl. No. 10/335,490 mailed on Aug. 29, 2005.
Notice of Allowance, Notice of Allowability, and Examiner's Interview Summary in U.S. Appl. No. 11/335,490 mailed on Sep. 22, 2005.
U.S. Reexamination Control No. 90/007,955.
U.S. Appl. No. 11/009,782, filed Dec. 10, 2004.
Non-Final Office Action in U.S. Appl. No. 10/009,782 mailed on Jun. 4, 2007.
Response to Non-Final Office Action dated Jun. 4, 2007 in U.S. Appl. No. 10/009,782, filed Aug. 3, 2007.
Notice of Allowance in U.S. Appl. No. 10/009,782 mailed on Aug. 24, 2007.
U.S. Reexamination Application Control No. 90/009,120.
U.S. Appl. No. 10/927,927, filed Mar. 25, 2004.
Non-Final Office Action in U.S. Appl. No. 10/810,927 mailed on Dec. 15, 2006.
Examiner Interview Summary in U.S. Appl. No. 10/810,927 mailed on Feb. 9, 2007.
Response to Non-Final Office Action dated Dec. 15, 2006 in U.S. Appl. No. 10/810,927, filed Feb. 22, 2007.
Final Office Action in U.S. Appl. No. 10/810,927 mailed on May 2, 2007.
Response to Final Office Action dated May 2, 2007 in U.S. Appl. No. 10/810,927, filed Jun. 28, 2007.

(56) References Cited

OTHER PUBLICATIONS

Notice of Non-Compliant Amendment in U.S. Appl. No. 10/810,927 mailed on Jul. 13, 2007.
Response to Notice of Non-Compliant Amendment dated Jul. 13, 2007 in U.S. Appl. No. 10/810,927, filed Jul. 18, 2007.
Advisory Action in U.S. Appl. No. 10/810,927 mailed on Oct. 3, 2007.
Notice of Abandonment in U.S. Appl. No. 10/810,927 mailed on Feb. 27, 2007.
U.S. Appl. No. 10/975,828, filed Oct. 28, 2004.
Non-Final Office Action in U.S. Appl. No. 10/975,828 mailed on Nov. 15, 2006.
Examiner Interview Summary in U.S. Appl. No. 10/975,828 mailed on Feb. 9, 2007.
Response to Non-Final Action dated Nov. 15, 2006 in U.S. Appl. No. 10/975,828, filed Feb. 14, 2007.
Final Office Action in U.S. Appl. No. 10/975,828 mailed on May 17, 2007.
Response to Final Office Action in U.S. Appl. No. 10/975,828 mailed on Jul. 13, 2007.
Advisory Action in U.S. Appl. No. 10/975,828 mailed on Aug. 1, 2007.
Notice of Abandonment in U.S. Appl. No. 10/975,828 mailed on Dec. 27, 2007.
Non-Final Office Action in U.S. Appl. No. 10/778,770 mailed on Apr. 26, 2007.
Response to Non-Final Action dated Apr. 26, 2007 in U.S. Appl. No. 10/778,770, filed Jul. 24, 2007.
Non-Final Office Action in U.S. Appl. No. 10/778,770 mailed on Sep. 26, 2007.
Response to Non-Final Office Action dated Sep. 26, 2007 in U.S. Appl. No. 10/778,770, filed Jan. 28, 2008.
Final Office Action in U.S. Appl. No. 10/778,770 Mailed on Apr. 30, 2008.
RCE and Amendment filed in Response to Final Office Action dated Apr. 30, 2008 in U.S. Appl. No. 10/778,770, filed Jul. 30, 2008.
Non-Final Office Action in U.S. Appl. No. 10/778,770 mailed on Oct. 14, 2008.
Response to Non-Final Office Action dated Oct. 14, 2008 in U.S. Appl. No. 10/778,770, filed Jan. 14, 2009.
Final Office Action in U.S. Appl. No. 10/778,770 mailed on Apr. 2, 2009.
Notice of Appeal and Appeal Brief in U.S. Appl. No. 10/778,770, filed Jul. 2, 2009.
Examiner's Answer to Appeal Brief in U.S. Appl. No. 10/778,770 mailed Oct. 15, 2009.
Reply Brief in U.S. Appl. No. 10/778,770, filed Jan. 15, 2010.
Decision of United States Board of Patent Appeals in U.S. Appl. No. 10/778,770 mailed on Nov. 23, 2012.
Request for Continued Examination and Amendment in U.S. Appl. No. 10/778,770, filed Jan. 23, 2013.
Notice of Allowance in U.S. Appl. No. 10/778,770 mailed on May 7, 2013.
Non-Final Office Action in U.S. Appl. No. 10/778,779 mailed on Apr. 30, 2007.
Response to Non-Final Office Action dated Jul. 30, 2007 in U.S. Appl. No. 10/778,779, filed Jul. 30, 2007.
Non-Final Office Action in U.S. Appl. No. 10/778,779 mailed on Nov. 14, 2007.
Response to Non-Final Office Action dated Nov. 14, 2007 in U.S. Appl. No. 10/778,779, filed Mar. 14, 2008.
Final Office Action in U.S. Appl. No. 10/778,779 mailed on Jul. 11, 2008.
Response to Final Office Action dated Jul. 11, 2008 in U.S. Appl. No. 10/778,779, filed Sep. 11, 2008.
Advisory Action in U.S. Appl. No. 10/778,779 mailed on Sep. 29, 2008.
Request for Continued Examination and Amendment in U.S. Appl. No. 10/778,779, filed Oct. 13, 2008.
Non-Final Action in U.S. Appl. No. 10/778,779 mailed on Jan. 8, 2009.
Request for Continued Examination and Amendment filed in U.S. Appl. No. 10/778,779 Oct. 13, 2008.
Response to Non-Final Office Action dated Jan. 8, 2009 in U.S. Appl. No. 10/778,779, filed Apr. 8, 2009.
Final Office Action in U.S. Appl. No. 10/778,779 mailed on Jul. 10, 2009.
Request for Continued Examination and Amendment filed in U.S. Appl. No. 10/778,779 Nov. 10, 2009.
Non-Final Office Action in U.S. Appl. No. 10/778,779 mailed on Jan. 25, 2010.
Response to Non-Final Office Action dated Jan. 25, 2010 in U.S. Appl. No. 10/778,779, filed Jun. 25, 2010.
Final Office Action in U.S. Appl. No. 10/778,779 mailed Sep. 15, 2010.
Response to Final Office Action dated Sep. 15, 2010 in U.S. Appl. No. 10/778,779, filed Sep. 15, 2010.
Advisory Action in U.S. Appl. No. 10/778,779 mailed Dec. 3, 2010.
Notice of Appeal in U.S. Appl. No. 10/778,779, filed Feb. 15, 2011.
Request for Continued Examination and Amendment in U.S. Appl. No. 10/778,779, filed Apr. 15, 2011.
Notice of Allowance in U.S. Appl. No. 10/778,779 mailed on Jul. 19, 2011.
Request for Continued Examination in U.S. Appl. No. 10/778,779, filed Aug. 16, 2011.
Notice of Allowance in U.S. Appl. No. 10/778,779 mailed on Sep. 6, 2011.
U.S. Patent Application and Preliminary Amendment filed as U.S. Appl. No. 13/312,963 Dec. 6, 2011.
Non-Final Office Action in U.S. Appl. No. 13/312,963 mailed on Aug. 20, 2012.
Response to Non-Final Office Action dated Aug. 20, 2012 in U.S. Appl. No. 13/312,963, filed Nov. 20, 2012.
Final Office Action in U.S. Appl. No. 13/312,963 mailed on Dec. 20, 2012.
Request for Continued Examination and Amendment in U.S. Appl. No. 13/312,963, filed Mar. 19, 2013.
U.S. Patent Application and Preliminary Amendment filed as U.S. Appl. No. 13/312,978 Dec. 6, 2011.
Non-Final Office Action in U.S. Appl. No. 13/312,978 mailed on Aug. 22, 2012.
Response to Non-Final Office Action dated Aug. 22, 2012 in U.S. Appl. No. 13/312,978, filed Nov. 21, 2012.
Final Office Action in U.S. Appl. No. 13/312,978 mailed on Dec. 19, 2012.
Request for Continued Examination and Amendment in U.S. Appl. No. 13/312,978, filed Mar. 15, 2013.
Non-Final Office Action in U.S. Appl. No. 10/778,836 mailed on Sep. 10, 2007.
Response to Non-Final Action dated Sep. 10, 2007 in U.S. Appl. No. 10/778,836, filed Dec. 10, 2007.
Final Office Action in U.S. Appl. No. 10/778,836 mailed on Mar. 17, 2008.
Request for Continued Examination and Amendment in U.S. Appl. No. 10/778,836, filed Jun. 17, 2008.
Non-Final Office Action in U.S. Appl. No. 10/778,836 mailed on Sep. 3, 2008.
Response to Non-Final Action dated Sep. 3, 2008 in U.S. Appl. No. 10/778,836, filed Dec. 3, 2008.
Notice of Allowance in U.S. Appl. No. 10/778,836 mailed on Jan. 9, 2009.
Non-Final Office Action in U.S. Appl. No. 10/778,837 mailed on Sep. 24, 2007.
Response to Non-Final Office Action dated Sep. 24, 2007 in U.S. Appl. No. 10/778,837, filed Jan. 24, 2008.
Final Office Action in U.S. Appl. No. 11/778,837 mailed on Mar. 5, 2008.
Request for Continued Examination and Amendment in U.S. Appl. No. 11/778,837, filed Jun. 5, 2008.
Non-Final Office Action in U.S. Appl. No. 10/778,837 mailed on Jul. 3, 2008.

(56) References Cited

OTHER PUBLICATIONS

Response to Non-Final Office Action dated Jul. 3, 2008 in U.S. Appl. No. 11/778,837, filed Sep. 22, 2008.
Final Office Action in U.S. Appl. No. 10/778,837 mailed on Dec. 16, 2008.
Pre-Brief Conference Request and Notice of Appeal in U.S. Appl. No. 10/778,837, filed Mar. 16, 2009.
Pre-Brief Conference Decision in U.S. Appl. No. 10/778,837 mailed on Apr. 8, 2009.
Examiner Interview Summary in U.S. Appl. No. 10/778,837 mailed on Jun. 10, 2009.
Notice of Allowance in U.S. Appl. No. 10/778,837 mailed on Jun. 29, 2009.
Non-Final Office Action in U.S. Appl. No. 10/779,190 mailed on Sep. 18, 2007.
Response to Non-Final Office Action dated Sep. 18, 2007 in U.S. Appl. No. 10/779,190, filed Jan. 18, 2008.
Final Office Action in U.S. Appl. No. 10/779,190 mailed on Apr. 29, 2008.
Request for Continued Examination and Amendment in U.S. Appl. No. 10/779,190, filed Jul. 29, 2008.
Non-Final Office Action in U.S. Appl. No. 10/779,190 mailed on Sep. 26, 2008.
Response to Non-Final Action dated Sep. 26, 2008 in U.S. Appl. No. 10/779,190, filed Jan. 26, 2009.
Notice of Allowance and Examiner Interview Summary in U.S. Appl. No. 10/779,190 mailed May 18, 2009.
Response to Non-Final Office Action dated Mar. 19, 2013 in U.S. Appl. No. 13/397,560, filed Jun. 19, 2013.
Notice of Allowance in U.S. Appl. No. 13/397,560 mailed on Aug. 12, 2013.
Response to Non-Final Office Action dated Apr. 10, 2013 in U.S. Appl. No. 13/397,605, filed Jul. 10, 2013.
Notice of Allowance in U.S. Appl. No. 13/397,653 mailed on Aug. 5, 2013.
Final Office Action in U.S. Appl. No. 13/371,353 mailed on Aug. 8, 2013.
Final Office Action in U.S. Appl. No. 13/371,378 mailed on Jun. 25, 2013.
Response to Non-Final Office Action dated Mar. 26, 2013 in U.S. Appl. No. 13/432,722, filed Jul. 26, 2013.
U.S. Appl. No. 14/010,498 entitled "System and Method for Automated Policy Audit and Remediation Management" filed on Aug. 26, 2013, inventor(s) John Leslie Williams, et al.
AF Response to Final Office Action dated Aug. 8, 2013 in U.S. Appl. No. 13/371,353, filed Oct. 8, 2013.
AF Response to Final Office Action dated Jun. 25, 2013 in U.S. Appl. No. 13/371,378, filed Sep. 19, 2013.
Notice of Allowance in U.S. Appl. No. 13/371,378 mailed on Sep. 30, 2013.
Final Office Action in U.S. Appl. No. 13/397,605 mailed on Nov. 8, 2013.

\* cited by examiner

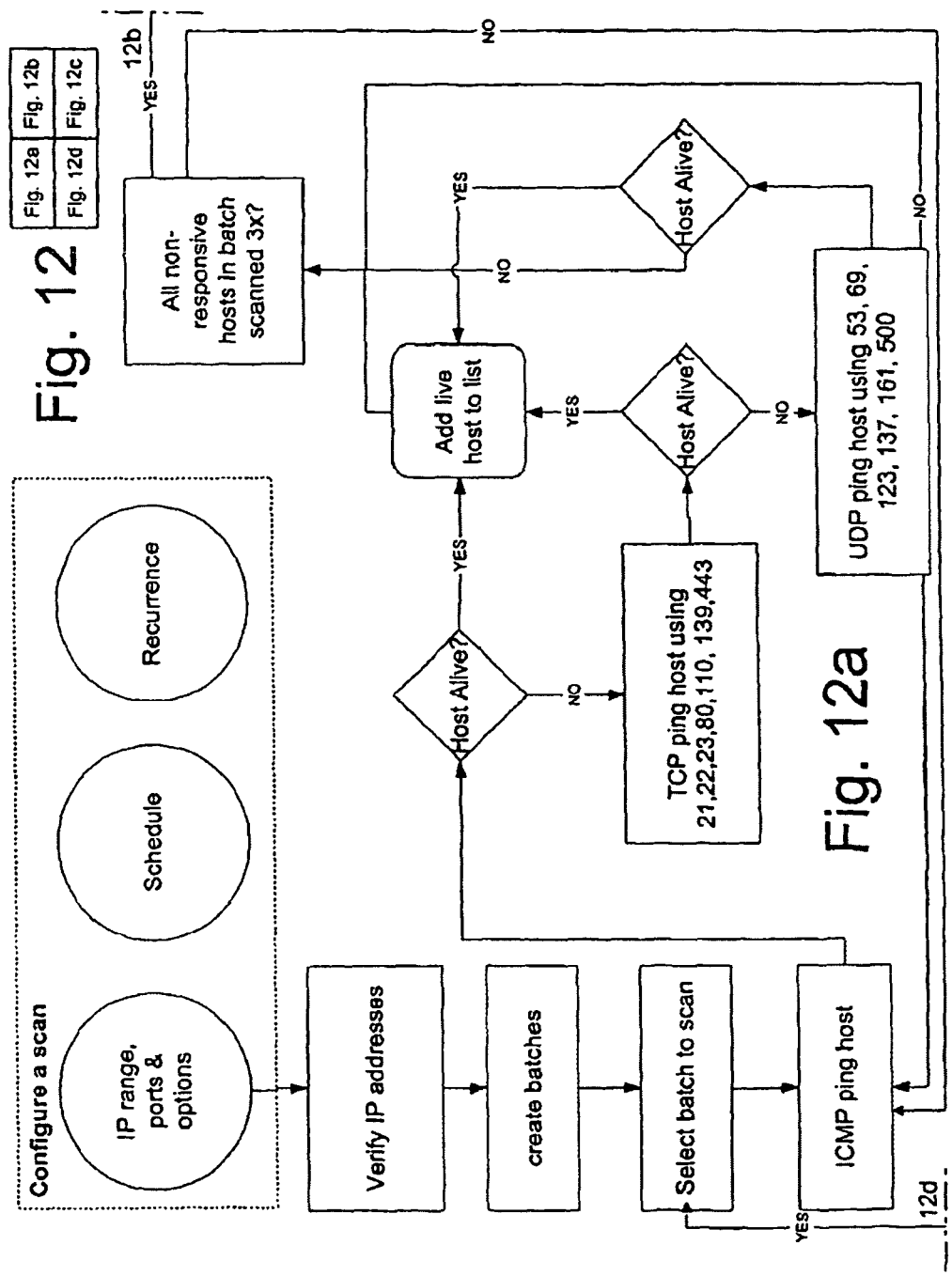

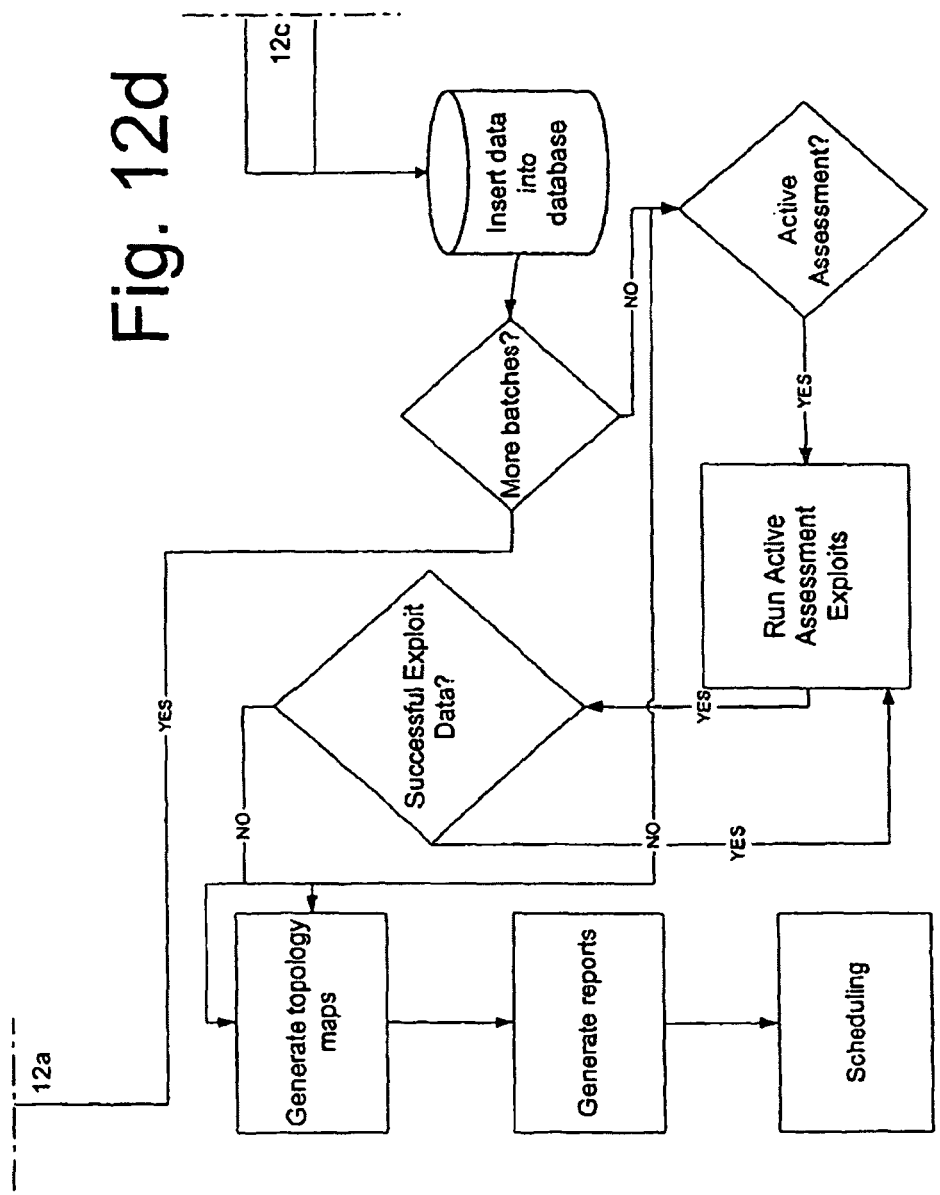

FoundScan for Acme Company: Scan Summary Report        Page 1 of 5

*Report Generated: 10-11-2001 15:10:07 Pacific Standard Time* | Navigate ▼ |

Acme Company
Scan Name: Daily Scan

Scan Duration: 13 Minute(s), 23 Second(s)
Start Time: 19:00:00, July 20, 2001      Stop Time: 19:13:24, July 20, 2001
*FoundScan results are driven by the Foundstone Assessment Methodology.*

| FoundScore Summary- Detailed Report |

*FoundScore is a numerical representation of your security exposure. For a detailed explanation of FoundScore, click here.*

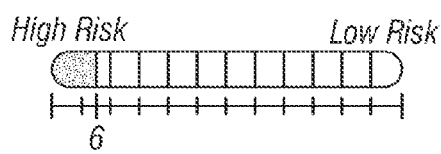

| Network Map Summary- Detailed Report |

*FIG. 13A*

FoundScan for Acme Company: Scan Summary Report

Network Topology Summary: Acme Company

| Discovered Hosts- Detailed Report | | | | |
|---|---|---|---|---|
| IP Address Range | Active IP Addresses | Potentially Active IP Addresses | Inactive IP Addresses | Total IP Addresses in Range |
| 10.1.0.0-1 | 1 | 0 | 1 | 2 |
| 10.2.0.0-7 | 5 | 2 | 1 | 8 |
| 10.3.0.0-62 | 23 | 2 | 38 | 63 |
| 10.4.0.0-7 | 3 | 0 | 5 | 8 |
| 10.5.0.0-125 | 72 | 0 | 54 | 126 |
| 10.6.0.0-7 | 1 | 2 | 5 | 8 |
| 10.7.0.0-13 | 10 | 0 | 4 | 14 |
| 10.8.0.0-31 | 7 | 0 | 25 | 32 |
| 10.9.0.0-125 | 2 | 0 | 124 | 126 |
| 10.10.0.0-61 | 14 | 1 | 47 | 62 |
| 10.11.0.0-29 | 8 | 0 | 22 | 30 |

FoundScan for Acme Company: Scan Summary Report    Page 3 of 5

Total            146          7          326          479

Operating System Summary- Detailed Report

□ AIX 4.0 (1)
□ AIX 4.3 (1)
□ Cisco IOS (4)
□ FreeBSD 4.1 - 4.2 (1)
□ HP-UX B.11.00 A 9000 (1)
□ Linux 2.2.14 - 2.2.16 (6)
□ Linux 2.2.16- 22 (1)
□ Linux 2.3.99-pre9 (2)
□ Nokia IPSO 3.2 (2)
□ OpenBSD 2.6- 2.8 (5)
□ Solaris 2.5.1- 2.7 (22)
□ SanOS 5.6- 5.7 (3)
□ Windows 2000- ME (4)
□ Windows NT 4.0 (30)
□ Windows NT 4.0- 9x (3)
□ Windows NT4- 9x (3)

Network Services Summary- Detailed Report

FoundScan for Acme Company: Scan Summary Report     Page 4 of 5

| Summary Comparison | 7-19-2001 | 7-20-2001 | Change |
|---|---|---|---|
| FoundScore Risk Rating: | 11 | 6 | -5 |
| Total Vulnerabilities: | 23 | 23 | 0 |

FoundScan for Acme Company: Scan Summary Report   Page 5 of 5

| Total Discovered Hosts: | 42 | 146 | 104 |
|---|---|---|---|
| Total Network Services: | 196 | 274 | 78 |
| Total Web Servers: | 7 | 58 | 51 |
| Total SSL Web Servers: | 5 | 9 | 4 |
| Total SMTP Servers: | 10 | 14 | 4 |
| Total FTP Servers: | 10 | 18 | 8 |
| Number of Telnet Servers: | 14 | 14 | 0 |

FoundScan for Acme Company: FoundScore Report   Page 1 of 2

FoundScan for Acme Company: FoundScore Report       Page 2 of 2

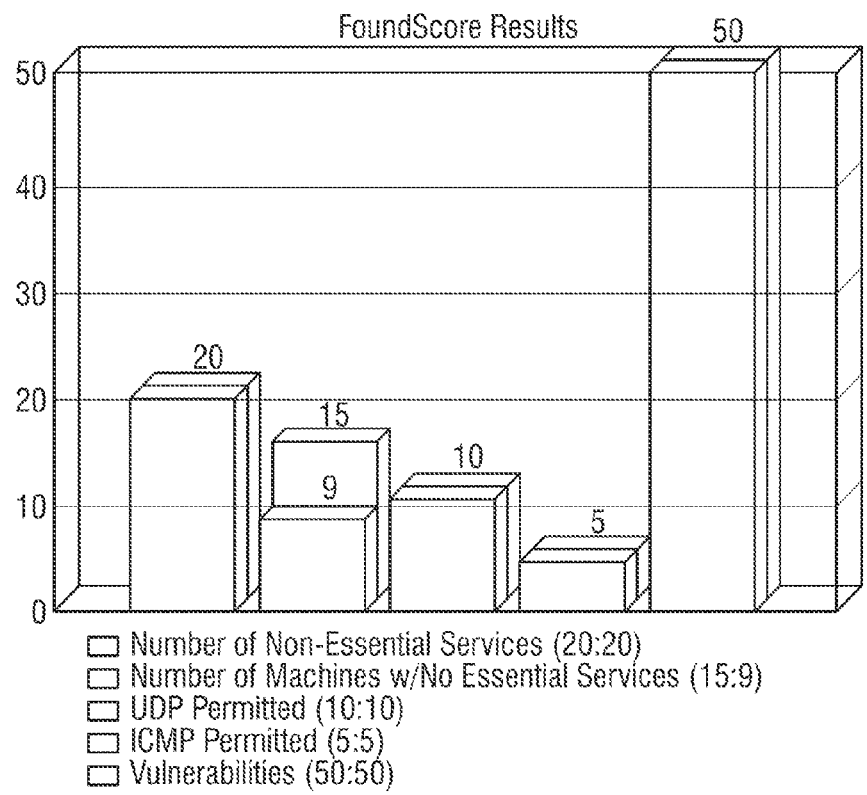

| FoundScore: Vulnerabilities | Your Results | Deductions | Running Score |
|---|---|---|---|
| High Risk Vulnerabilities | 13 | 50 | 50 |
| Medium Risk Vulnerabilities | 7 | 0 | 50 |
| Low Risk Vulnerabilities | 3 | 0 | 50 |
| | Score after Vulnerability Deductions: | | 50 |

| FoundScore: Exposure | Your Results | Deductions | Running Score |
|---|---|---|---|
| Number of Non-Essential Services | 150 | 20 | 30 |
| Number of Machines with No Essential Services | 9 | 9 | 21 |
| UDP Permitted | Yes | 10 | 11 |
| ICMP Permitted | Yes | 5 | 6 |
| | Total Score: | | 6 |
| | | | Poor |

*To understand what systems and ports affected your FoundScore, click on the specific item of interest in the "Your Results" column in the above table.*

FIG. 14B

FoundScan for Acme Company: Network Topology Report

Report Generated: 10-11-2001 15:10:08 Pacific Standard Time | Navigate |

Acme Company
Scan Name: Daily Scan

| NETWORK TOPOLOGY REPORT |

The network map below is a graphical representation of the scanned environment. FoundScan created it by issuing a series of ICMP and TCP traceroute commands, analyzing the results, then mapping devices based on their subnet membership and distance from one another. The map provides a high-level overview of your environment so that you can easily identify all discovered subnets and devices. A detailed report of discovered hosts is also available.

NOTE: The traceroute procedure does not always return an IP at each hop. This is almost always due to a firewall blocking responses to the traceroute commands, and so we represent unknowns as firewalls on the map. It is possible, however, due to varying load conditions on the network and other factors out of our control that spurious unknowns might creep into the data. Our data gathering methods minimize this, but when it does happen, some machines may be connected to a firewall in the map that are in fact connected to a known router in the network.

Network Topology Summary: Acme Company

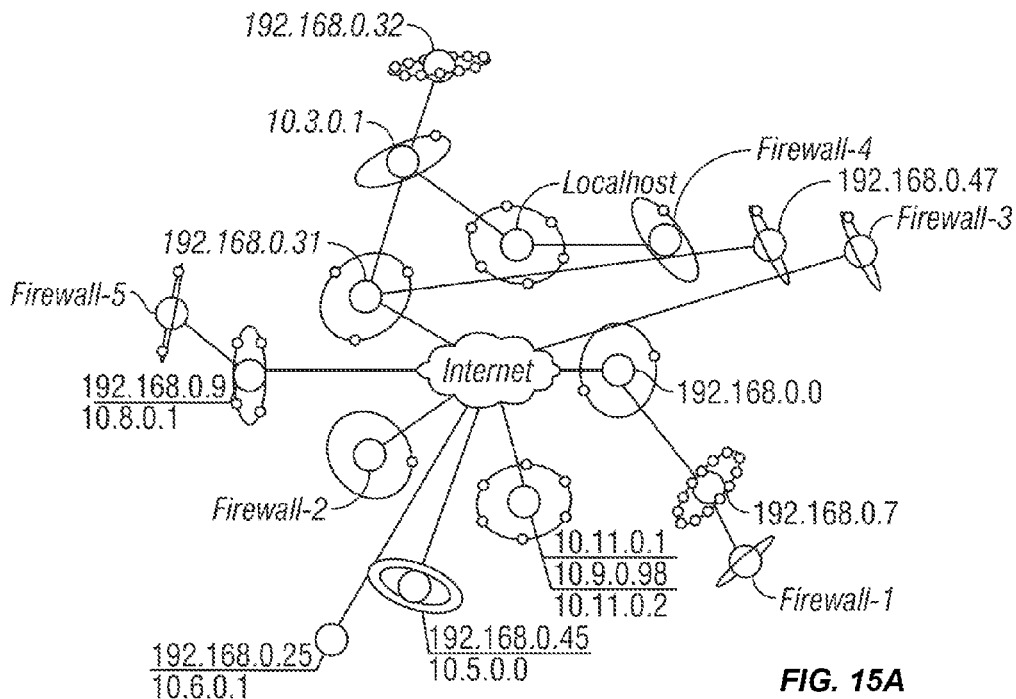

*FIG. 15A*

FoundScan for Acme Company: Network Topology Report

Detailed Subnets: Acme Company

| | | | |
|---|---|---|---|
| ⓐ Aix | ⊟ Cisco | ₸ Freebsd | ▦ HP |
| ⚐ Linux | ⊛ Openbsd | ⊙ Solaris | ▤ Windows |

- 10.3.0.1 — 1 Host
  - 10.3.0.30  63.acme.net

- 10.11.0.1 / 10.9.0.98 / 10.11.0.2 — 6 Hosts
  - 10.9.0.1 [Unknown]
  - 10.11.0.8 [Unknown]
  - 10.11.0.9 [Unknown]
  - 10.11.0.10 nathanbullfrog.acm...
  - 10.11.0.13 wart.acme.com
  - 10.11.0.19 [Unknown]

- Localhost — 6 Hosts
  - 10.3.0.2  35.acme.net
  - 10.3.0.5  38.acme.net
  - 10.3.0.7  40.acme.net
  - 10.3.0.8  41.acme.net
  - 10.3.0.12 45.acme.net
  - 10.4.0.2  [Unknown]

- 192.168.0.0 — 2 Hosts
  - 10.2.0.1  1.acme.net
  - 10.3.0.32 qw.acme.net

- 192.168.0.7 — 16 Hosts
  - 10.2.0.2  2.acme.net
  - 10.2.0.4  4.acme.net
  - 10.2.0.5  5.acme.net
  - 10.3.0.33 fw.acme.com
  - 10.3.0.34 us1.acme.com
  - 10.3.0.37 topaz.acme.com
  - 10.3.0.39 feldspar.acme.com
  - 10.3.0.40 diamond.acme.com
  - 10.3.0.42 calcite.acme.com
  - 10.3.0.43 gypsum.acme.com
  - 10.3.0.45 granite.acme.com
  - 10.3.0.50 apatite.acme.com
  - 10.3.0.51 beryl.acme.com
  - 10.3.0.52 pearl.acme.com
  - 10.3.0.53 ruby.acme.com
  - 10.3.0.54 sapphire.acme.com

- 192.168.0.9 / 10.8.0.1 — 4 Hosts
  - 10.8.0.13 acme.com
  - 10.8.0.14 [Unknown]
  - 10.8.0.18 [Unknown]
  - 10.8.0.25 [Unknown]

*FIG. 15B*

FoundScan for Acme Company: Network Topology Report    Page 3 of 5

FoundScan for Acme Company: Network Topology Report

| | | |
|---|---|---|
| 10.5.0.34 [Unknown] | 10.5.0.35 [Unknown] | 10.5.0.36 [Unknown] |
| 10.5.0.37 [Unknown] | 10.5.0.38 [Unknown] | 10.5.0.39 [Unknown] |
| 10.5.0.40 [Unknown] | 10.5.0.41 [Unknown] | 10.5.0.42 [Unknown] |
| 10.5.0.43 [Unknown] | 10.5.0.44 [Unknown] | 10.5.0.45 [Unknown] |
| 10.5.0.46 [Unknown] | 10.5.0.47 [Unknown] | 10.5.0.48 [Unknown] |
| 10.5.0.49 [Unknown] | 10.5.0.50 [Unknown] | 10.5.0.51 [Unknown] |
| 10.5.0.52 [Unknown] | 10.5.0.53 [Unknown] | 10.5.0.54 [Unknown] |
| 10.5.0.55 [Unknown] | 10.5.0.56 [Unknown] | 10.5.0.57 [Unknown] |
| 10.5.0.58 [Unknown] | 10.5.0.59 [Unknown] | 10.5.0.60 [Unknown] |
| 10.5.0.61 [Unknown] | 10.5.0.62 [Unknown] | 10.5.0.63 [Unknown] |
| 10.5.0.64 [Unknown] | 10.5.0.65 [Unknown] | 10.5.0.66 [Unknown] |
| 10.5.0.67 [Unknown] | 10.5.0.68 [Unknown] | 10.5.0.69 [Unknown] |
| 10.5.0.94 [Unknown] | 10.5.0.109 [Unknown] | 10.5.0.111 [Unknown] |
| 10.5.0.123 [Unknown] | 10.5.0.124 [Unknown] | |

*FIG. 15E*

SYSTEM AND METHOD FOR NETWORK VULNERABILITY DETECTION AND REPORTING

RELATED APPLICATION(S)

This application is a continuation (and claims the benefit of priority under 35 U.S.C. §120) of U.S. patent application Ser. No. 12/476,082, filed Jun. 1, 2009, now issued as U.S. Pat. No. 8,135,830, which application is a divisional of U.S. patent application Ser. No. 11/521,113, filed Sep. 14, 2006, now issued as U.S. Pat. No. 7,543,056, which application is a divisional of U.S. patent application Ser. No. 10/050,675 filed Jan. 15, 2002, now issued as U.S. Pat. No. 7,152,105, which application in turn claims the benefit of 35 U.S.C. §119(e) to U.S. Provisional Patent Application Ser. No. 60/349,193 filed on Jan. 15, 2002. The disclosure of the prior applications are considered part of (and are incorporated herein by reference in) the disclosure of this application.

BACKGROUND OF THE INVENTION

1. Field of the Invention

This invention relates to network system security, and more particularly relates to systems and methods for automatic detection, monitoring and reporting of network vulnerabilities.

2. Description of the Related Art

The reliability and security of a network is essential in a world where computer networks are a key element in intra-entity and inter-entity communications and transactions. Various tools have been used by network administrators, government, security consultants, and hackers to test the vulnerabilities of target networks, such as, for example, whether any computers on a network can be accessed and controlled remotely without authorization. Through this intensive testing, a target network can be "hardened" against common vulnerabilities and esoteric attacks. Existing testing systems, however, produce inconsistent results, use techniques that are unproven or that damage the target network, fail to respond to changing network environments or to detect new vulnerabilities, and report results in difficult to understand, text-based reports.

Well-known network security tools now exist to test network paths for possible intrusion. From a testing point, simple commands such as traceroute and ping can be used to manually map a network topography, and determine roughly what network addresses are "alive" with a computer "awake" on the network (i.e., determine which computers are on and are responding to network packets). A tool such as a port scanner can be used to test an individual target computer on the target network to determine what network ports are open. If open ports are found, these ports may provide access for possible intrusion, and potentially represent a vulnerability that can be exploited by a malicious hacker.

Some suites combining various network tools attempt to follow a quasi-automated process to test target computers on a target network. These suites provide variations on the tools described above, and provide long-form text-based output based on the outcome of this testing. The output of these security tests are extremely technical, and require extensive knowledge of network communications in order to interpret and provide advice based on the results. Thus, these partially automated suites do not provide comprehensive security to an entity seeking to "harden" its network.

Further, some security suites actually risk substantial damage to the target network. For example, while the use of malformed network packets to test a target computer can provide extensive information from the target and feedback on the security of the target, these malformed packets can destabilize the target computer in unpredictable ways. This sometimes results in a short-term loss of information to the target computer or, in more serious cases, a complete crash of the target computer operating system or hardware.

In other cases, the testing method used by existing suites is not reliable. If a network port scanning method employed on a target computer is, for example, 80% accurate over time, then a complete test of all $2^{16}$ ports on a single computer may result in approximately 13,000 ports incorrectly identified as potentially running vulnerable services. Over an entire target network, such "false positives" make it virtually impossible to determine the true security level of the target network.

Existing testing methods lack a standard, quantitative method for objectively comparing the security of a target network or target computer to other systems. Typically, a target network or target computer is ranked only as "high risk," "medium risk," or "low risk." However, such a three-tier system alone provides very little substantive feedback or comparative information about changes in the network over time, the relative weight of different vulnerabilities in determining the resulting risk level, or objective assessments of network security among otherwise heterogeneous network environment.

SUMMARY OF THE INVENTION

The present invention solves these problems and more through a comprehensive network vulnerability testing and reporting method and system. Specifically, the testing system features include a selected combination of (1) a non-destructive identification of target computer operating system; (2) a multiple-tier port scanning method for determination of what network addresses are active and what ports are active at those addresses; (3) a comparison of collected information about the target network with a database of known vulnerabilities; (4) a vulnerability assessment of some vulnerabilities on identified ports of identified target computers; (5) an active assessment of vulnerabilities reusing data discovered from previously discovered target computers; (6) an application of a quantitative score to objectively and comparatively rank the security of the target network; and, (7) reduction of detailed results of the information collected into hierarchical, dynamic and graphical representations of the target network, target computers, and vulnerabilities found therein. Other features are foreseen and disclosed herein, as well.

In its preferred embodiment, the testing system operates over a modern multi-layer packet network such as a corporate intranet or the Internet. The network typically includes one or more computers, where a computer includes a desktop station running any operating system, a router, a server, and/or any other networked device capable of sending and receiving packets through standard interne protocols such as TCP/IP (Transmission Control Protocol/Internet Protocol), UDP (User Datagram Protocol), and the like. The system and method can be run remotely from a monitoring computer outside the target network, or can be run by a monitoring computer included within the target network. The target network itself is typically defined as an interconnected set of computers, bounded by a specific pre-designated sub-network address, range of IP addresses or sub-addresses, physical network boundaries, computer names or unique identifiers, presence or connection via a pre-determined network protocol, and the like. The target computers comprise all or a portion of the computers found within the target network. For example, a target computer with a simple connection to a WAN (Wide Area Network) can be tested remotely, as a single peer target network. In a more complicated example, a distributed network provider can have multiple sub-networks geographically distributed throughout the world but interconnected via an internal protocol, as a WAN target network with thousands of target computers.

A target network typically runs on one or more IP-based network protocols. Most commonly, the protocol will be TCP/IP and UDP. Similarly, the testing system is typically indifferent to the physical layer structure and topology of the target network. Only structural elements such as firewalls or routers that block, reroute, or change packets will affect the testing system. The testing system, however, attempts to adapt to these structural elements and generally provides accurate results regardless of physical implementation.

TCP/IP is a fundamental protocol used for packet-based network communications on local area networks, wide area networks, and global telecommunications networks such as the Internet. A sample configuration of a TCP/IP SYN (synchronization) packet is shown in Table 1.

TABLE 1

| Typical TCP SYN packet | | | |
| --- | --- | --- | --- |
| | Source Port | | Destination Port |
| | Sequence Number | | |
| | Acknowledgement Number | | |
| Data Offset | Reserved Data | Flags | Window |
| | Checksum | | Urgent Pointer |
| | Options | | Padding |
| | Data | | |

A computer typically runs on one or more operating systems. More commonly, these operating systems include those provided by Microsoft®, such as the Microsoft Windows® family of operating systems, MacOS® from Apple®, various flavors of UNIX including Linux®, NetBSD, FreeBSD, Solaris®, and the like. Additionally, devices on the target network may include router operating systems, mobile communication device operating systems, palmtop or handheld operating systems, appliance operating systems, set-top box operating systems, gaming operating systems, digital rights management systems, surveillance systems, smart card transaction systems, transportation management systems, and the like, that assign unique or temporary network addresses and are capable of sending and/or receiving traffic from the target network.

Target computers, in one embodiment, are identified by a unique or temporarily unique IP (Internet Protocol) address, typically in the form A.B.C.D, where each of A, B, C and D represent the Class A, Class B, Class C and Class D sub-networks and each has a value between 0 and 255. Typically, the target network is defined by one or more ranges of IP addresses controlled by the target network, but may contain additional target computers or target sub-networks connected to the target network topographically but not part of the predetermined IP range or ranges.

UDP (User Datagram Protocol) is an alternative "connectionless" communications protocol that runs above IP (Internet Protocol). UDP lacks the error correction and receipt acknowledgment features of connection-based protocols such as TCP. ICMP (Internet Control Message Protocol) is another extension of IP which permits control communications (most commonly through a ICMP PING request) between hosts on an IP network.

Another aspect of the invention includes non-destructive and relatively non-intrusive identification of the target operating system of a target computer.

Another aspect of the invention includes parallel testing of multiple target computers on a target network.

Another aspect of the invention includes an improved testing method to determine whether particular target computers on a target network are alive.

Another aspect of the invention includes an improved method for determining whether a set of commonly used ports are open on a target computer.

Another aspect of the invention includes an improved method for reliably determining whether a set of commonly used UDP ports are open or closed on a target computer.

Another aspect of the invention includes a method for associating the ports found open on a target computer with a known set of vulnerabilities.

Another aspect of the invention includes parallel testing of multiple ports and multiple target computers simultaneously.

Another aspect of the invention includes active assessment of some known set of vulnerabilities at a target computer.

Yet another aspect of the invention includes application of an objective quantitative score to the vulnerabilities found on a target network.

Still another aspect of the invention includes compilation of a dynamic, graphical report representing the network topology, network computers, and network vulnerabilities in a hierarchical report including both overview and detail documents.

In one embodiment, the present invention is a system for determining an operating system of a target computer operably connected to a network. The system comprises (1) first and second data packets, the first and second data packets compliant with a protocol supported by the network, the first and second data packets transmitted via the network to the target computer; (2) first and second operating system fingerprints comprising data bits stored in a computer-readable medium, the first and second operating system fingerprints associated with a first operating system; (3) a first target computer fingerprint comprising data bits stored in a computer-readable medium, the first target computer fingerprint including a representation of at least a portion of data received in response to the transmission of the first data packet; (4) a second target computer fingerprint comprising data bits stored in a computer-readable medium, the second target computer fingerprint including a representation of at least a portion of data received in response to the transmission of the second data packet; and (5) fingerprint comparison instructions executable by a computer to compare the first operating system fingerprint and the first target computer fingerprint, to compare the second operating system fingerprint and the second target computer fingerprint, and to generate a result indicative of whether the first operating system was running on the target computer. In a preferred aspect, the invention further comprises: (6) a third data packet, the third data packet compliant with the protocol, the first range of bits of the third data packet representing a third parameter value different from the first and second parameter values, the third data packet transmitted via the network to the target computer; (7) a third operating system fingerprint comprising data bits stored in a computer-readable medium, the third operating system fingerprint associated with the first operating system, the third operating system fingerprint differing from the first and second operating system fingerprints; and (8) a third target computer fingerprint comprising data bits stored in a computer-readable medium, the third target computer fingerprint including a representation of at least a portion of data received in response to the transmission of the first data packet, the comparison instructions executable by a computer to compare the third operating system fingerprint and the third target computer fingerprint before generating the result. In a further preferred aspect, the invention further comprises: (9) fourth, fifth and sixth operating system fingerprints comprising data bits stored in a computer-readable medium, the fourth, fifth and sixth operating system fingerprints associated with a second operating system, at least one of the fourth, fifth and sixth operating system fingerprints differing from a respective one of the first, second and third operating system fingerprints; the comparison instructions executable by a computer to compare the fourth operating system fingerprint and the first target computer fingerprint, to compare the fifth operating system fingerprint and the second target computer fingerprint, to compare the sixth operating system fingerprint and the third target computer fingerprint, and to generate a second result indicative of whether the second operating system was running on the target computer. Preferred aspects of this embodiment are ones wherein (10) the first parameter value is obtained by setting no bits, the second parameter value is obtained by setting one bit, and the third parameter value is obtained by setting two bits, or (11) wherein the first parameter value is 0, the second parameter value is 128, and the third parameter value is 128 plus a multiple of 256.

In another embodiment, the present invention is a system for determining an operating system of a target computer accessible via a network. The system comprises: (1) a plurality of data packets compliant with a protocol supported by the network, the plurality of data packets transmitted via the network to the target computer; (2) a first plurality of operating system fingerprints, each comprising data bits stored in a computer-readable medium, each associated with a first operating system; (3) a plurality of target computer fingerprints, each comprising data bits stored in a computer-readable medium, each including a representation of at least a portion of data received in response to the transmission of the plurality of data packets; and (4) fingerprint comparison instructions executable by a computer to compare the first plurality of the operating system fingerprint and the plurality of the target computer fingerprints, and to generate a result indicative of whether the first operating system was running on the target computer. A preferred aspect of the embodiment is one wherein the protocol is TCP/IP. Another preferred aspect of the embodiment further comprises (5) a second plurality of operating system fingerprints, each comprising data bits stored in a computer-readable medium, each associated with a second operating system, the fingerprint comparison instructions comparing the second plurality of the operating system fingerprints and the plurality of the target computer fingerprints to generate a second result indicative of whether the second operating system was running on the target computer.

A further embodiment of the present invention is a method for determining an operating system of a target computer accessible via a network. The method comprises the steps of (1) transmitting to the target computer a plurality of data packets compliant with a protocol supported by the network; (2) generating a plurality of target computer fingerprints, each including at least a portion of data received via the network in response to the transmission of the plurality of data packets; (3) comparing the plurality of target computer fingerprints to a first set of predetermined operating system fingerprints, each of the first set of predetermined operating system fingerprints associated with a first operating system; and (4) generating a result indicative of whether the first operating system was running on the target computer. In a preferred aspect the embodiment comprises the further steps of (5) comparing the plurality of target computer fingerprints to a second set of predetermined operating system fingerprints, each of the second set of predetermined operating system fingerprints associated with a second operating system; and (6) generating a result indicative of whether the second operating system was running on the target computer. One preferred aspect of that embodiment is one wherein the protocol is TCP/IP and wherein the value of the MSS option of two of the plurality of data packets is divisible by 128. Another preferred aspect of that embodiment is one wherein a first of the plurality of data packets has a maximum segment size option of 0, wherein a second of the plurality of data packets has a maximum segment size option of 128, and wherein a third of the plurality of data packets has a maximum segment size option of 384.

A still further embodiment of the invention is a method for identifying an operating system of a target computer via a network, the method comprising the steps of: (1) sending a first data packet to the target computer via the network, the first data packet complying with a protocol of the network and having a first pattern of bits in a first range of bits; (2) generating a first response value representing at least a portion of data received via the network in response to the sending of the first data packet; (3) sending a second data packet to the target computer via the network, the second data packet complying with the protocol and having a second pattern of bits in a first range of bits, the second pattern of bits different from the first pattern; (4) generating a second response value representing at least a portion of data received via the network in response to the sending of the second data packet; (5) sending a third data packet to the target computer via the network, the third data packet complying with the protocol and having a third pattern of bits in a first range of bits, the third pattern of bits different from the first or the second pattern; (6) generating a third response value representing at least a portion of data received via the network in response to the sending of the third data packet; (7) comparing the first response value to a first predetermined value associated with a first operating system; (8) comparing the second response value to a second predetermined value associated with the first operating system; (9) comparing the third response value to a third predetermined value associated with the first operating system; and (10) generating a value indicative of a relationship between the first operating system and the target computer. A preferred aspect of the embodiment comprises the further steps of: (11) comparing the first response value to a fourth predetermined value associated with a second operating system; (12) comparing the second response value to a fifth predetermined value associated with the second operating system; and (13) comparing the third response value to a sixth predetermined value associated with the second operating system. A preferred aspect of that embodiment is one wherein no bit is set in the first pattern of bits, wherein one bit is set in the second pattern of bits, and wherein two bits are set in the third pattern of bits. Another preferred aspect of that embodiment is one wherein the number of bytes in the second pattern of bits that have at least one bit set is greater than the number of bytes in the first pattern of bits that have at least one bit set, and wherein the number of bytes in the third pattern of bits that have at least one bit set is greater than the number of bytes in the second pattern of bits that have at least one bit set.

Yet another embodiment of the present invention is a system for determining whether a target computer is on a network, the system comprising: (1) a first set of port identifiers stored in a computer-readable medium, each of the first set of port identifiers representing a port used by computers to receive data packets compliant with a first protocol of the network, each of the first set of port identifiers representing a port associated with known network services; (2) a first set of data packets, each directed to a port represented by at least one of the first set of port identifiers, each of the first set of data packets compliant with the first protocol and transmitted to the target computer via the network; (3) a first set of acknowledgement packets received via the network in response to the transmission of the first set of data packets, and (4) a list of host identifiers, each host identifier representing a computer on the network that transmits data in response to a packet sent to the respective computer, a host identifier representing the target computer added to the list of host identifiers if the first set of acknowledgment packets indicates a responsiveness of the target computer. An alternative preferred aspect of the embodiment further comprises: (5a) a second set of port identifiers stored in a computer-readable medium, each of the second set of port identifiers representing a port used by computers to receive data packets compliant with a second protocol of the network, each of the second set of port identifiers representing a port associated with known network services; (6a) a second set of data packets, each directed to a port represented by at least one of the second set of port identifiers, each of the second set of data packets compliant with the second protocol and transmitted to the target computer via the network, at least one of the second set of data packets including data associated with the known network services; (7a) a second set of acknowledgement packets received via the network in response to the transmission of the second set of data packets; and (8a) a host identifier representing the target computer added to the list of host identifiers if the second set of acknowledgment packets indicates a responsiveness of the target computer. A preferred aspect of that embodiment is one wherein the first protocol is TCP, wherein the second protocol is UDP, wherein the second set of acknowledgment packets is a nonzero set of UDP data response packets. Another alternative preferred aspect of the embodiment further comprises: (5b) a second set of port identifiers stored in a computer-readable medium, each of the second set of port identifiers representing a port used by computers to receive data packets compliant with a second protocol of the network, each of the second set of port identifiers representing a port associated with known network services; (6b) a second set of data packets, each directed to a port represented by at least one of the second set of port identifiers, each of the second set of data packets compliant with the second protocol and transmitted to the target computer via the network, at least one of the second set of data packets including data associated with the known network services; (7b) a second set of acknowledgement packets received via the network in response to the transmission of the second set of data packets; and (8b) a host identifier representing the target computer added to a second list of host identifiers if the second set of acknowledgment packets does not indicate an unresponsiveness of the target computer, each of the second list of host identifiers representing a computer not known to be unresponsive. A preferred aspect of that embodiment is one wherein the first protocol is TCP, wherein the second protocol is UDP, wherein the second set of acknowledgment packets is an empty set of ICMP error packets. A further preferred aspect of either alternative embodiment further comprises: (9) a third set of data packets, each directed to a port represented by at least one of the second set of port identifiers, each compliant with the second protocol, the third set of data packets transmitted to the target computer throughout a predetermined maximum latency period; (10) a first response received first in time in response to the transmission of the third set of data packets; (11) a second response received second in time in response to the transmission of the third set of data packets, a time duration between the receipt of the first response and the receipt of the second response defining a target computer latency period. A further preferred aspect of the embodiment is one wherein each of the second set of data packets is transmitted continuously to the target computer for the duration of the target computer latency period.

A still further embodiment of the present invention is a system for testing the accessibility of a target computer via a network. The system comprises: (1) a set of port identifiers stored in a computer-readable medium, each of the set of port identifiers representing a UDP-compliant port, at least one of the port identifiers representing a port associated with known network services; (2) a set of UDP-compliant data packets, each associated with a port represented by at least one of the set of port identifiers, each of the UDP-compliant data packets transmitted continuously to the target computer for a duration approximately the same as the latency period of the target computer, at least one of the UDP-compliant data packets including data associated with the known network services; (3) a first list representing computers accessible via the network, the first list including the target computer if a nonzero set of UDP data response packets is received in response to the transmission of the data packets; and (4) a second list representing computers not known to be inaccessible via the network, the second list including the target computer if an empty set of ICMP error packets is received in response to the transmission of the data packets.

Another embodiment of the present invention is a method for determining whether a target computer is accessible via a network. The method comprises the steps of: (1) identifying TCP ports; (2) sending first data packets to the TCP ports of the target computer, each of the first data packets compliant with TCP; (3) receiving first acknowledgment packets in response to the sending of the first data packets; and (4) adding a representation of the target computer to a list representing accessible computers if the first acknowledgment packets are nonzero. A preferred aspect of the embodiment comprises the further steps of: (5) identifying UDP ports associated with network services; (6) sending second data packets to the UDP ports of the target computer, at least one of the second data packets sent continuously to the target computer throughout a latency period of the target computer, (7) receiving second acknowledgment packets in response to the sending of the second data packets; and (8) adding a representation of the target computer to a list representing accessible computers if the second acknowledgment packets are nonzero UDP data response packets. A further preferred aspect of the embodiment comprises the further step of: (9) determining the latency period of the target computer by measuring the time between responses received in response to packets transmitted to the target computer. A further preferred aspect of the embodiment comprises the further step of: (10) adding a representation of the target computer to a list representing computers not known to be inaccessible via the network, the adding performed if the second acknowledgment packets comprise an empty set of ICMP error packets.

An additional embodiment of the present invention is a method for assessing the vulnerability of a target computer via a network. The method comprising the steps of: (1) discovering a set of responsive computers on a network by transmitting a set of ICMP packets, a set of TCP packets and a set of UDP packets to a group of computers on a network; (2) detecting services on each of the set of responsive computers by transmitting TCP packets to first ports of each of the set of responsive computers and by transmitting UDP packets to second ports of each of the set of responsive computers, the first and second ports commonly used by computers to receive data packets over a network, the TCP packets including data associated with at least one computer-based service known to use one of the first ports, the UDP packets including data associated with at least one computer-based service known to use one of the second ports; and (3) generating a list of responsive ports using responses received in response to the transmission of the TCP packets and the UDP packets. A preferred aspect of the embodiment comprises the further step of: (4) determining an operating system used by each of the set of responsive computers by comparing predetermined values with portions of responses received from each of the set of responsive computers in response to transmission of a plurality of TCP-compliant packets to each of the set of responsive computers. A further preferred aspect of the embodiment comprises the further step of: (5) confirming the presence of vulnerabilities on the network by applying an automated vulnerability script to each responsive port represented in the list of responsive ports, each of the automated vulnerability scripts testing a vulnerability known to be associated with a computer configuration comprising a particular responsive port and a particular operating system. A still further preferred aspect of the embodiment comprises the further step of: (6) calculating an objective indicia of security of the network, the calculation based on a weighted summation of confirmed vulnerabilities. A preferred aspect of the embodiment comprises the further step of: (7) determining a topology of the network, the topology determination made by transmitting a set of TCP packets with varying time to live (TTL) settings and by transmitting a set of TCP packets with varying TTL settings. Another preferred aspect of the embodiment comprises the further step of (8) producing a graphical representation of the network, the representation including a topological map of the network, a color-based representation of weighted confirmed vulnerabilities, and an association between the graphical representation and information descriptive of confirmed vulnerabilities and computers on the network.

Another embodiment of the present invention is a method for creating a topological representation of a network. The method comprises the steps of: (1) identifying responsive computers on the network; (2) obtaining a plurality of sequences of IP addresses by sending to each responsive computer a sequence of packets having increasing TTL values, each sequence of IP addresses representing nodes in the network between a source computer and one of the responsive computers, adjacent IP addresses in each sequence representing connected nodes, each of the nodes comprising a computer or a router, (3) generating a list of node structures, each of the node structures including data representing a node and data indicative of other nodes to which it directly connects, the list representing all IP addresses in the plurality of sequences; (4) determining for each IP address a distance count, the distance count representing a number of nodes between a node having the IP address and a source node; (5) creating a router structure for each node structure that represents a node comprising a router; (6) associating with each of the router structures connection data representative of each connecting node that connects to no other node except the muter represented by the respective router structure; (7) for each router structure, visually depicting a graphical shape spatially related to one or more graphical shapes corresponding to connecting nodes represented by the connection data of the respective router structure; and (8) for each router structure, visually depicting a connection between a graphical shape associated with the respective router structure and another graphical shape associated with a different muter structure when distance counts associated with the IP addresses of routers represented by the respective router structure and the different router structure indicate a direct connection. A preferred aspect of the embodiment comprises the further step of: (9) testing whether a router represented by a router structure and a connecting node represented in connection data comprise two network connections of one node. A further preferred aspect of this embodiment is one wherein the graphical shape representing a router is a sphere, and wherein each of the spatially related graphical shapes is a sphere orbiting the sphere representing the router.

Yet another embodiment of the present invention is a method for calculating an objective security score for a network. The method comprising the steps of: (1) determining a vulnerability value numerically representing a combination of known vulnerabilities of a network; (2) determining an exposure value numerically representing a combination of accessible ports of computers on the network; and (3) deriving a score by combining the vulnerability value and the exposure value. A preferred aspect of this embodiment is one wherein the combination of known vulnerabilities is a summation of weighted numeric expressions of particular vulnerabilities, the weighting based on an ease of exploitation ranking and on an access granted ranking for each vulnerability.

Still another embodiment of the present invention is a method for conducting an automated network vulnerability attack, the method comprising the steps of: (1) selecting a set of vulnerability attacks for each responsive computer on a network, each selected vulnerability attack for each responsive computer designed to expose a vulnerability associated with ports of the respective computer known to be accessible and also associated with an operating system used by the respective computer; (2) encoding the set of vulnerability attacks such that each is represented in a database by a unique identifier; (3) representing each of the set of vulnerability attacks using instructions of an automated scripting language; and (4) executing the vulnerability attacks by processing the instructions with a computer.

One more embodiment of the present invention is a hierarchical network vulnerability report. The report comprises: (1) a first report level comprising: (a) an objective score representing the security of the network; and (b) a graphical representation of a network topology, including a graphical representation of computers accessible via the network and a color-based graphical representation of the vulnerability of at least some of the computers; and (2) a second report level comprising: (a) a textual list describing the computers and their associated vulnerabilities; and (b) an exposure report describing accessible ports and services of the computers.

An additional embodiment of the present invention is a vulnerability assessment language. The vulnerability assessment language comprises: (1) a set of programming language statements used to create executable scripts, the scripts executed in a thread-safe execution architecture wherein all variables are stack variables and wherein a parse tree is treated as a read-only data structure; (2) a set of special scalar data types interchangeable with an integer data type in expressions, each of the set of special scalar data types having a set of constant values configured to support vulnerability assessment operations embodied in scripts; (3) a set of native objects declared in a metascope owning a script scope to make available the native objects to executable scripts, the native objects facilitating network communication, providing callable member functions for building lists of unique ports and directing script execution to certain hosts, and providing IP addresses for scripts; and (4) a vulnerability object behaving to copy itself into a global data area where other scripts may access its information to compromise another machine, facilitating the use by one script of vulnerability data discovered by a different script.

A further embodiment of the present invention is a method for automated application of a known vulnerability on a target computer. The method comprises the steps of: (1) providing a database of known vulnerabilities, the database including a data object; (2) providing an executable script, the executable script associated with the data object; (3) applying the executable script to the target computer, the script performing the known vulnerability on a port of the target computer; and (4) returning a value representing at least one of the success, failure or other outcome of the executable script A still further embodiment of the present invention is a method for automated application of known vulnerabilities to target computers of a network. The method comprises the steps of (1) providing a database of known vulnerabilities; (2) providing a set of executable scripts, each executable to apply a known vulnerability to a specified target computer; (3) executing first executable scripts to apply vulnerabilities on specified target computers; (4) monitoring return values representing a success, failure or other outcome of each of the first executable scripts; and (5) generating a report using the return values, the report representing a security level of the network. One preferred aspect of this embodiment comprises the further step of (6) identifying execution time intervals wherein execution of the first executable scripts commences at the beginning of each of the time intervals and pauses at the end of each of the time intervals, until all of the first executable scripts have executed. A preferred aspect of the embodiment comprises the further step of: (7) automatically repeating the execution of the first executable scripts when the execution of the first executable scripts is completed. Another preferred aspect of the embodiment comprises the further steps of: (8) generating a report upon each completed execution of the first executable scripts; and (9) calculating a security trend for the network by comparing a plurality of the reports. An alternative preferred aspect of the embodiment comprises the further step of: (10) executing second executable scripts to apply vulnerabilities to a second network of computers during the execution of the first executable scripts. Another preferred aspect of the embodiment is one wherein the second network is a subset of the network. Still another preferred aspect of the embodiment is one wherein the first executable scripts are configured to apply vulnerabilities to a first port of all of the target computers before applying vulnerabilities to a second port of all of the target computers. An additional preferred aspect of the embodiment comprises the further step of allocating a plurality of packet slots, each packet slot permitting asynchronous transmission of a packet by one of the executable scripts.

BRIEF DESCRIPTION OF THE DRAWINGS

Preferred embodiments of the present invention are described below in connection with the attached drawings in which:

FIGS. 13A-13E illustrate an exemplary Scan Summary Report.

FIGS. 14A-14B illustrate an exemplary FoundScore Report.

FIGS. 15A-15F illustrate an exemplary Network Topology Report.

DETAILED DESCRIPTION OF THE PREFERRED EMBODIMENT

I. Basic Implementation, Structure and Control Language

Figure 1:
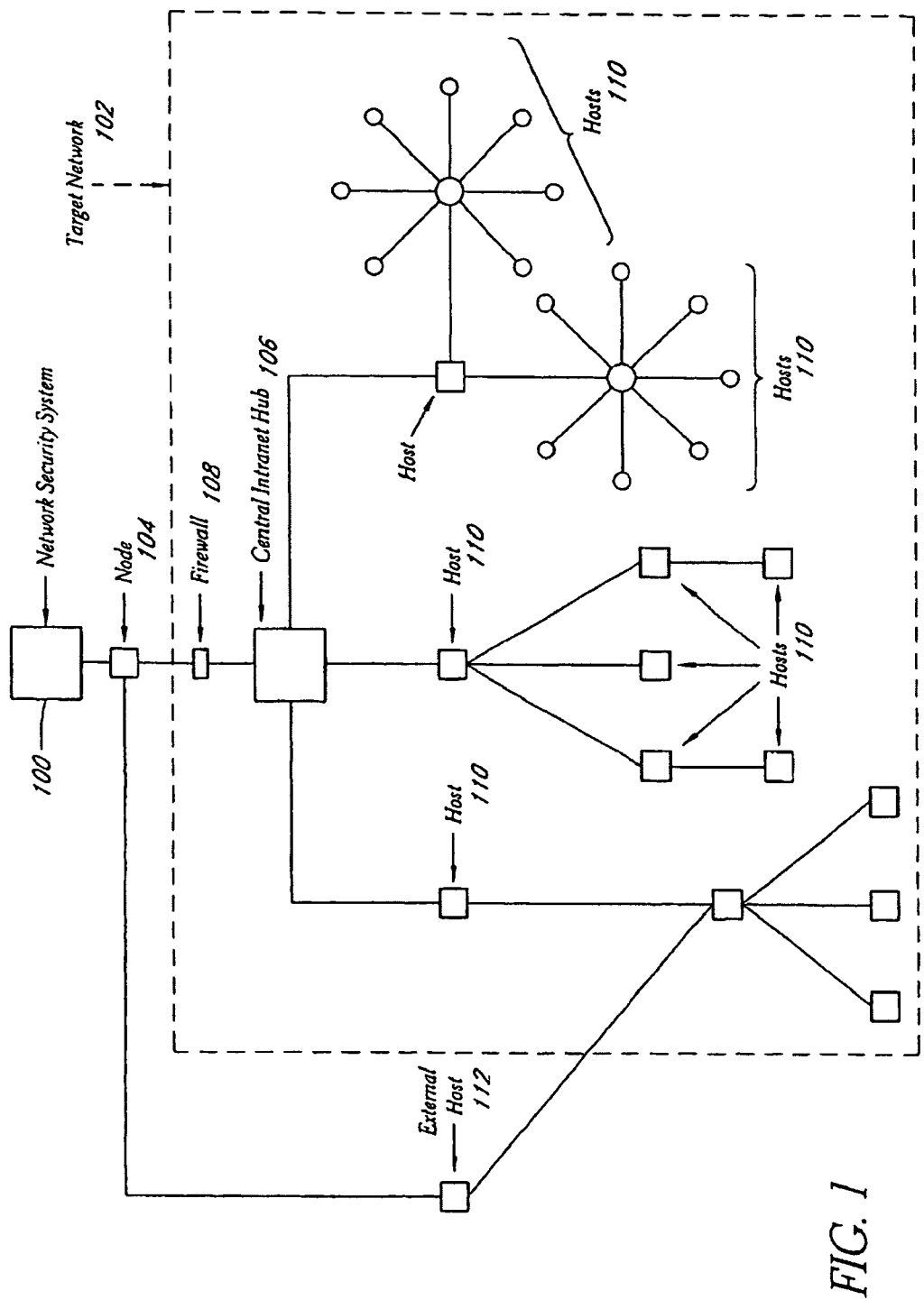
FIG. 1 illustrates one embodiment of a target network.

FIG. 1 illustrates one embodiment of a target network. The network security system 100 of the present invention is, in one embodiment, at least one Intel-based server running on a Windows 2000 operating system, although any computer system or operating system capable of handling an IP network and capable of large-scale data processing can be used. The network security system 100 may be outside the target network 102 or inside the target network (not shown). In either case, the system 100 is connected to the target network 102 through a network such as the Internet, via one or more nodes 104. The target network 102, in one example, consists of an intranet with a central intranet hub 106. The target network 102 further includes a firewall 108 which blocks some incoming traffic to or outgoing network traffic leaving the target network 102. The target network further comprises a number of hosts 110, defined as within a predetermined range of Internet Protocol (IP) addresses. In some cases, external hosts 112 may lie outside the target network but may nonetheless be connected to the target network 102.

Figure 2:
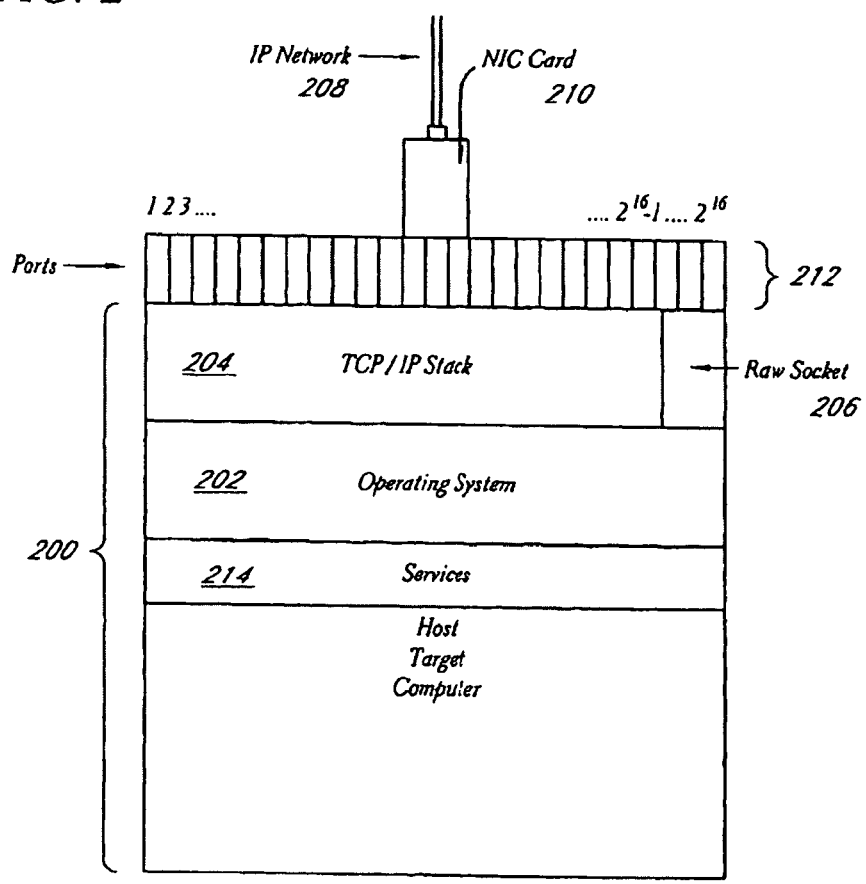
FIG. 2 illustrates one embodiment of a target computer on the target network.

FIG. 2 illustrates one embodiment of a target computer on the target network. In general, a host IP address represents a target computer, as more generally defined below, if the address is in use by the target network. In a simplified representation of a target computer 200 at a host 110, the target computer 200 is running an operating system 202. The operating system preferably contains at least one network TCP/IP stack 204 to provide packet transport, preferably including an interface to provide raw socket 206 connections between the target computer 200 and the network. The physical connection to the network 208 is provided, in one embodiment, by a Network Interface Card (NIC) 210. On an IP network, a packet can be received at any one of 65,536 logical ports 212 at the target computer 200. Similarly, any number of network services 214 can be provided.

Figure 3:
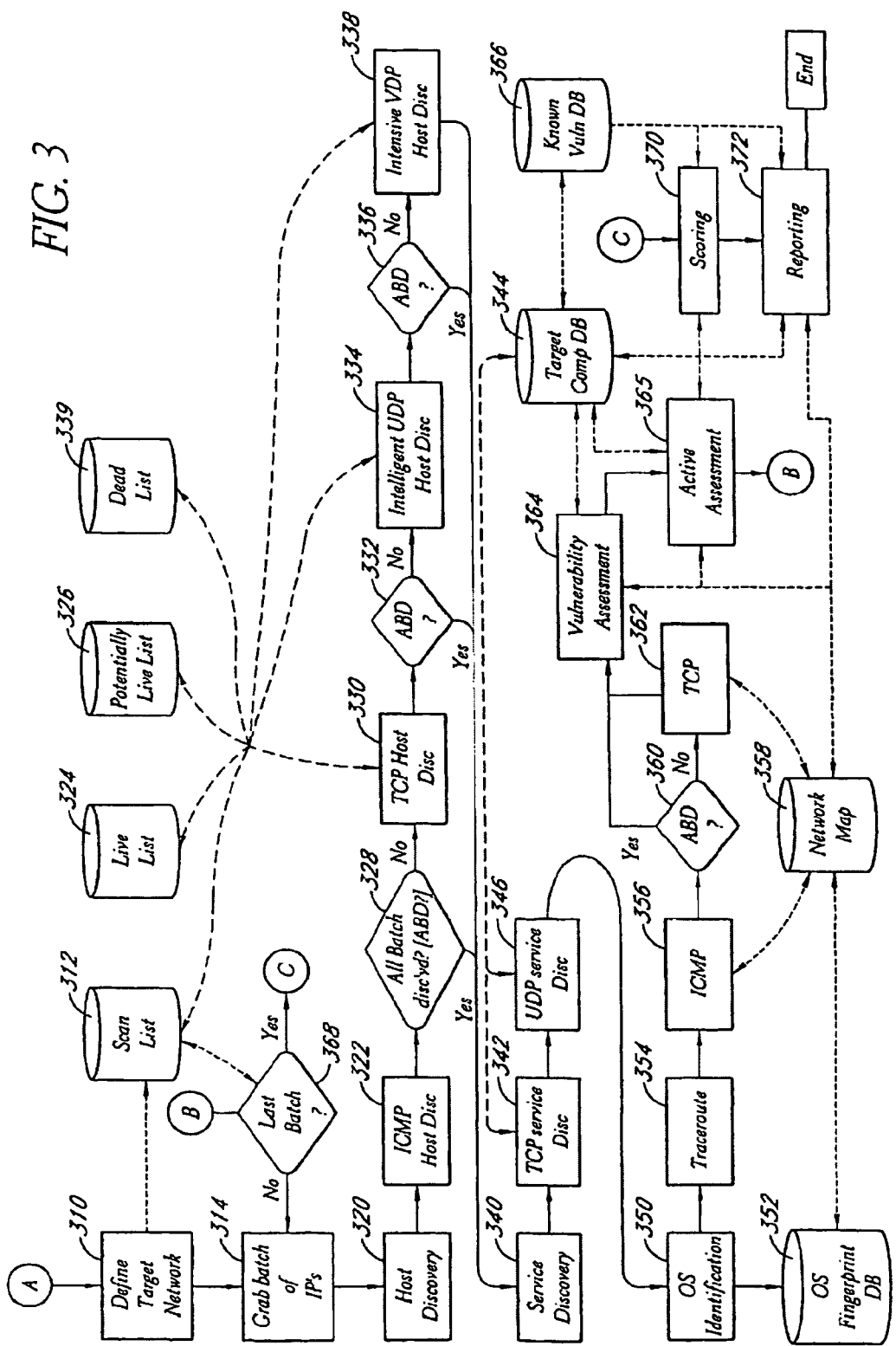
FIG. 3 illustrates one embodiment of a comprehensive testing method.

FIG. 3 illustrates one embodiment of a comprehensive testing method in accordance with embodiments of the present invention. FIG. 3 presents an overview of the method. Additional details of the method are set forth below in connection with FIGS. 4-11.

In a first step or routine 310 in FIG. 3, the testing method defines the target network and creates a scan list of IP addresses. The scan list is stored in a scan list database 312. Then, in a routine 314, the method obtains a first batch of IP addresses from the scan list database 312 and begins a detailed analysis of the target network by performing a host discovery routine that begins in a block 320.

The host discovery routine comprises an ICMP host discovery routine 322, which will be described in more detail below. During the ICMP host discovery routine 322, the method pings the target computers identified by the present batch of IP addresses. Based on the responses or lack of responses, the ICMP host discovery routine 322 is able to determine that certain target computers are "live" or "probably live," and the associated IP addresses are added to a respective live database 324 or probably live database 326 accordingly.

After completing the ICMP host discovery routine 322, the method performs a decision routine 328 wherein the method determines whether all the IP addresses in the current batch of IP addresses have been discovered (i.e., whether all the IP addresses have been assigned to the live database 324 or the probably live database 326. If any IP address has not been discovered, the method proceeds to a TCP host discovery routine 330, which will be described in more detail below. During the TCP host discovery routine 330, the method sends TCP packets to the remaining target computers identified by the present batch of IP addresses. Based on responses or lack of responses, the TCP host discovery routine 330 is able to determine that certain ones of the remaining target computers are "live" or "probably live," and the associated IP addresses are added to a respective live database 324 or probably live database 326 accordingly.

After completing the TCP host discovery routine 330, the method performs, a decision routine 332 wherein the method determines whether all the IP addresses in the current batch of IP addresses have been discovered (i.e., whether all the IP addresses have been assigned to the live database 324 or the probably live database 326. If any IP address has not been discovered, the method proceeds to an intelligent UDP host discovery routine 334, which will be described in more detail below. During the intelligent UDP host discovery routine 334, the method sends UDP packets to the remaining target computers identified by the present batch of IP addresses. Based on responses or lack of responses, the intelligent UDP host discovery routine 334 is able to determine that certain ones of the remaining target computers are "live" or "probably live," and the associated IP addresses are added to a respective live database 324 or probably live database 326 accordingly.

After completing the intelligent UDP host discovery routine 334, the method performs a decision routine 336 wherein the method determines whether all the IP addresses in the current batch of IP addresses have been discovered (i.e., whether all the IP addresses have been assigned to the live database 324 or the probably live database 326. If any IP address has not been discovered, the method, in one embodiment, proceeds to an intensive UDP host discovery routine 338, which will be described in more detail below. During the intensive UDP host discovery routine 338, the method sends additional UDP packets to the remaining target computers identified by the present batch of IP addresses. Based on responses or lack of responses, the intensive UDP discovery routine 338 is able to determine that certain ones of the remaining target computers are "live" or "probably live," and the associated IP addresses are added to a respective live database 324 or probably live database 326 accordingly. The intensive UDP host discovery routine 338 is optional and may not be included in all embodiments.

After completing the intensive UDP host discovery routine 338, the method preferably proceeds to a service discovery routine that begins in a block 340. Alternatively, in certain embodiments, the foregoing host discovery routines 322, 330, 334, 338 are advantageously repeated to determine whether additional IP addresses corresponding to target computers can be assigned to the live database 324 and the probably live database 326. In such alternative embodiments, the method repeats the host discovery routines a maximum of a predetermined times before continuing to the service discovery routine 340. Those IP addresses for which no response is received by any method are, in one embodiment, added to a dead list 339 of hosts.

In the service discovery routine, the method performs a TCP service discovery routine 342, which will be described in more detail below. In the TCP service discovery routine 342, the method sends TCP packets to selected ports of the discovered target computers in the live list 324 and the probably live list 326 and monitors the responses. Based on the responses or lack of responses, the TCP discovery routine 342 adds information regarding open ports of the target computers to a target computer database 344.

After performing the TCP service discovery routine 342, the method performs a UDP service discovery routine 346, which will be described in more detail below. In the UDP service discovery routine 346, the method sends UDP packets to selected ports of the discovered target computers in the live list 324 and the probably live list 326 and monitors the responses. Based on the responses or lack of responses, the UDP discovery routine 346 adds information regarding open ports of the target computers to the target computer database 344. In alternative embodiments, the TCP service discovery routine 342 and the UDP service discovery routine 346 are advantageously repeated a limited number of times to determine whether additional open ports are discovered.

After completing the UDP service discovery routine 346 (or after completing the routine a limited number of times), the method proceeds to an operating system (OS) identification routine 350 wherein the method determines the type and version of operating system present on each of the live computers having open ports. As will be described in more detail below, the method sends two or more (preferably three) RFC compliant TCP packets to the target computers. The TCP packets have predetermined data in at least one selected field. Each target computer responds to each of the TCP packets. The response information from each computer is treated as a "fingerprint" for each computer. The fingerprint from each computer is compared with fingerprints in fingerprint database 352, and the results of the comparisons are used to identify the target computers with high degrees of accuracy.

After completing the operating system identification routine 350 for the target computers, the method proceeds to a traceroute routine that begins in a block 354. In the traceroute routine, the method first performs an ICMP traceroute routine 356 in which the method uses ICMP tracerouting techniques, described in more detail below. In particular, the method sends a plurality of ICMP echo request packets to the target computer with varying TTL (time to live) values in the TCP/IP header. The method creates a network topology based on the known TTL value, the number of "hops" between the system and the target computer, and the router/host at each "hop." The information from the ICMP traceroute routine 356 is added to a network map database 358. When all packets sent have either arrived, failed to arrive, or timed out, the traceroute step is completed for that target computer. The ICMP traceroute steps are repeated until a complete trace is received or a selected predetermined maximum number of passes is completed.

After completing the predetermined number of ICMP traceroute passes, the method proceeds to a decision routine 360 wherein the method determines whether the trace of the target computer is complete or incomplete. If the trace is incomplete, the method proceed to a TCP traceroute routine 362. Otherwise, the method bypasses the TCP traceroute routine and proceeds directly to a vulnerability assessment routine 364.

As described in more detail below, the TCP traceroute routine 362 works similarly to ICMP traceroute routine 354, except that TCP SYN packets are sent to the target computers. As with ICMP tracerouting, the TTL value in each SYN packet is incrementally increased, and the return of ICMP unreachable packets and SYN ACK packets is monitored for all "hops" between the scanning system and the target host. Through the combination of ICMP tracerouting and TCP tracerouting, a complete map to each target computer, and collectively a relatively complete map of the target network topology is advantageously created and stored in the network map database 358.

After completing the TCP traceroute routine 362, the method proceeds to the vulnerability assessment routine 364. As described in more detail below, in the vulnerability assessment routine 364, the method executes vulnerability scripts that apply known vulnerabilities to open ports of the live target computers to determine whether the ports of the target computers exhibit the potential vulnerabilities. The method uses information stored in a known vulnerability database 366 to select the vulnerability scripts to executes for each active port. Information collected from vulnerable target computers is advantageously stored to the target computer database 344.

In one embodiment, the vulnerability assessment routine 364 preferably only performs vulnerability checks associated with the identified operating system and open ports of the target computer as determined by the operating system identification routine 350 and service discovery routine 340. If the operating system is not conclusively identified, typically the routine runs all known vulnerabilities for the open ports of the target computer.

In one embodiment, the method proceeds to an active assessment routine 365. As further described in detail below, the active assessment routine 365 uses information collected from target computers in the vulnerability assessment routine 364 to execute further vulnerability scripts to open ports of the live target computers. Specifically, the active assessment routine 365 reuses known vulnerabilities and information collected from target computers to continue to determine whether the ports of the target computers exhibit potential vulnerabilities, using information from the known vulnerability database 366 and information collected in the target computer database 344.

After completing the active assessment routine 365, the method proceeds to a decision routine 368 to determine whether the method has analyzed all the potential target computers. In particular, in the decision routine 368, the method determines whether the last batch of IP address has been analyzed. If further batches of target computers remain to be analyzed, the method proceeds to the routine 314 to obtain the next batch of IP addresses. Otherwise, the method proceeds to a scoring routine 370.

In the scoring routine 370, described in more detail below, the method establishes a vulnerability score for each target computer and for the network based on the results of the active assessment and based on the vulnerability information in the known vulnerability database 366. The method then proceeds to a reporting routine 372, also described in more detail below, wherein the method reports the results of the scanning, active assessment and scoring.

The method can be advantageously repeated continuously on a target network, and can be scheduled into pre-determined scanning window time periods for execution of the method over time. For example, in preferred embodiments, the method is scheduled to scan during off-peak hours when the network is less likely to be less heavily used In particularly preferred embodiments, the method is interruptible at the end of a window of off-peak hours and resumes where it paused at the beginning of the next off-peak window. In particularly advantageous embodiments, the method operates on multiple target networks concurrently by threading to share network resources.

II. Non-Destructive Operating System Identification

Vulnerability of and access to a target computer may be heightened by knowing which particular operating system is running on the computer. Identifying a target computer's operating system can be accomplished by examining the operating system's response to a data packet it receives over the network. The forms of the packets and the responses to the packets are generated in accordance with network protocols. The written definitions of the protocols used for communications on the Internet are set forth in Internet Request for Comment (RFC) documents. For example, the TCP/IP protocol is defined in part in RFC 793, incorporated herein by reference, and contains a standard model for TCP packet communications over a network. While virtually every operating system includes a TCP/IP stack, each TCP/IP stack is implemented in a slightly different manner. Thus, known responses from a TCP/IP stack unique to a particular operating system can serve as a "fingerprint" to determine the target computer's actual operating system.

Operating system detection traditionally has been performed by sending out a combination of RFC-compliant and non-RFC compliant TCP packets. The traditional system then collects the unique, non-standard response from the target computer and maps the response to a known database of TCP/IP stacks and related operating systems. However, this method tends to be inaccurate, highly dependent on the particular packet shape and TCP/IP stack of the target computer, and requires a large number of packets to identify the target operating system with any degree of reliability. This method may trigger security or firewall alarms at the target computer, and, more seriously, this method may interfere with or actually crash the target computer, in large part due to the non-RFC compliant packets sent to the target.

The present system typically employs a unique set of new features to maximize the accuracy of operating system detection while minimizing intrusiveness and interference with operations of the target computer. In one embodiment, the invention sends RFC-compliant TCP "SYN" (synchronization) packets to a target computer. The use of RFC-compliant TCP packets advantageously reduces the probability that the detection packets are blocked by a router or firewall, and greatly reduces the probability that the detection packets will cause damage or crashes at the target computer. In one particularly preferred embodiment, the invention uses just three RFC-compliant TCP packets. Thus, network strain is significantly reduced during detection of the operating systems of a large number of target computers on a target network.

In one embodiment, the first packet sent is a completely standard TCP SYN to an open port on the target computer. The MSS (maximum segment size) option in the options field of the first packet is set to 0 (i.e., no bits set in the MSS option). See FIG. 5. When an acknowledgement packet, a SYN ACK packet, is received by the detection system from the target computer, certain bits from the packet are saved by the system. In one embodiment, for example, the TCP advertised window, TTL (time-to-live), options, flags, and the DF (don't fragment) fields are saved to a first fingerprint.

In this embodiment, a second packet is then sent. The second TCP SYN packet is again a standard TCP SYN packet; however, the MSS option is set to 128 in the second packet (corresponding to the setting of a single bit in the MSS option). Portions of the response SYN ACK from the target computer (preferably the TCP advertised window, TTL, and DF bits) are again saved to a second fingerprint. Finally, a third TCP SYN packet is sent. The third packet is also a standard TCP SYN packet; however, the MSS option is set to 384 in the third packet (corresponding to the setting of two bits in the MSS option). Again, portions of the response SYN ACK from the target computer (preferably the TCP advertised window, TTL, and DF bits) are once again saved to a third fingerprint.

In one embodiment, the fingerprint is saved in the following format:

$AW_{MSS=0}:AW_{MSS=328}:AW_{MSS=384}:TTL:DF:OS$ where, for example,

AW=TCP advertised window
MSS=TCP Options Maximum Segment Size
TTL=TCP Options Time to Live
DF=TCP Options Don't Fragment Flag, and
OS=Operating System identification.

In another embodiment, the fingerprint is saved in the following format: $AW_{MSS=0}:AW_{MSS=128}:AW_{MSS=384}:OPT_{MSS=384}:OPT_{MSS=0}:OPT_{MSS=128}:TTL:DF:FL:OS$ where, for example, OPT=TCP Options Bytes, and
FL=TCP Flags.

The fingerprints are then compared to a known database of fingerprints associated with various operating systems and operating system versions. Known fingerprints can be compiled through application of the above methodology to various target computers known to have a particular operating system before testing. For example, testing of known computers running various versions of the Solaris® operating system provide the following operating system fingerprints:

advantageously regularly updated to account for patches, version changes, and new operating systems. The fingerprint style shown above is only one embodiment of such a database, and any efficient method to store the operating system fingerprint can be used, based upon the TCP options altered, number of packets typically sent to a target computer, other TCP fields stored for recognition, and identification field used to represent a particular operating system and version, and the like. In one example, a unique data string for a particular operating system is compressed and stored using a digest algorithm such as MD5, and the like. For further example, perfect matching of fingerprints is not required: a system may employ a percentage match, such as, for example, 90% similarity between two fingerprints, as sufficient to identify a target computer as having a particular operating system or at least being in particular family of operating systems.

Below is an example exchange of packets when performing an OS identification. Three standard TCP SYN packets are sent to the remote host. The first packet is a SYN packet with no data and no IP or TCP options. Packet 2 is also a TCP SYN packet but a TCP Maximum Segment Size of 128 in the TCP options field is set. The third and final packet is again a TCP SYN packet but a TCP Maximum Segment Size of 384 is set in the TCP options field.

As noted above, by analyzing the replies from the 3 packets, a fingerprint is assembled that appears in a textual format as follows:

window1:window2:window3:options1:options2:options3:ttl:dontfrag:flags where, window1=is the TCP window size received from the 1st response
window2=is the TCP window size received from the 2nd response
window3 is the TCP window size received from the 3rd response
options1=the option bytes received from the 1st response
options2=the option bytes received from the 2nd response
options3=the option bytes received from the 3rd response
ttl=is the IP TTL field from the 1st response
dontfrag=is the IP dontFragment bit from the 1st response, and
flags=are single character representations of the TCP flags from 1st response.

In the example TCP packets shown below, the resultant fingerprint looks like this:

40E8:4000:4080:020405134:020405 B4:020405B4:80:1:SA-

TABLE 2

Sample OS Fingerprints for Solaris and BSD operating systems

| $AW_0$ | $AW_{128}$ | $AW_{384}$ | $OPT_0$ | $OPT_{128}$ | $OPT_{384}$ | TTL | DF | Flags | OS |
|---|---|---|---|---|---|---|---|---|---|
| 83E8 | 8380 | 8400 | 02040218 | 02040080 | 02040180 | FF | 0 | SA-- | Solaris 2.6 |
| 6050 | 6000 | 6000 | 02040564 | 02040564 | 02040564 | 40 | 0 | SA-- | Solaris 2.7 |
| 6050 | 6000 | 6000 | 020405B4 | 020405B4 | 020405B4 | 40 | 0 | SA-- | Solaris 8 |
| 4000 | 4000 | 4080 | — | — | — | 64 | 0 | — | OpenBSD 2.x |
| 4000 | 4000 | 4000 | — | — | — | 64 | 0 | — | NetBSD 1.4.2 |

While more than one OS fingerprint may be associated with each operating system, collisions between fingerprints of distinct operating systems have been found to be highly unlikely. Tables can be compiled for other operating systems similar to that shown in Table 2. As operating system versions and popularity change over time, the fingerprint database is From this, the fingerprint is compared to a database of known operating system fingerprints in order to find the closest match that will identify the remote operating system. In this example, three example TCP packets sent and three example TCP packets returned are shown below:

```
Packet 1 send
TCP
    Source port: 272
    Destination port: 80
    Sequence: 0x01100000 (17825792)
    Acknowledgement: 0x00000000 (0)
    Header length: 0x05 (5) - 20 bytes
    Flags: SYN
        URG: 0
        ACK: 0
        PSH: 0
        RST: 0
        SYN: 1
        FIN: 0
    Window: 0x0040 (64)
    Checksum: 0x4518 (17688) - correct
    Urgent Pointer: 0x0000 (0)
    TCP Options: None
    Data length: 0x0 (0)
-----
Packet 1 reply
TCP
    Source port: 80
    Destination port: 272
    Sequence: 0x659A2C81 (1704602753)
    Acknowledgement: 0x01100001 (17825793)
    Header length: 0x06 (6) - 24 bytes
    Flags: SYN ACK
    URG: 0
    ACK: 1
    PSH: 0
    RST: 0
    SYN: 1
    FIN: 0
    Window: 0xE840 (59456)
    Checksum: 0x9A47 (39495) - correct
    Urgent Pointer: 0x0000 (0)
    TCP Options
        Maximum Segment Size: 0x5B4 (1460)
    Data length: 0x0 (0)
-----
Packet 2 send
TCP
    Source port: 528
    Destination port: 80
    Sequence: 0x03100000 (51380224)
    Acknowledgement: 0x00000000 (0)
    Header length: 0x07 (7) - 28 bytes
    Flags: SYN
    URG: 0
    ACK: 0
    PSH: 0
    RST: 0
    SYN: 1
    FIN: 0
    Window: 0x0040 (64)
    Checksum: 0x1E8A (7818) - correct
    Urgent Pointer: 0x0000 (0)
    TCP Options
        Maximum Segment Size: 0x80 (128)
    Data length: 0x0 (0)
------
Packet 2 reply
TCP
    Source port: 80
    Destination port: 528
    Sequence: 0x659ABB23 (1704639267)
    Acknowledgement: 0x03100001 (51380225)
    Header length: 0x06 (6) - 24 bytes
    Flags: SYN ACK
    URG: 0
    ACK: 1
    PSH: 0
    RST: 0
    SYN: 1
    FIN: 0
    Window: 0x0040 (64)
    Checksum: 0x098D (2445) - correct
    Urgent Pointer: 0x0000 (0)
    TCP Options
        Maximum Segment Size: 0x5B4 (1460)
    Data length: 0x0 (0)
-------
Packet 3 send
TCP
    Source port: 784
    Destination port: 80
    Sequence: 0x05100000 (84934656)
    Acknowledgement: 0x00000000 (0)
    Header length: 0x07 (7) - 28 bytes
    Flags: SYN
        URG: 0
        ACK: 0
        PSH: 0
        RST: 0
        SYN: 1
        FIN: 0
    Window: 0x0040 (64)
    Checksum: 0x1A8A (6794) - correct
    Urgent Pointer: 0x0000 (0)
    TCP Options
        Maximum Segment Size: 0x180 (384)
    Data length: 0x0 (0)
----------
Packet 3 reply
TCP
    Source port: 80
    Destination port: 784
    Sequence: 0x659B732B (1704686379)
    Acknowledgement: 0x05100001 (84934657)
    Header length: 0x06 (6) - 24 bytes
    Flags: SYN ACK
        URG: 0
        ACK: 1
        PSH: 0
        RST: 0
        SYN: 1
        FIN: 0
    Window: 0x8040 (32832)
    Checksum: 0x4E04 (19972) - correct
    Urgent Pointer: 0x0000 (0)
    TCP Options
        Maximum Segment Size: 0x5B4 (1460)
    Data length: 0x0 (0)
------------
```

While any number of iterations of the fingerprints described above can be derived for a target computer, it has been determined that three fingerprints provide the most accurate identification of operating system without undue repetitiveness. Similarly, while other TCP options flags may be altered to detect target operating systems, it has been found that alteration of the TCP advertised window, over a plurality of test SYN packets, is most effective, preferably with three test SYN packets with TCP option MSS values of 0, 128 and 384 respectively. Furthermore, alteration of the MSS value in the TCP advertised window is also less likely to interfere with target computer operation than alteration of other values in the packets.

Figure 4:
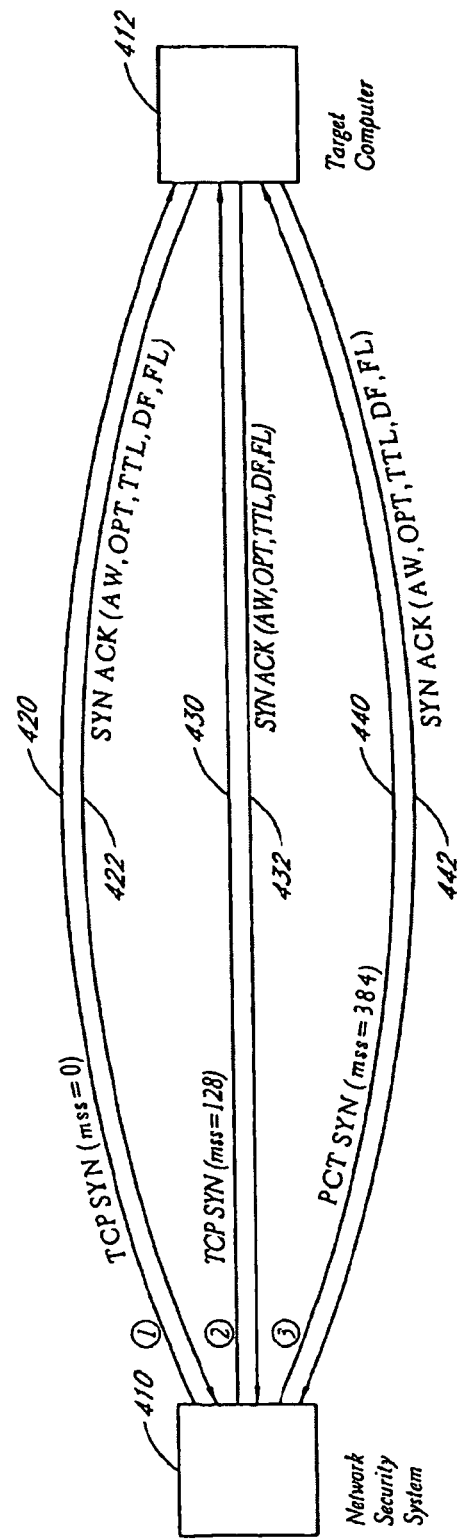
FIG. 4 illustrates one embodiment of the operating system identification method.

The foregoing operating system identification method is summarized in FIG. 4. As described above, in accordance with the method of FIG. 4, a network security system 410 first sends a first RFC compliant TCP SYN packet to a target computer 412 via a first packet transmission represented by a line 420. The first TCP SYN packet has the TCP Options Maximum Segment Size (MSS) set to a value of 0 (i.e., all bits cleared). The target computer 412 responds to the first TCP SYN packet with a first SYN ACK packet represented by a line 422. As discussed above, at least a portion of the information included in the first SYN ACK packet received from the target computer 412 is determined by data in the TCP/IP stack within the target computer 412, and the data is determined, at least in part, by the particular operating system running on the target computer 412.

The network security system 410 next sends a second RFC compliant TCP SYN packet to a target computer 412 via a second packet transmission represented by a line 430. The first TCP SYN packet has the TCP Options Maximum Segment Size (MSS) set to a value of 128 (i.e., bit 7 set). The target computer 412 responds to the second TCP SYN packet with a second SYN ACK packet represented by a line 432. As discussed above, at least a portion of the information included in the second SYN ACK packet received from the target computer 412 is also determined by data in the TCP/IP stack within the target computer 412, and the data is determined, at least in part, by the particular operating system running on the target computer 412.

Preferably, the network security system 410 next sends a third RFC compliant TCP SYN packet to a target computer 412 via a third packet transmission represented by a line 440. The first TCP SYN packet has the TCP Options Maximum Segment Size (MSS) set to a value of 384 (i.e., bits 7 and 8 set). The target computer 412 responds to the third TCP SYN packet with a third SYN ACK packet represented by a line 442. As discussed above, at least a portion of the information included in the third SYN ACK packet received from the target computer 412 is also determined by data in the TCP/IP stack within the target computer 412, and the data is determined, at least in part, by the particular operating system running on the target computer 412.

Together, the information in the three SYN ACK packets received by the network security system 410 from the target computer 412 in response to the TCP SYN packets comprise a fingerprint that is compared with the fingerprint database 352 described above in connection with FIG. 3.

Figure 5:
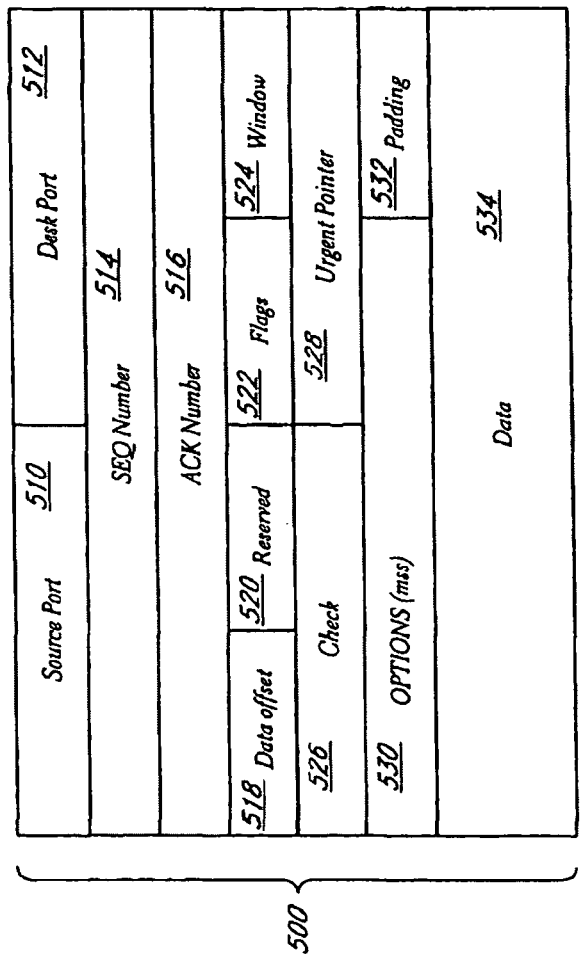
FIG. 5 illustrates one example embodiment of the TCP SYN packet used in the operating system identification method of FIG. 3.

FIG. 5 illustrates one example embodiment of the TCP SYN packet 500 used in the operating system identification method of FIG. 3. On a higher (IP) level, the packet typically provides source and destination Internet Protocol addresses and unique network addresses (not shown). On the TCP level, the packet includes the source port 510 from which the packet was sent, and the destination port 512 on the target computer to which the packet is destined. The 32 bit sequence number 514 describes the starting point of the data contained in the packet in the data window, and the 32 bit acknowledgement number 516 contains the last byte received by the target computer. Data offset 518 and a reserved section 520 are also part of the packet.

The TCP flags 522 denote important information about the packet. In particular, SYN denotes the first packet in a new stream, and space in the sequences 514 and 516 is typically reserved for SYN flags besides the single bit in the TCP flags region 522. The window 524 describes how much data may be transferred into the buffer at one of the end point computers in the TCP packet communication. The checksum 526 and urgent pointer 528 are included. The TCP options 530 typically include a maximum segment size. After packet padding 532, the actual data 534 carried by the packet is attached.

III. Multi-Tier Port Scanning for Target Computer Identification and Target Port Identification Port scanning is an essential tool for ensuring network security. Typically, a would-be intruder will apply a port scanner to a chosen target computer to attempt to find open ports. Through these open ports, the intruder may hope to obtain access to the target computer through known or unknown vulnerabilities. In the network security context, applying an ordinary port scanner to all $2^{16}$ (65,536) ports on each target computer on a target network may significantly drain network resources, take an impracticable amount of time, and not provide an accurate accounting of actual vulnerabilities of target computers.

In one embodiment, the present system employs an iterated port scanning system with at least two phases of operation: host discovery and service discovery. For a particular set of IP address ranges in the target network (the "scan list"), host discovery determines which IP addresses represent live target computers (i.e., computers that respond to network packets) and adds each such address to the "live list" determines which IP addresses represent computers that are partially responsive, as discussed below, and adds each such address to the "potentially live list;" and determines which IP addresses represent computers that are non-responsive, and adds each such address to the "dead list." In the service scan, each target computer reported as live in the host discovery phase is subjected to scanning of a known set of ports likely to be open to traffic.

A. Host Discovery

As described in more detail below, the host discovery phase applies one, two or three distinct tests to each IP address on the scan list. Preferably, the scan list is scanned in batches, where each batch of IP addresses is scanned in parallel (as described in more detail below) to identify host computers (i.e., live target computers).

i. First Test (ICMP Ping Request)

In a first host discovery test, a standard ICMP ping request is sent to each target computer. If a response is received, the target computer is removed from the scan list and placed on the live list. In one embodiment, this entails sending out an ICMP echo request packet to each host. Multiple ICMP packets can advantageously be sent out in parallel to more than one IP address in a batch. Typically, the system waits until an ICMP echo reply is received from all IP addresses in the batch or the ICMP echo request is timed out. As a result of this process, for each batch of IP addresses on the scan list, a list of IP addresses that responded to the ICMP echo request is removed from the scan list and placed on the live list.

ii. Second Test (Sending TCP Packets)

If no response is received from one or more IP addresses on the list in the first test, a set of TCP packets (either single SYN packets or full TCP connection sequences ("TCP full connect")) are sent to the remaining target computers in the scan list as a second host discovery test. Specifically, a list of "TCP discovery ports" is selected in one embodiment. The selection is based on the TCP ports that are most likely to be open. The TCP discovery port list is advantageously relatively short, and preferably includes well known service ports such as HTTP (hypertext transfer protocol), SMTP (simple mail transfer protocol) and the like. One non-exclusive example embodiment of a TCP host discovery list is shown in Table 3.

TABLE 3

Sample TCP Discovery List

| Service | Port |
|---|---|
| FTP | 21 |
| SSH | 22 |
| Telnet | 23 |
| SMTP | 25 |
| HTTP | 80, 81, 8000 |
| POP3 | 110 |
| NetBIOS | 139 |
| SSL/HTTPS | 443 |
| PPTP | 1723 |

Other common ports can be added or removed from the list, and the list, for example, can be tailored to specific network environments where certain ports are more likely to be in use than others. In this example, File Transfer Protocol (FTP), Secure Shell (SSH), Telnet, Simple Mail Transfer Protocol (SMTP), HyperText Transfer Protocol (HTTP), Post Office Protocol (POP3), NetBios, Secure Sockets Layer (SSL), and Point-to-Point Tunneling Protocol (PPTP) are advantageously used.

In one embodiment, a standard TCP SYN packet is sent to some or all of the ports on the TCP host discovery list for each target IP address (target computer.) As with the prior ICMP ping test, multiple IP addresses are advantageously tested in parallel (i.e., in batches) in a preferred embodiment. If a target computer responds with a TCP SYN ACK, then the target computer is added to the live list. Otherwise, the TCP SYN request to the target times out (i.e., a maximum time period passes without a response from the target computer).

In an alternative embodiment of the TCP scan test, a standard TCP full connect request initiated using the standard Window® Winsock interface. If the operating system confirms that a TCP three-way handshake has been completed, then the target computer is added to the live list. If the target responds with a TCP RST ACK, an ambiguous response, the target computer is added to the "potentially live" list. Otherwise, the TCP request to the target times out.

The foregoing tests result in a list of live target computers (IP addresses) on the live list. The target computers on the live list are removed from the scan list. If there are any IP addresses that have not been confirmed on the "live list" or "potentially live list," then a third step of scanning selected UDP ports on the target computer is performed for IP addresses remaining on the scan list.

iii. Third Test (Intelligent UDP Port Scanning)

If any IP addresses (i.e., target computers) remain on the scan list after the first two tests, then a third test of intelligent UDP port scanning is performed on the remaining addresses. As described below, intelligent UDP port scanning differs from traditional scanning of UDP ports, which is notoriously inaccurate. When scanning TCP ports, a response from the target computer signals that the target port on the target computer is open. In contrast, while scanning UDP ports, no response from the target computer signals that the target port is open, and a response (an ICMP error message) will only be sent if the UDP port scanned is closed. The traditional method of scanning UDP ports thus results in a significant number of "false positives" where a UDP scan results in no response (suggesting an open port), but the UDP port scanned is actually closed. This may happen, for example, when a firewall or router blocks the ICMP error message from returning from the target computer or when the ICMP error message is simply lost while returning from the target computer. Over thousands of tests, such errors become likely.

Sometimes, in order to "force" a response from the target computer, an intruder may send a malformed packet to a target port. While this known technique increases the likelihood that an open UDP port on the target computer can be identified, this technique also substantially increases the likelihood that the malformed packet could damage the target computer. Also, firewalls or routers may detect and filter out malformed packets, and such packets can alert the target network of an attempted security breach.

The intelligent UDP port scanning test in accordance with this embodiment of the present invention employs an efficient, less intrusive and more accurate method for scanning UDP ports on a target computer. As with TCP scanning, a UDP host discovery list of commonly used UDP ports is created.

An example of an LOP discovery list is shown in Table 4.

TABLE 4

Sample UDP Host Discovery List

| Service | Port |
|---|---|
| DNS | 53 |
| DHCP | 67 |
| BootP | 69 |
| NTP | 123 |
| NetBIOS File/Printer Sharing | |
| RPC | 137 |
| Pipes | |
| WINS Proxy | |
| SNMP | 161 |
| IKE | 500 |

Unlike the data in traditional UDP port detection packets, the data contained within the UDP packets sent in accordance with the present invention are specifically designed to prompt a reply from the scanned host (i.e., target computer) based on knowledge of a service typically associated with the UDP port. If no information is available about the UDP port, standard data (for example, the data representing a simple ASCII character return or control character) are placed in a UDP packet. In one embodiment, an exemplary UDP data probe packet is designed to solicit a response from a NetBIOS name service that typically runs on UDP protocol at port 137. An exemplary UDP data probe for UDP port 137 is shown in Table 5. In this case, the probe is advantageously a NetBIOS node status request, which typically results in a known response from the UDP port.

TABLE 5

Sample UDP Data Probe

| Service | Port | Data probe (hex) |
|---|---|---|
| NetBIOS | 137 | A2 48 00 00 00 01 00 00 00 00 00 00 20 43 4B 41 41 41 41 41 41 41 41 41 41 41 41 41 41 41 41 41 41 41 41 41 41 41 41 41 41 41 41 00 00 21 00 01 — — — — |

Similar UDP data probe packets can be created for other UDP ports known to be associated with certain services, based on publicly known information in Internet Requests For Comment (RFCs), published specifications on private standards, analysis and monitoring of traffic on known ports, or well-established reverse engineering techniques. Particular protocols and particular UDP ports are subject to substantial change over time, due to changes in standards, technology, operating system, and the like. Preferably, when a data probe from a known protocol is not available for a certain UDP port, standard UDP packets with data representing at least one simple ASCII carriage return are sent.

As with TCP port scanning, multiple UDP ports can be advantageously scanned in parallel. Typically, the system sends a UDP data probe packet to a set of UDP ports on each target computer. The system waits until a UDP data reply is received from one or more target computers or until the packets sent have "timed out." If an ICMP unreachable reply is received, the hosts added to the "potentially live" list. Only those target computer IP addresses not yet determined to correspond to live or potentially live target computers alter employing ICMP, TCP and UDP scanning are left on the scan list.

The three-step discovery phase, employing ICMP, TCP and UDP scanning steps, optionally is applied multiple times to increase the accuracy of identification of live target computers on the target network. In one embodiment, after an initial pass through all three steps, if there are any remaining target computer IP addresses on the scan list that have not been identified on the "live list" or on the "potentially live list," at least the ICMP and TCP steps are repeated a predetermined number of times for those remaining scan list target computers. Optionally, the UDP step may also be repeated. In particularly preferred embodiments, more intensive UDP scanning techniques, employing more ports, different data probe packets or more data packets, can be applied to the target computers remaining on the scan list to provide a more definitive list of live target computers on the network. Alternatively, traditional UDP scanning with malformed packets can be attempted.

One obstacle to the usefulness of UDP scanning is that some target computers will limit the number of ICMP responses sent within a predetermined "response latency" time period, ranging from about 250 milliseconds to about one second. Thus, if a target computer is sent twenty UDP requests to various ports in one response latency period, it may only send one or two ICMP error responses indicating that the ports are closed, even if all twenty ports tested are closed. This results in substantial ambiguity as to UDP port status. In particular, when applying traditional UDP scanning techniques, many "false positives" (i.e., falsely reported open ports) are possible.

The present invention advantageously overcomes the foregoing problem by (1) determining dynamically the latency period of the target computer, and (2) continuing the UDP port scanning of each target port for at least one entire latency period (or until an ICMP error response or UDP data response is received) to ensure that a non-responsive UDP port is actually open and is not simply masked by the response latency. The latency period is determined by selecting a UDP port, preferably one that is known to be closed, and sending UDP datagram requests for a predetermined maximum response latency period (i.e., for a time at least as great as the target computer dead time period (approximately two seconds in particular embodiments)). The time between responsive ICMP error messages or the time between UDP response packets represents the standard latency period. This test can be repeated to confirm the latency period (dead time).

Once the latency period is determined, response validity is ensured by sending UDP requests continuously to the target port for at least the pre-determined latency time or until an ICMP error response or UDP data response is received. If an ICMP error response is received, the port associated with the prompting UDP request may be assumed to be closed. If a UDP data response is received, the associated port may be assumed to be open. If no response is received for the entire latency period, the associated port may be assumed to be open unless a router, firewall or packet loss has interfered with UDP port response.

Figure 6:
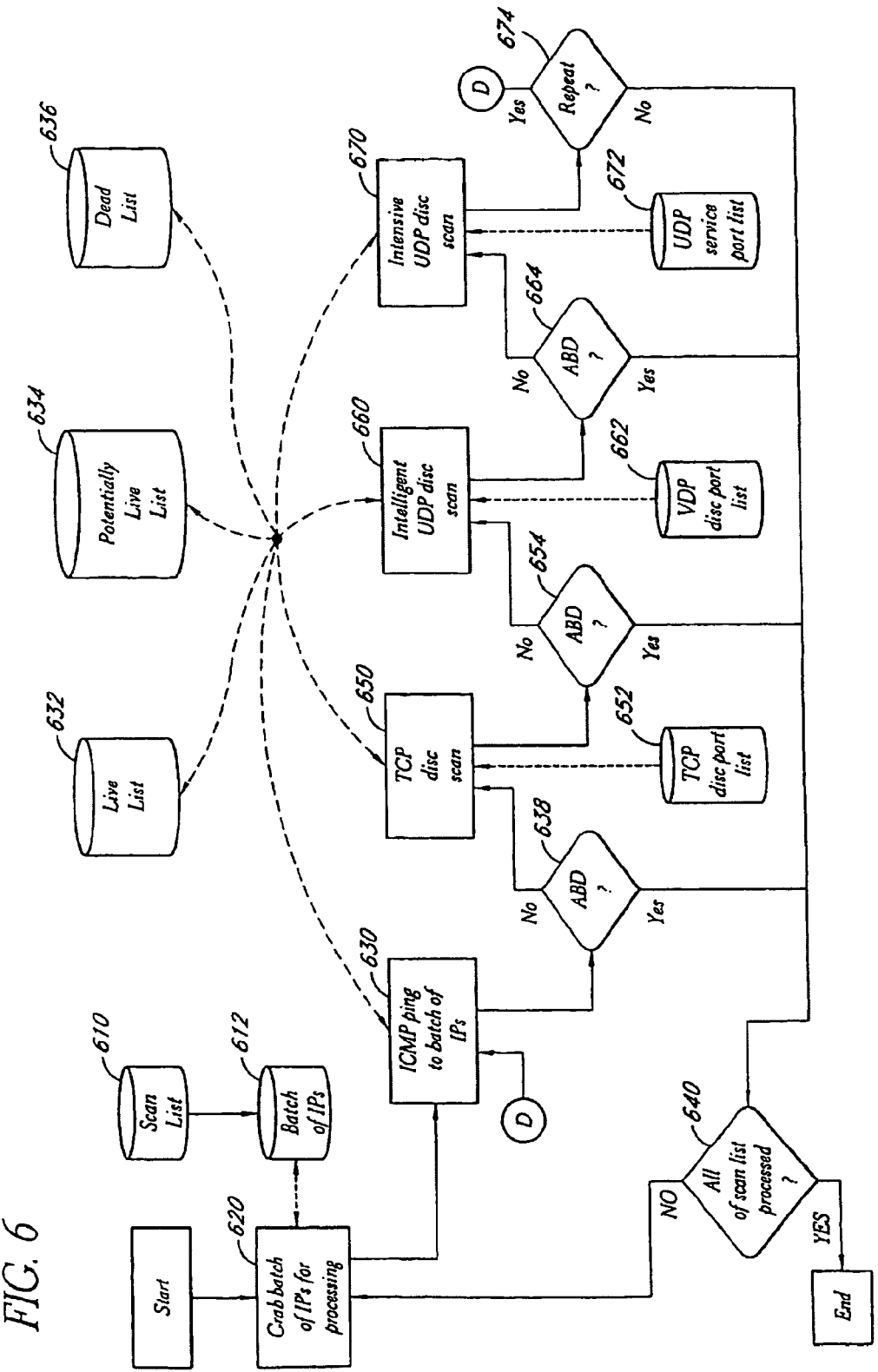
FIG. 6 illustrates one embodiment of first phase scanning to determine what target computers are alive.

The foregoing three-step discovery phase and optional intensive UDP scanning step are illustrated by the process flowchart in FIG. 6. As discussed above and as illustrated in FIG. 6, the discovery phase begins with a scan list 610, which is advantageously parsed into batches of IP addresses 612. In a step 620, a batch of IP addresses is obtained for processing. In a step 630, the ICMP ping test is performed as discussed above. Depending on the outcome of the test, each IP address is added to a live list 632 or remains in the present batch of IP addresses 612. As illustrated, the process also operates with a potentially live list 634 and a dead list 636.

After performing the ICMP ping test, the process determines, in a decision step 638, whether any of the IP addresses in the current batch have not been added to the live list. If no IP addresses remain, the process proceeds to a decision step 640 where the process determines whether all batches of IP addresses have been scanned. If batches of IP addresses remain, the process returns to the step 620 and obtains a new batch of IP addresses. Otherwise, the process ends.

If, in the decision step 638, the process determines that one or more IP addresses have not been added to the live list, the process proceeds to a step 650 where the TCP discovery scan described above is performed using a TCP discovery port list 652. IP addresses are added to the live list 632 or to the potentially live list 634 in accordance with the results of the scan. Then, in a decision step 654, the process determines whether any of the IP addresses in the current batch has not been added to the live list or the potentially live list. If no IP addresses remain, the process proceeds to the decision step 640 discussed above.

If, in the decision step 654, the process determines that one or more IP addresses have not been added to the live list or the potentially live list, the process proceeds to a step 660 where the intelligent UDP discovery scan described above is performed using a UDP discovery port list 662. IP addresses are added to the live list 632, the potentially live list 634 or the dead list 636 in accordance with the results of the scan. Then, in a decision step 664, the process determines whether any of the IP addresses of the current batch have not been added to the live list, the potentially live list Or the dead list. If no IP addresses remain, the process proceeds to the decision step 640 discussed above.

If, in the decision step 662, the process determines that one or more IP addresses have not been added to the live list, the potentially live list or the dead list, the process proceeds to a step 670 where the intensive UDP discovery scan described above is performed using a second UDP port list 672, which advantageously includes additional ports to scan. In one embodiment, the second UDP port list 672 is the UDP service port list advantageously described below, but any combination of UDP ports may be used. IP addresses are again added to the live list 632, the potentially live list 634 and the dead list 636 in accordance with the results of the intensive scan. Then, in a decision step 674, the process determines whether the discovery testing needs to be repeated. If all IP addresses have been added to one of the three lists and no IP addresses remain, the process proceeds to the decision step 640 discussed above. If any remaining IP addresses remain that have not been added to one of the lists, then the process determines whether the scanning steps have been performed a predetermined number of times for the current batch of IP addresses. If the steps have been performed a predetermined number of times, the process proceeds to the decision step 640. Otherwise, the process returns to the ICMP ping test 630 to again process the remaining IP addresses.

As discussed above, the intensive UDP discovery scan 670 is optional. If the intensive UDP discovery scan 670 is not included, then the decision step 664 following the intelligent UDP discover scan 660 advantageously includes the additional decision of whether to repeat the scanning process based on whether the scanning process has been performed a predetermined number of times.

B. Service Discovery

In one embodiment, the present invention then proceeds to examine each host (i.e., target computer) in more detail using the live list and optionally using the potentially live list as well. In service discovery, a set of common TCP service ports and a set of common UDP service ports are scanned. The TCP service discovery list and the UDP service discovery list are typically substantially larger than the TCP host discovery list and the UDP host discovery list. Each list typically includes some subset of ports that are commonly used for communications. For example, each list may include anywhere from a few to hundreds of ports. Typically, each list includes ports such as those shown in Table 6 (an exemplary list of default ports publicly reported by Microsoft® for Windows® 2000.) This list is not exhaustive, and changes in technology, protocols, network infrastructure and operating systems frequently change port requirements.

TABLE 6

Example Set of UDP and TCP ports for Service Discovery

| Service | UDP Ports | TCP Ports |
|---|---|---|
| NetBIOS | 138, 137 | |
| Client/Server | | 135 |
| CIFS | 445 | 139, 445 |
| DCOM | 135 | 135 |
| DHCP | | 67, 68, 135 |
| DNS | 53 | 53, 139 |
| Exchange 5.0 | | 135 |
| IMAP | | 143, 993 |
| LDAP | | 389, 636 |
| POP3 | | 110, 995 |
| RPC | | 135, 1500, 2500 |
| SMTP | | 25 |
| NNTP | | 119, 563 |
| File Sharing | 137 | 139 |
| FTP | | 20, 21 |
| HTTP | | 80, 443, 8000, 8080 |
| IIS | | 80 |
| IKE | 500 | |
| IRC | | 531 |
| ISPMOD | | 1234 |
| Kerberos | 88, 464 | 88, 464, 543, 544, 2053 |
| WinNT Login | 137, 138 | 139 |
| Macintosh File Services | | 548 |
| MSN Chat/Messaging | 1801, 3527 | 135, 569, 1801, 2101, 2103, 2105, 6665, 6667 |
| NetMeeting | | 389, 522, 1503, 1720, 1731, 1723 |
| PPTP | | |
| Printer Sharing | 137 | 139 |
| SNTP | 162 | |
| SQL/Pipes/RPC | 137 | 139, 1024-5000, 1433 |
| Telnet/Terminal | | 23, 3389 |
| UNIX Printing | | 515 |
| WINS | 137 | 42, 102, 135, 137 |

Because there are $2^{16}$ (65,536) possible ports on each target computer, the selection of a subset of ports is preferred because time constraints generally preclude scanning of all ports on each target computer, especially on a large network. Similarly, random selection of ports on each target computer is unlikely to be fruitful because an average target computer will run less than a dozen, and in rare cases dozens or hundreds, of services, making the probability of hitting an open port through random selection of a port inefficient and inaccurate.

In accordance with preferred embodiments of the present invention, TCP service discovery uses the large list of TCP service scan polls, a few of which are shown above, and attempts to connect to each target port on each target computer. As with Host Discovery, described above, standard TCP SYN scanning requires waiting for a SYN ACK response from each target port, or TCP "full connect" scanning requires waiting for an operating system message indicating that a three-way handshake between the target computer and scanning system has been completed. Target computers that respond positively to either of these attacks are added to a list of vulnerable computers to undergo vulnerability assessment for each open target port found.

In accordance with preferred embodiments of the present invention, UDP service discovery uses the large list of UDP service scan ports, a few of which are shown above, and attempts to connect to each target port on each target computer. As with Host Discovery, described above, the present invention may advantageously use the improved UDP data probe packets for any port recognized to be commonly associated with a particular service. Alternatively, packets that include data representing standard characters, such as one or more ASCII character returns, may be used. Target computers that respond positively to this attack are added to a list of vulnerable computers to undergo vulnerability assessment for each open target port found. The vulnerabilities used are typically limited to those associated with the operating system of the target computer as discovered by the operating system identification system described previously, and by those vulnerabilities associated with the open ports found on the target computer. If the operating system of the target computer cannot be conclusively identified, then typically all vulnerabilities associated with the open ports found on the target computer during the service discovery system described herein are tested against the target computer.

As with Host Discovery, a more intensive UDP scanning regime can be applied to target computers that do not respond to a simple UDP data probe packet. The more intensive UDP scanning regime advantageously uses, for example, traditional UDP port scanning in combination with the optional latency time resolution described above.

After vulnerability assessment, an optional active assessment of target computers takes place. Active assessment applies knowledge of target computer operating system, open ports, as well as information recovered from the target network during vulnerability assessment, to further test known vulnerabilities against each target computer.

Parallel Processing of Multiple Ports

In one preferred embodiment, the present invention advantageously performs port scanning in "batches," rather than completing serial scanning of individual ports, one after another. This allows small pieces of a large scan to be completed and saved to a database, not requiring the entire results of a large scan to be held in memory all at once. For example, if a class A network is tested, hundreds of millions of ports need to be scanned merely for host discovery. The system may be advantageously adapted to technical limitations in older network equipment to scan ports of computers in a very large target network with multiple, significant IP address ranges. In the event of network or system failure, the system resumes particularly large scans following the last known successfully completed batch.

During a port scanning process, preferred embodiments of the present invention identify small portions or "batches" of the entire scan range of IP addresses, comprising, for example, 64 target computers represented in the scan range. Host discovery begins using a first batch of target computers. When all live hosts in the first batch have been discovered, service discovery of TCP and UDP services is performed on the live hosts in the first batch, along with other testing services such as operating system identification, tracerouting of network topology, and active assessment of vulnerabilities, described herein. When a batch is completed, the results are stored in a vulnerability database. Then, the next batch of 64 target computers are similarly processed, and so on, until the entire scan list has been processed for the target network.

Preferably, a large number of target computers are tested on one or a small number of ports in parallel, rather than a large number of ports being tested on a single or small number of target computer in parallel. Typically the former method prevents undue load on any single target computer, prevents network overload, and reduces the risk of triggering target network security alerts. Occasionally, the later method may be preferred if, for example, a few target computers are selectively singled out for scanning.

More particularly, in one exemplary embodiment, the present invention simultaneously uses a set of 640 packet slots. A pocket slot is an advantageously allocated space in memory that keeps track of a sent packet while waiting for a response or for the packet sent to time-out. Thus, when processing a batch of target computers, up to 640 ICMP request packets can be handled simultaneously, but it will be appreciated that a different number of slots, more or less than 640, may be allocated and used simultaneously. When an ICMP response is received for one of the packets sent, or after the packet has timed-out, the slot allocated for the packet is then reallocated to send a new packet and monitor any response or time-out. Thus, packets can be kept moving at a rapid rate since there is a small average delay between sending of one packet and receipt of a response and/or time out for another packet. It is more than likely, for example, that by the time the $640^{th}$ ICMP request packet has been sent, a response to one of the sent packets will have been received, thereby freeing the associated slot for handling of another packet. A similar methodology applies to the handling of TCP SYN packets, UDP host discovery, and service discovery in general. As those of ordinary skill in the art will appreciate, operating system identification and tracerouting can use similar batched parallel port monitoring. For those processes, the number of slots used is not limited to 640 slots, and can be varied for programming or scanning efficiency.

As an example, one embodiment of the present invention uses a batch size of one hundred target computers for simultaneous scanning. For host discovery, the ICMP scanning process sends 100 ICMP echo requests and monitors responses and time-outs. Because this is less than this embodiment's 640 packet slots, all ICMP request packets can be sent out, and responses or time-outs for all packets can be monitored at the same time. Assuming a TCP host discovery list of 10 TCP ports, the TCP host discovery scanner will ultimately send out 1000 packets (100 target computers×10 ports=1000 packets) to probe all listed ports of all listed computers. In this embodiment, the scanner will initially send out 640 packets in a sequential burst using all 640 packet slots. However, as discussed above, by the time the $640^{th}$ packet is sent, it is probable (depending on time-out settings and how many responses the system receives) that at least one of the 640 packets sent earlier will have generated a response or a time-out, freeing that packet slot for sending one of the remaining 360 packets. By constantly monitoring the receipt of response packets and time-outs, the entire list of target computers can be tested with little wasted time.

Larger batch sizes and more packet slots can be used, but the efficiency of such use depends on how much of the target network comprises live hosts, time-out values, network response time, memory and other system resources, and the like. In general, very large batch sizes take correspondingly longer in the host discovery phase, such that by the time the system begins scanning the discovered hosts in the service scanning phase there is a greater possibility that those target computers may have changed in some way.

Figure 7:
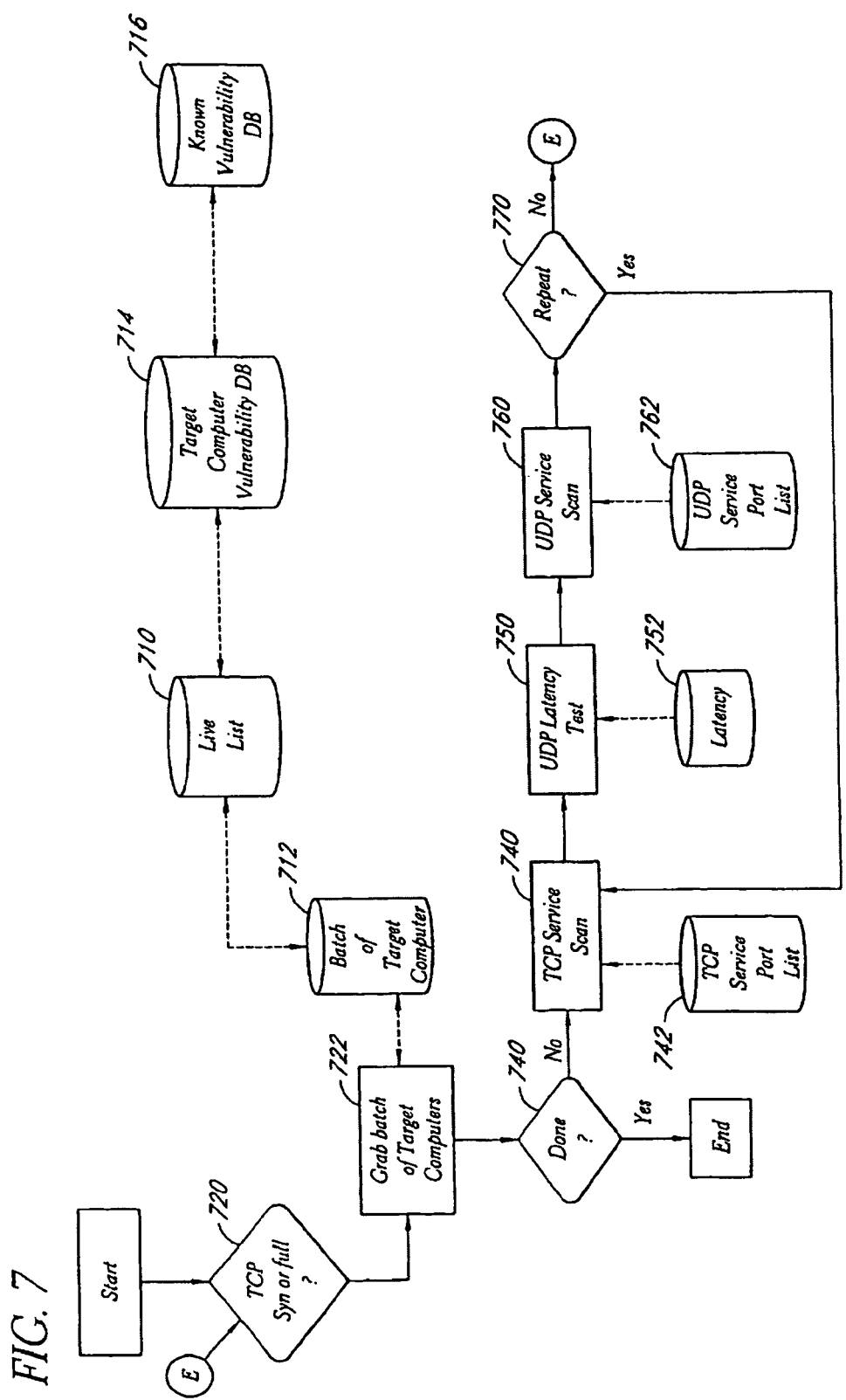
FIG. 7 illustrates one embodiment of second phase scanning to determine what ports are open on a target computer.

The above-described service discovery phase is illustrated by the process flowchart in FIG. 7. The process starts with a live list 710, which advantageously corresponds to the live list 632 generated by the host discovery process illustrated in FIG. 6. The process may also include the potentially live list 634 generated in FIG. 6; however, for ease of explanation, the potentially live list is not shown in FIG. 7. The IP addresses in the live list 710 are advantageously parsed into batches of IP addresses 712. As described below, the process of FIG. 7 operates on a target computer vulnerability database 714 and a known vulnerability database 716.

In a first decision step 720 in FIG. 7, the process determines whether TCP SYN scanning or TCP "full connect" scanning is being performed. As discussed above, the TCP full connect scanning process requires the process to wait for an operating system message indicating that a three-way handshake between the target computer and the scanning system has been established. In the TCP SYN scanning process, the process, waits for a SYN ACK response from each target port, in which case, the target computers can be processed in parallel, as discussed above. In both cases, the process proceeds to a step 722 to obtain a first batch of EP addresses representing a first batch of live (or potentially live) target computers. If TCP full connect scanning is being performed, the process operates on a smaller number of ports on the target computers at one time. The process then proceeds to a decision step 730.

In the decision step 730, the process determines whether all the live target computers have been processed in TCP full connect scanning or whether all the batches of live target computers have been processed in TCP SYN scanning. If all the target computers or all the batches of target computers have been processed, the process ends. Otherwise, the process proceeds to a TCP service scan routine 740 wherein the process uses a TCP service discovery list 742 to identify the TCP service ports to be examined for each target computer. As described above, TCP packets are sent to the identified TCP service ports of each target computer, and the target computer vulnerability database 714 is updated for each target computer in accordance with whether a response is received or is not received from each target computer for each TCP service port scanned and using the known vulnerability database to obtain the vulnerability information for the particular TCP service ports that are determined to be open.

After performing the TCP service scan routine 740, the process proceeds to an optional UDP latency test 750 wherein the latency of each target computer is determined and stored in a latency database 752. The process proceeds from the latency test 750 or directly from the TCP service scan routine 740 to a UDP service scan 760 wherein the process uses a UDP service discovery list 762 to identify the UDP service ports to be examined for each target computer. As described above, UDP packets are sent to the identified UDP service ports of each target computer, and the target computer vulnerability database 714 is updated for each target computer in accordance with whether a response is received or is not received from each target computer for each UDP service port scanned and using the known vulnerability database to obtain the vulnerability information for the particular UDP service ports that are determined to be open.

After completing the UDP service scan routine 760, the process proceeds to a decision step 770 wherein the process determines whether a response has been received from all the scanned service ports. If not, the process determines whether the scanning of the current target computer or batch of target computers has been performed a predetermined number of times. If all the scanned service ports have responded or if the scanning has been performed a predetermined number of times, the process return's to the step 720. Otherwise, the process returns to the TCP service scan routine 740 to scan the service ports that have not responded.

C. Banner Grabbing

"Banner grabbing" is a method of stripping relevant information from packets received from a target computer. In one embodiment, for each target computer in the live list, an attempt is made to perform banner grabbing against each open TCP port and each open UDP port discovered during the service scan phase. If information is successfully obtained from a responsive TCP or UDP packet, this information is stored in a database in association with the target computer from which the information is obtained. The stored information is subsequently used to collect vulnerability information on the target computer, and the vulnerability information is also stored in a database.

For each open TCP port located during the service discovery phase, a TCP data probe is sent to that port if the port is known to be typically associated with a particular service. Thus, for example, when sending a TCP data probe to a target TCP port 80 on a target computer, where TCP port 80 is well known as the common service port for HTTP, the system sends an HTTP-compliant GET request, and strips useful information from any TCP response packet sent back from the target computer. As noted in the above tables, similar commands can be used for other ports with well known services running thereon. The useful information obtained may advantageously be transformed or translated into a readable or processable form (e.g., text) and stored for later reporting.

For each UDP port discovered during the service discovery phase, a similar UDP data probe is sent to each UDP port on the target computer known to be typically associated with a service. Thus, for example, from the foregoing tables, UDP port 137 is known to be associated with a NetBIOS service. In one embodiment, the system sends a NetBIOS Node Status Command, for example, and strips and stores useful information from any response packet sent by the target computer. Again, the information obtained in this manner may advantageously be transformed or translated into a readable or processable form (e.g., text) and stored for later reporting.

IV. Tracerouting

In one embodiment, for each target computer in the live list, an attempt is made to perform an ICMP traceroute between the system and the target computer. If the ICMP traceroute is incomplete, an attempt is made to perform a TCP traceroute between the system and the target computer. Based on the traceroute results for each target computer, a map of the target network topology is created and stored in a database.

Initially, traditional ICMP tracerouting is performed. A number of packets are sent to the target computer with varying TTL (time to live) values in the TCP/IP header, starting with a TTL of 1. If the ICMP echo request packet fails to reach the destination target computer, it will return an ICMP destination unreachable packet containing the IP address of the router/host that the packet was returned from. Packets that arrive at the target computer itself return an ICMP echo reply packet. Based on the known TTL value, the number of "hops" between the system and the target computer, and the router/host at each "hop" can be mapped out. When all packets have arrived or timed out, if there is a router/host and IP address associated with each "hop" between the system and the target computer, the traceroute step is completed for that target computer. The ICMP traceroute is continued for a number of predetermined passes until a complete trace is received or the maximum number of passes is completed. If, after the predetermined number of passes the tracerouting of the target computer is incomplete, then a TCP traceroute is attempted.

TCP tracerouting works similarly to ICMP tracerouting, except TCP SYN packets are used. In some instances, TCP packets are more reliable at completing otherwise incomplete traces, because, for example, ICMP packets are sometimes blocked by firewalls or routers. Typically, the TCP port chosen is taken from the list of open ports discovered for the target computer that is the subject of the traceroute. As with ICMP tracerouting, the TTL value in each SYN packet is incrementally increased, and the return of ICMP unreachable packets and SYN ACK packets is monitored for all "hops" between the scanning system and the target host. Through the combination of ICMP tracerouting and TCP tracerouting, a complete map to each target computer, and collectively a relatively complete map of the target network topology, is advantageously created.

The network maps are an attempt to represent in the most concise way possible the topology of the network as discovered by tracerouting methods. Basically, packets are sent to each discovered host in the scanned network with the Time-To-Live field set to the hopcount at which a packet indicating failure to transmit due to that hopcount will be sent by the machine that is that many hops away from the scanning machine. By increasing the TTL and storing the IPs of the machines that respond until getting a response from the host in question, a string of IPs is built up that represents the machines that led up to that host. The procedure is far from perfect. A machine at a given hop may not respond within the time expected by the tracerouting algorithm, or it may not respond at all if it is a firewall that blocks the traceroute packets. Any approach that can exist must deal with this uncertainty in some way. In one embodiment, any unknowns are assumed to be firewalls.

The algorithm typically employed is presented with a set of discovered hosts and each host includes a IP address that represent what the tracerouting algorithm initially determines are the machines leading up to them. This string may include unknowns which are denoted by 0xFFFFFFFF or 255.255255.255. The algorithm operates as follows:

CONDENSE UNKNOWNS: Condense consecutive unknowns into a single hop with unknown IP address (0xFFFFFFFF). If a traceroute is performed to a given hop and an unknown is received, it is probable that every hop after that will also be unknown because the first unknown bop is a firewall blocking the packets.

UNKNOWN RESOLUTION: Attempt to resolve unknowns by looking through the other routes to see if a route exists with the IP addresses on either side of the unknown in this route that are connected by all known machines. If found, replace the unknown with those machines. This attempts to eliminate spurious unknowns so they are not mislabeled as firewalls. It will not eliminate actual firewalls as they will typically be unknown.

BUILD SET OF NODES: Build up a list of structures (structs) of type ROUTENODE. This is a list in which the IP addresses are guaranteed unique (except for unknowns as detailed later) and represents the set of all IP addresses discovered in the network (i.e., the hosts discovered by the scanning process and the hops leading up to them discovered as by the tracerouting process.) The m_pHost member of each ROUTENODE struct will be NULL if the IP address is not one of the hosts discovered in the scanning process and will point to the host data discovered by that process otherwise. As mentioned, the known machines are unique by IP address. The unknowns are further qualified by the IP address immediately preceding them. As a result, unknowns with the same IP address preceding them are typically considered to be the same firewall and are therefore represented by a single ROUTENODE in the list.

FILL IN CONNECTIONS: Each ROUTENODE struct has a list of ROUTENODE pointers in it which represent the machines that ROUTENODE is directly connected to. The algorithm next fills this in to guarantee that the IP addresses are unique in each list of connections. Note that these pointers point to other ROUTENODE structs in the list (i.e., the list is typically a self contained bunch of data.)

COMPUTE DISTANCE FROM INTERNET: The traceroute information is once again traversed for each host and for each IP address. The corresponding ROUTENODE struct is looked up in the list and the struct's m_nDistFromInternet is set according to the hopcount in the route. This is typically done to represent a maximum hopcount. In other words, the m_nDistFromInternet fields are initialized to 0, and then, if the hopcount in a traceroute IP string is greater, the m_nDistFromInternet is set to that hopcount. For example, an IP address (let it be called "d," for example) may appear in one route as a-b-d and in some other route as a-b-c-d, where "a," "b," and "c" are other IP addresses on the route to the IP address c. When this part of the algorithm completes, d will have m_nDistFromInternet=4. This information is used by the algorithm to know if one machine precedes another. Note that this maximum of discovered hop lengths is a heuristic for the sake of making the problem reasonably computable. It could go awry if a particular machine should be drawn as connected to another machine (because it is directly connected to it) and precedes it in one route, but it is not drawn that way because the machine is in some other route that bumps its m_nDistFromInternet to the same or more than that of the machine it is connected to in the other route. This situation is rare, and this heuristic is typically acceptable.

BUILD ROUTER LIST: The algorithm then traverses the ROUTENODE list in order to build up a list of ROUTER structs. A ROUTER struct contains a pointer to a ROUTENODE believed to be a ROUTER and a list of ROUTENODE pointers that are leaf (end of route) machines it is connected to. A leaf is any ROUTENODE that is directly connected to only one machine (besides itself.) For the purposes of this algorithm, a ROUTER is that machine. This stage of the algorithm builds up a list of ROUTER structs, and, within each ROUTER, builds a list of leaf ROUTENODEs connected to that ROUTER. The algorithm also marks a Boolean field within the ROUTENODEs that are being designated ROUTERS as it will become necessary to know which machines in the ROUTENODE list are routers without wanting to consult the ROUTER list.

Next the refinements to the algorithm are discussed, but first it is useful to discuss how the map would be drawn if the algorithm finished here. At this point, the algorithm has a set of ROUTERs, and within each of those, has the set of leaves connected to that ROUTER. Prior to the refinements about to be detailed, the map renderer would draw each ROUTER as a sphere and all of its leaves as small spheres embedded in a ring in orbit around the ROUTER sphere. The algorithm would then look for other ROUTERs whose m_nDistFromInternet fields are less than this ROUTER's m_nDistFromInternet (i.e., look for a ROUTER that is directly connected to this ROUTER and precedes it.) The algorithm takes the greatest m_nDistFromInternet router that it finds and connects this ROUTER to it visually. If it finds no preceding ROUTERs, it connects this ROUTER to the internet cloud in the center of the map. The refined algorithm still does all that is described above, but typically not before doing a bit more processing.

ROUTER PROMOTION: There are circumstances when the algorithm as it has been detailed thus far would produce a map in which a ROUTER has leaf nodes surrounding it all of which have the same subnet, for example they might all be 149.17.1.xxx. The first 1, 2, or 3 digits (8 bits each) will be the same. That ROUTER has a ROUTER of less m_nDistFromInternet directly connected to it that has exactly 1 leaf node and that leaf node has the same IP address digits in common as all the ones in the first ROUTER's leaf list. In this case, although the traceroute data suggests that the first ROUTER and that single leaf are different machines, they are likely two NICs (Network Interface Cards) on the same machine. Hence, the algorithm "promotes" that ROUTENODE by adding its IP address to the m_InOtherNics member of the first ROUTER's ROUTENODE and then removing it from the other ROUTER's list of leaves and marking that ROUTER's ROUTENODE to be no longer a ROUTER. That ROUTER is also removed from the ROUTER list. On the map then, the ROUTER's primary IP address is represented as usual but now there is a grey bar and the other IP address underneath it. The algorithm supports doing multi-homed ROUTERS and will represent all the IPs that get promoted. The multi-homed case is easily imagined by extending the dual-homed example discussed here.

OTHER TYPE OF ROUTER PROMOTION: The preferred algorithm performs another type of router promotion as well. If exactly one leaf around some ROUTER fulfills a heuristic, it will be promoted to another NIC on the ROUTER. In order to test for the heuristic, the machine needs to be a host discovered during the scanning process because that is where the information comes from. It is noteworthy that most leaves will be discovered hosts. Although the algorithm does not demand this, and traceroute information may produce non-discovered-host hops that only have one thing connected to them and thereby make leaves out of them, since tracerouting is being done to the discovered hosts, the leaves will tend to be discovered hosts. The heuristic is, in one embodiment, as follows: if TCP 2001, 4001, 6001, or 9001 is discovered, or if UDP 520, or both UDP 23 and 79 are discovered, or if the discovered operating system is Cisco, that ROUTENODE is assumed to be a router-IP address and it is promoted (IP address added to the ROUTER's m_InOtherNics and ROUTENODE pointer removed from its leaves).

FIREWALL PROMOTION: Firewall promotion is similar to the router promotion heuristic detailed above. In one embodiment, if exactly one leaf around a firewall satisfies the heuristic then it gets promoted into the firewall's other-NIC list resulting in the map printing "Firewall," but now the known IP address is underneath it separated by the gray bar. The heuristic, in one embodiment, is if TCP 256, 257, 264, 265 is found on a machine then it is assumed to be a firewall.

NUMBER FIREWALLS: This is the last step of the algorithm. The firewalls are sorted in order of the IP address that precedes them and are then numbered so that the map can print "Firewall-1, Firewall-2, . . . , etc." on the report.

In this manner, an entire network map can be relatively accurately stored internally, and translated into a visual representation for reporting.

V. Vulnerability Identification and Active Assessment

For each known TCP port, UDP port, and operating system, the known vulnerabilities for that configuration are stored in a vulnerability database based on vulnerability identification codes. Advantageously, for many vulnerabilities in the vulnerability identification database, a methodology for testing the vulnerability can be written into an automatic script, which will assess the actual weakness of the target system to the suspected vulnerability. In one embodiment, these scripts are prepared in a assessment security scripting language, and are preferably prepared in FASL. FASL is a scripting language based on C++ and Java implementation, in one embodiment. FASL provides an adjustable, automated language for security testing various vulnerabilities. Multiple FASL scripts advantageously may be run in parallel. For example, in one embodiment up to eight simultaneous scripts may be run. Each FASL script, for example, will respond with a success or failure result noting whether the target computer was vulnerable or not to the given vulnerability identification code. The information collected by the FASL script from the target computer, and the success or failure of the attempt, are stored in a database related to the target computer for later reporting, for use in additional vulnerability testing, or for repeating additional testing.

VI. FASL Scripting Language

The implementation of the FASL language is similar in construction to C++. In one embodiment, FASL includes member functions in structure objects, constructors and destructors in structure objects, inheritance in structure objects, arrays of scalar types, new scalar type "binary" and associated functions, string constants that support embedded hex codes including embedded zero bytes, RPCCheck( ) and SMBCheck( ) functions for RPC and Netbios checks, debugMessage( ) on all scalar types that produces hex output on binary type, recursion, function overloading, reference parameters, and support for Active-Assessment In one particular implementation of FASL, all variables are stack variables. In addition to permitting recursion, this also allows a parse tree to be built once and then used to execute the same script by multiple threads. The execution architecture in FASL treats the parse tree as a read-only data structure. Hence, other than considerations such as two instances of the same script attempting to instantiate a Socket on the same target computer IP and port (which should not happen in practice), FASL is completely thread-safe.

A. Scalar Data Types

Scalar data types are those native types in the language that take up one slot on the execution stack. Basically, any variable that can be declared is a scalar type, an army of a scalar type, or an instance of a structure. The scalar types are as follows:

TABLE 7

FASL Data Types

| Scalar Type | Definition |
|---|---|
| void | Function return type |
| int | 64 bit signed integer |
| string | String of printable characters of arbitrary length, terminated by a null |
| Binary | String of arbitrary bytes of arbitrary length, terminated by a null. Type keeps track of its length |
| Char | 8 bit signed integer (interchangeable with int) |
| Boolean | True or false (not interchangeable with int) |

Typically, a string is NULL terminated. This means that internally the string is represented as a string of characters with a zero marking the end. This zero's existence is always implicit, however. In other words, there is no string function that will return you the zero. The length of the string is computed by counting the number of characters up to but not including the zero. This also makes it so that if a constant is assigned to a string of, for example, "this is a string\x0 with stuff beyond the zero." the value of that string will be "this is a siring" and its length will be 16. Type binary typically does not use a zero or any other delimiting character in its internal representation. The string constant example with the embedded zero would have everything after the zero also in the binary.

For example,

```
binary b = "1234";          // length = 4.
string s = "1234";          // length = 4.
binary b = "zzzz\x0ssss";   // value = "zzzz\x0ssss", length = 9.
string s = "zzzz\x0ssss";   // value = "zzzz", length = 4.
```

Types which are equivalent to int (interchangeable in expressions with int) are as follows:

TABLE 8

Additional int-like FASL types

| Type | Description |
|---|---|
| Attack | specifying type of attack |
| Operatingsystem | specifying target OS of a script |
| Protocol | specifying protocol used by a Socket |
| Returnvalue | specifying status of script (script return value) |
| Ipservice | IP type of service |
| Ipoptions | IP options |
| Ipoffset | IP offset |

Keywords that indicate a constant value of a given type are as follows:

TABLE 9

Additional FASL Constants

| Constant Keyword | Value |
|---|---|
| null | 0 (int, char, boolean) |
| true | 1 (boolean) |
| false | 0 (boolean) |

TABLE 9-continued

Additional FASL Constants

| Constant Keyword | Value |
|---|---|

The types above that are equivalent to int also have keywords indicating constant values of those types. They are (respective to above) as follows, for example:

TABLE 10

FASL Type Constants

| Type | Constants |
|---|---|
| attack | ATTACK_UNKNOWN, ATTACK_INTRUSIVE, ATTACK_DOS, ATTACK_NONINTRUSIVE |
| operatingsystem | OS_UNIX, OS_MAC, OS_WINDOWS, OS_UNKNOWN, OS_ROUTER |
| protocol | TCP, UDP, ICMP, IGMP |
| returnvalue | RETURN_SUCCESS, RETURN_FAILURE, RETURN_TIMEOUT |
| ipservice | LOWDELAY, THROUGHPUT, RELIABILITY, MINCOST, CONEXP, ECTCAP |
| ipoptions | EOL, NOP, RR, TS, SECURITY, LSRR, SATID, SSRR, RA |
| ipoffset | RESERVED, DONT, MORE |

B. Statements

A FASL script is typically a list of statements. These statements are generally separated by semicolons. The exception to this rule is that statements that involve blocks (other statement lists enclosed by { and }) do not typically require semicolons to separate them. A semicolon constitutes a valid (empty) statement so it does not hurt anything to put semicolons after statements involving blocks but it accomplishes nothing. A new block represents a new scope. Any variables declared in that scope will be accessible only in that scope, and if they have destructors, those destructors will be called at the end of the scope. Variables can be declared with the same name as variables in scopes that enclose the scope in which they are declared. They will override the variables in the outer scopes which are otherwise accessible to the enclosed scope. Variables of the same name as other variables in the same scope will generate an error however. A statement can be one of the following, each of which will be detailed further below:

Function declaration: A named list of statements with parameters that appear to the list of statements as declared variables in their scope but whose values are copied from expressions or else refer to variables supplied by a function-call which is a type of expression. Function declarations may only occur in the topmost scope of the script.

Structure declaration: A declaration of an entity which can have both data members and member functions. The member functions all have an implicit first parameter which is a reference to the object instance upon which the function is being called.

Variable declaration: A declaration of a variable which then exists in the scope in which it was declared. Variables can be simply declared or as part of their declaration they can be initialized by assigning them to an expression or constructed by supplying constructor parameters in parenthesis after the variable. Note that scalar types have no constructors. On types that do have constructors, the parameter list must match a constructor that exists for that type.

Expression; This can be a function call, a constant value, a variable, a member selection (which is either a member variable or member function), and arithmetic and logical operations on variables, constants, etc.

While loop: This is a control structure that has a block/statementlist/scope that is executed for as long as a given condition (expression) resolves to true.

Repeat loop: This is a control structure that executes its block a given integer amount of times that an expression resolves to.

If statement: This is a control structure that executes a block upon an expression evaluating to true and executes an optional else block if it is false.

For loop: This control structure has 3 lists of expressions separated by semicolons enclosed in parentheses. Within the lists (which can be empty, have one expression, or more than one) if there are more than one expression, they are separated by commas. The first list is executed initially. The next is a condition that must be true for the block to execute (in a list of expressions all must be true), and the last is the iterator list of expressions that gets executed each time through the loop.

Block: Note that many statements own blocks. A block may also exist on its own without being owned by a control statement or function declaration. An unowned block may be coded in circumstances when construction and destruction of something needs to happen at a given point that cannot be accomplished in any of the "normal" scopes.

C. Function Declarations

Functions are declared using the "function" keyword. They are declared as follows:

```
function [<scalar-return-type>] <functionname>(<argument-list>)
{
    <body>
}
```

When a return type is not specified, int is implicitly assumed. The argument-list can be empty (i.e., "function <functionname>( ) . . . ".) Every script typically needs a "function faslmain( )" and will error if one is not found. The function faslmain( ) can be explicitly called from anywhere in the script but if no call to faslmain( ) is found in the topmost scope, a call is implicitly inserted at the end of the script. Functions may be overloaded, such that multiple functions with the same functionname can exist provided their argument-lists are different. The argument-list has the form "<argument>, <argument>, . . . , <argument>". An argument can be the following forms:

Pass by copy. <scalar-type><distinct-variable-name>: Anything the function does to this variable is not reflected in the corresponding expression supplied in the call. The expression can be constant.

Pass by reference. <scalar-type>& <distinct-variable-name>: Anything the function does to this variable is reflected in the corresponding variable supplied in the call. The call must supply an expression that reduces to a variable corresponding to this argument (i.e., only variables or structure member selections that reduce to variables.)

The (possibly empty) <body> consists of a list of statements. If a statement which is "return <expression>" is encountered anywhere in this body, the execution of the function ceases at that point and control is returned to the caller of the function with the value returned being the value that function presents to the expression in which it participates. Functions can be called without using the value they return as well.

For example,

```
function faslmain( )
{
    int   x;
    x = 5;
}
function string DoStringStuff(int x)
{
    return intToString(x);
}
function void DoStringThing(string& s)
{
    s = "the string";
    // DoStringThing(szThing) will set
    // szThing to "the string"
}
```

Variable Declarations

Variable declarations are declared as follows:
<typename><var>(, <var> . . . );
In the case of structures, <typename> is typically expressed as "structure <structurename>" or, alternatively, a structure variable of type "OBJECT" can be declared as "OBJECT o;".

A <var> is one of the following:

<identifier>: This is a simple declaration. If <typename> is a structure and the default (no arguments) constructor exists, it is called.

<identifier>=<initializer expression>: The expression is evaluated and the result assigned to the variable at declaration time. Note that the type returned by the expression must be compatible with <typename>.

<identifier>(<params>): <params> is a comma separated list of expressions. The constructor matching that signature in <typename> is called. Note that <typename> needs to be a structure.

<identifier>[<array-dimension-expression>]; <typename> must indicate a scalar (non-structure) type. The expression must resolve to a constant integer (i.e., no variables or function calls in it). This declares <identifier> to be an array variable of given dimension of <typename>.

For example,

```
OBJECT o;
structure OBJECT o;
OBJECT o(5, 6, "something");
int x = 8, y, z[6 + 7];
```

D. Structure Declarations

Structures are declared using the "structure" keyword. They are declared as follows:

```
structure <structurename> [extends <parentstructurename>]
{
    <member-list>
```

```
};
```

The parameter <member-list> is a possibly empty list of <member>s. A <member> is typically either a function declaration or a variable declaration. The only syntactic difference between these things when used in structure declarations versus not is that member variables cannot have initializer expressions or constructor parameters. Member variables can be arrays however.

When "extends" is used, this structure "inherits" all the members of the parent. Any member functions in this structure that are the same name and signature as one that is in the parent structure will override that parent structure's function.

A "constructor" is a member function that gets called when a structure variable is declared and a "destructor" is a member function that gets called when a variable goes out of scope.

Any member function whose name is <structurename> is a constructor and can have any or no parameters. There can be zero or one member function whose name is ~<structurename> and has no parameters, and this is the destructor. Some subtleties that are not immediately apparent are as follows: If this structure extends an object that has constructors and/or a destructor or has member variables that are structures that have constructors and/or a destructor, then each constructor in this object will implicitly contain a call to the default constructor in the parent and/or owned object(s) and similarly the destructor for this object will have call(s) to destructors of parent/owned object(s). Further, if a parent or owned object has a constructor and/or destructor and this object does not, one will be created in this object for the purpose of calling all the constructors/destructors of parent/owned objects. Constructors and destructors should be declared as "function <structurename> . . . " or "function ~<structurename> . . . " (i.e., no return type.)

Usage of declared structure variables is accomplished with member selection using the "." character. For example:

```
OBJECT o;
o.m__intmember = 5;
o.m__ownedstructuremember.m__x = 8;
o.DoSomething(5, 6, "stuff");
```

E. Expressions

Expressions are variables, function calls, constants, member-selections, and combinations of these things with operators serving as the connectors. For the purposes of this discussion, expressions may be defined recursively, such that, for example, <expression>+<expression> is an expression. In expressions involving operators (assignment, arithmetic, logical, etc.,) it is customary to refer to the expression on the left as the "lvalue" and the expression on the right as the "rvalue." In FASL as most languages, the lvalue and rvalue in any expression must return compatible types (usually the types must be the same but sometimes, as with int and char in FASL, different types can be compatible). Additionally, some operators only work on some types. There is also the notion of operator precedence, meaning that in the absence of overriding parentheses, some operators will be given precedence over others. So for example, 3−5+7 will be evaluated left to right but 3−5*7 will multiply 5 by 7 first and subtract the result from 3. A list of all the operators in order of precedence follows:

Functions and Constants
> function calls: <function-name>([<argument-list>]); <argument-list> is a possibly empty, comma-separated list of expressions. There must be a function somewhere in the script which takes parameters that match the return types of these expressions in the order in which they occur. In the case of functions that take references, the corresponding expression in the <argument-list> of the function call must resolve to a variable (not a constant or arithmetic/logical/relational expression of multiple variables). The type of a function call expression is the return type of its corresponding function declaration.
>
> string constants: "sample string \x3f"; these are string values enclosed in quotes which mostly represent the literal characters that comprise the string. The exceptions to this are the escape characters: "\t" is tab, "\n" is newline, "\r" is carriage return, and "\x[0-9a-fA-F][0-9a-fA-F]*" are embedded hex codes that resolve down to one character. Note the regular expression simply means for example "\x3F-sample" will resolve down to a 47 (0x3F) followed by a followed by a 's,' etc. Any embedded zeros ("\x0") will terminate the string when the constant is used in string expressions, but when used in binary expressions, the total string will get processed to resolve the escape sequences and then converted to type binary. String constants typically have the same precedence as functions.
>
> char constants: For example, 'A'. These are treated the same as string constants, except they are single quotes and single character (which may be represented with escape sequences).
>
> int constants: These can be decimal digits as in "1048576" or a hexadecimal number as in "0x100F."

Unitary Operators
> ++<variable>: increment value of variable and then return its value. Works on int and char.
>
> --<variable>: decrement value of variable and then return its value. Works on int and char.
>
> <variable>++: return value of variable then increment it. Works on int and char.
>
> <variable>--: return value of variable then decrement it. Works on int and char.
>
> -<expression>: negate whatever is returned by <expression> and return that value. Works on int and char.
>
> ~<expression>: flip bits of whatever is returned by <expression> and return that value. Works on int and char.
>
> !<expression>: logical negation of <expression>. Works on boolean.
>
> sizeof(<typename> or <variable>): returns int that is how many stack cells is occupied by the <typename> or <variable>.

Member Select Operator
> <structurevariable>.<member>[.<member> . . . ]: returns whatever type/value the rightmost <member> is.

Power Operator
> <expression>power<expression>: lvalue and rvalue must be int or char. If int and char mixed, promote char to int.

Multiply Operators
> <expression>*<expression>: multiply . . . lvalue and rvalue must be int or char. If int and char are mixed, promote char to int.
>
> <expression>/<expression>: divide . . . lvalue and rvalue must be int or char. If int and char are mixed, promote char to int.
>
> <expression>%<expression>: modulo . . . lvalue and rvalue must be int or char. If int and char are mixed, promote char to int.

Addition Operators
> <expression>+<expression>: add . . . same type rules as multiply operators but also does concatenation of two strings (returns string) or two binaries (returns binary). If one of the expressions is a string constant and the other is a binary variable, the string constant will be considered a binary constant.
>
> <expression>-<expression>: subtract . . . same type rules as multiply operators but also works on strings (not binaries as operator + does). In the case of strings, subtraction removes all substrings from lvalue that match rvalue and returns the resulting string.

Bitwise Operators
> <expression><<<expression>: shift left one bit (effectively multiply by 2). Same type rules as multiply operators.
>
> <expression>>><expression>: shift right one bit (effectively divide by 2 losing remainders). Same type rules as multiply operators. Most significant bit (sign bit) is repeated in next bit over.
>
> <expression>& <expression>: bitwise and. Same type rules as multiply operators.
>
> <expression>|<expression>: bitwise or. Same type rules as multiply operators.
>
> <expression>^<expression>: bitwise exclusive or. Same type rules as multiply operators.

Relational Operators
All of these operators typically return boolean regardless of the types on which they operate (in contrast to most operators which return the same type as that on which they operate). Unless otherwise noted, lvalue and rvalue can be int/char and int/char or string and string. If they are strings then the comparison is alphabetic case sensitive.
> <expression><<expression>: Return true if lvalue is less than rvalue.
>
> <expression><=<expression>: Return true if lvalue is less than or equal to rvalue.
>
> <expression>><expression>: Return true if lvalue is greater than rvalue.
>
> <expression>>=<expression>: Return true if lvalue is greater than or equal to rvalue.
>
> <expression>=<expression>: Return true if lvalue equals rvalue.
>
> <expression>!=<expression>: Return true if lvalue does not equal rvalue.
>
> <expression>in <expression>: This only works on string and binary expressions. Return true if lvalue occurs as a substring/subbinary pattern in rvalue.

Logical Operators
These operators expect lvalue and rvalue to return boolean and the operators return boolean.
> <expression>||<expression>: "or else" . . . if lvalue is true then return true without evaluating rvalue, else return whatever rvalue returns.
>
> <expression>&& <expression>: "and then" . . . if lvalue is false then return false without evaluating rvalue, else return whatever rvalue returns.

Assignment Operators
These operators insist on type compatibility which means equality of types most of the time. Exceptions are: when mixing ints and chars, lvalue type prevails, and when assigning string constants into binary variables the string constant becomes a binary constant. Lvalue and rvalue must resolve to scalar types and lvalue must resolve to a variable.

<expression>=<expression>: Simple assignment: copy rvalue into lvalue.
<expression>*=<expression>:
<expression>/=<expression>:
<expression>%=<expression>:
<expression>+=<expression>:
<expression>-=<expression>:
<expression>>>=<expression>:
<expression><<=<expression>:
<expression>&=<expression>:
<expression>|=<expression>:
<expression>^=<expression>: All the above perform the operator preceding the "=" on the rvalue according to the rules of that operator specified above and then put the result in the lvalue.

Condition al Expression

There is also a construct identical in principle and syntax to the conditional expression in C/C++. Its syntax is:

(<(expression>)?<expression-eval-if-true>:<expression-eval-if-false>;

If the expression in parentheses evaluates to true then the expression after the question mark is executed otherwise the expression after the colon is executed. The expression in parentheses must resolve to boolean and the other two expressions must be type compatible. The return type/value of a conditional expression is the return type/value of the expression that executes after evaluating the conditional expression.

F. Control Structures

While Loops

A while loop is expresses as:

```
while (<expression>)
{
    <statement-list>
}
or,
while (<expression>)
    <statement>;
```

This evaluates <expression> which must return boolean and executes the <statement-list> or <statement> and then reevaluates <expression> for as long as <expression> returns true. If <expression> returns false the first time then the <statement-list> or <statement> is never executed.

Repeat Loops

```
repeat (<expression>)
{
    <statement-list>
}
or,
repeat (<expression>)
    <statement>;
```

This evaluates <expression> once (in contrast to most loop constructs which execute their "iterator" expression each time before executing the block), and it must return an int or char indicating how many times to execute the block. The block is then executed that many times. In case the implications of this are not clear, note that in a while loop, for example, the body of the loop must do something that eventually causes the <expression> to evaluate to false, otherwise the loop goes on forever. But if the repeat loop's block does something that would cause the <expression> to evaluate differently, this makes no difference as the <expression> is only evaluated once before the block is executed. So "v=2; repeat (v) {v=5;}" will not cause an infinite loop. Rather, it will assign 5 to v twice.

If Statements

```
if (<expression>)
{
    <statement-list>
}
or,
if (<expression>)
{
    <statement-list>
}
else
{
    <statement-list>
}
```

For the sake of brevity, all possible options of using a single <statement> instead of {<statement-list>} have not been enumerated, but those options exist. If <expression>, which must resolve to boolean type, evaluates to true then the first block is executed. If it evaluates to false and the else block exists, it is executed, otherwise no block is executed.

For Loops

```
for (<expression-list>; <expression-list>; <expression-list>)
{
    <statement-list>
}
or,
for (<expression-list>; <expression-list>; <expression-list>)
    <statement>;
```

The <expression-list> can be nothing, it can be a single <expression>, or it can be a comma-separated list of expressions. The first <expression-list> gets called initially and can be any mix of expressions as the return values are ignored. The middle <expression-list> is the condition that determines whether the block will be executed and whether the loop will continue to be iterated. All expressions in this list must return boolean and they all must return true in order for the block to be executed. The last <expression-list> can be any mix of expressions and it gets executed after each time the block has been executed.

The classic example is "for (x=0; x<8; x++) {statement-list>}" This will set x to 0, test whether x is less than 8, find that to be true and execute the block, increment x to 1, test whether x is less than 8, find that to be true and execute the block . . . etc. until x is 8 which will cause the condition to be false and loop execution terminates.

G. Native Objects

The grammatical/syntactic elements of one embodiment of the FASL language have been specified above. Notice that these things are sufficient to perform calculations and implement algorithms, but there is nothing about them that allows for things like sending and receiving data over the network and there are certain operations on the scalar types that would be nice to have but are not expressible with the grammar thus far specified. For this reason there exist structures and functions declared in the scope that owns the script scope (a "meta-scope" if you will) that allow access to this functionality. As used herein "Faultline" refers to the overall network security system.

FASL Object

Every script has access to a variable named "FASL" whose type is "FASL_OBJECT." This variable's type is specified as follows:

```
structure FASL_OBJECT
{
private:
    string      m_szName,
                m_szDescription,
                m_szSummary,
                m_szReturnString;
    RETURNVALUE m_eReturnCode;
    int         m_nDefaultPort,
                m_nIPAddress;
    ATTACK      m_eAttackType;
    OPERATINGSYSTEM
                m_eOSMajor,
                m_eOSMinor;
    PROTOCOL    m_eDefaultProtocol;
public:
    function FASL_OBJECT( )
    {
        m_nDefaultPort = 0;
        m_nIPAddress = 0;
        m_szReturnString = "Return string not set."
    }
    function void setScriptName(string s)
    {
        m_szName = s;
    }
    function void setScriptVulnerabilityCode (int nFaultlineID)
    {
        // This sets the vulnerability id as it exists in
        the Faultline database that uniquely
        // identifies the vulnerability being sought by
        the script.
        m_nFaultlineID = nFaultlineID;
    }
    function void setScriptDesc(string s)
    {
        m_szDescription = s;
    }
    function void setScriptSummary(string s)
    {
        m_szSummary = s;
    }
    function void setScriptAttackType(ATTACK e)
    {
        m_eAttackType = e;
    }
    function void setScriptReturn(string szReturnString,
RETURNVALUE eReturnCode)
    {
        m_szReturnString = szReturnString;
        m_eReturnCode = eReturnCode;
    }
    function void addValidPort(int n)
    {
        // When a script successfully compiles, it will
execute all these that it finds
        // in the main scope. It builds a list of ports
on which to run the script.
        m_nValidPort = n;
    }
    function void setScriptPort(int n)
    {
        m_nDefaultPort = n;
    }
    function void setScriptOS(OPERATINGSYSTEM eMajor,
OPERATINGSYSTEM eMinor)
    {
        // When a script successfully compiles, it will
execute all these that it finds
        // in the main scope. It will use this
information to decide whether this script
        // needs to be run on a given host.
        m_eOSMajor = eMajor;
        m_eOSMinor = eMinor;
    }
    function void setScriptProtocol(PROTOCOL e)
    {
        m_eDefaultProtocol = e;
    }
    function int getIPAddress( )
    {
        return m_nIPAddress;
    }
    function int getScriptPort( )
    {
        return m_nDefaultPort;
    }
    function string strTok(string& s, string szDelimiters)
    {
        // Like strtok in UNIX, this skips past any
characters at the beginning of the string
        // that are in szDelimiters. Return the substring
that includes all the leftmost
        // characters up to but not including the next
instance of a character in
        // szDelimiters, or the end of the string
whichever comes first. Remove the
        // returned string from s (note it is a
reference).
        return STRTOK(s, szDelimiters);
    }
};
```

When a script is successfully compiled, all statements of the form "FASL.memberfunction( )" that are in the main scope are executed (and no other statements in the script are executed at this point). The information that these member functions set goes into the script object's data which allows the system to make some intelligent decisions on when and how to run the script. FASL.addValidPort(nPort) can be called any number of times and will result in a list of unique ports being built up. When the system is run, it will either find that FASL.addValidPort(nPort) was not called in the script's main scope in which case the script will be run once per host and FASL.getScriptPort( ) will return 0 within that script. If FASL.addValidPort(nPort) does occur in the main scope of the script, the system will execute the script once for each unique port on a given host, and FASL.getScriptPort( ) will return whatever port the system passes in for that execution. FASL.setScriptOS( ) operates along a similar principle (i.e., by calling it you are requesting that the script be executed only on hosts whose OS has been specifically determined whereas not calling it implies that the script is to be called regardless of OS). Note that calling this multiple times does not make a list of OSes like the addValidPort makes a list of ports. The last call to setScriptOS is the one that gets used.

Upon entry into the script's scope, the m_nIPAddress member of the FASL variable has been set to the IP address of the target machine upon which the FASL script is to run. All network activity that takes place in a FASL script uses this IP address as its destination, hence in the functions and objects about to be specified, the IP address is never a parameter. Calling FASL.setScriptReturn(string, RETURNVALUE) sets the m_szReturnString member which is then printed by the script executor command line application "fasl.exe" upon completion of executing the script. The other calls, most notably setScriptOS( ), set info that is used by Faultline.exe to determine whether or not to run the script on a given host. This is to say, the system will execute only the "FASL.xxx( )" statements in the script, then the system examines the memberdata and decides whether or not to run the whole script on that IP address. In one embodiment, the constructor of FASL_OBJECT is actually not called on the FASL variable. Thus, any variable other than m_nIPAddress is sometimes not be initially set to anything. Structures may be derived from FASL_OBJECT and variables of type FASL_OBJECT may be initialized, in which case that constructor will be called. Note also that the member variables of FASL are not directly accessible by script code (declared as private).

Socket Object

This is a structure declared in the meta-scope but there are no instances declared in the meta-scope as there is with FASL_OBJECT. It is mostly like a normal FASL structure, but the constructor creates a windows TCP or UDP socket depending on what you pass in for the first argument of the constructor and the destructor cleans up that object. The member functions permits data to be sent or received on that socket, assuming it connected properly. The structure is as follows (the data members are omitted as it is not necessary to know them):

```
structure Socket
{
    function Socket(PROTOCOL eProtocol, int nPort)
    {
        // eProtocol is either TCP or UDP and the port is
the IP port.
        // Creates a windows socket object.
    }
    function ~Socket( )
    {
        // Cleans up the Windows socket object associated
with this socket.
    }
    function boolean socketOpen( )
    {
        // Typically must be called before sending or
receiving data for either protocol.
        // if returns false then it could not open the
socket and communication
        // will fail.
    }
    function boolean socketClose( )
    {
        // Close the socket. destructor will do this if
not done here.
    }
    function void BindPort(int nPort)
    {
        // Use when you want specify the source port
explicitly.
        BIND_PORT(nPort);
    }
    function string socketRead(int nBytes, int nTimeout)
    {
        // Read nBytes from Socket... returns empty string
if fail.
    }
    function string socketReadLine(int nBytes, int
nTimeout)
    {
        // Read nBytes or up to end of line whichever
comes first.
        // return empty string on fail.
    }
    function binary socketReadBinary(int nBytes, int
nTimeout)
    {
        // Read nBytes of raw binary data. empty binary on
fail.
    }
    function int socketWrite(string szBuffer, int nLength)
    {
        // Write nLength characters out of szBuffer.
return 0 on fail
        // or number of bytes written on success.
```

```
    }
    function int socketWrite(string szBuffer)
    {
        // Write the entire string (length implicit),
otherwise same as above.
    }
    function int socketWrite(binary bBuffer)
    {
        // Write the binary raw data... length implicit,
otherwise same as above.
    }
};
```

Vulnerability Object for Active Assessment

This object is used for active assessment, and its custom behavior—atypical of general FASL script—is that it knows how to copy itself, and all the data it needs to find itself later, into a global data area where other scripts can access the data, and use the information to attempt to compromise another machine. The object is as follows:

```
structure Vulnerability
{
private:
    int     m_nFaultlineID,
            m_nIPAddrees,
            m_nExploitIPAddress;
    string  m_szDescription;
public:
    function Vulnerability( )
    {
        m_nFaultlineID = 0;
        m_nIPAddress = 0xFFFFFFFF;
        m_szDescription         =           \"Vulnerability
uninitialized.\";
    }
    function void addToExploitableData(
            int nFaultlineID,
            int nIPAddress,
            int nExploitIPAddress,
            string szDescription)
    {
        // This sets all the member variables of this
structure. This function may be
        // called from a derived structure and this
function will know that. It stores the
        // entire contents of the object as well as the
object's typename and size in the
        // global vulnerability data area.
    }
    function boolean getExploitableData(int nIndex)
    {
        //   this   function   searches   the    global
vulnerability
        // data area for the nIndex-the instance of a
variable of the same type as this (this
        // could be and probably will be a derived
structure from Vulnerability) and copies
        // its contents into this object.  If there is no
nIndex-th object, return false and
        // no change to this object's data will have
occurred.
    }
    // Accessor functions. the members of this structure
need to be read only once they
    // have been stored with addToExploitableData( ).
    function int getFaultlineID( )
    {
        return m_nFaultlineID;
    }
    function int getIPAddress( )
    {
        return m_nIPAddress;
```

```
            }
            function int getExploitIPAddress( )
            {
                    return m__nExploitIPAddress;
            }
            function string getDescription( )
            {
                    return m__szDescription;
            }
    };
```

Behind this object is the concept that one script may discover something that another script can use to compromise another machine. Any vulnerability needs the information contained in this base class, in this embodiment. The m_nFaultlineID is the vulnerability id of the vulnerability discovered. The m_nIPAddress is the machine it was discovered on. The m_nExploitIPAddress is the machine on which the data was discovered that proved instrumental in finding this vulnerability. The m_szDescription is what you want to appear in the Active-Assessment report. The m_nExploitIPAddress should typically be set to −1 when no other vulnerability was used to find this vulnerability. When another vulnerability is used, its m_nIPAddress (typically using othervuln.getIPAddress( )) is entered into this vulnerability's m_nExploitIPAddress. This will establish an audit trail which the report can represent graphically.

The general, usage of this is to derive a structure from Vulnerability, (i.e., "structure UnicodeVulnerability {// extra info specific to unicode vuln that can be used by other scripts};"). When a unicode vulnerability is found, for one example, a variable such as "UnicodeVulnerability uv;" is created, and its extra data is set and added via a call to "uv.AddToExploitableData( . . . )." After this call, another script that looks to make use of this particular vulnerability has code resembling the following:

```
    int                                 i;
    UnicodeVulnerability    uv;
    for (i = 0; uv.getExploitableData(i); i++)
    {
            // Attempt to use this data to compromise this host.
            if (succeed at compromising this host)
            {
                    // create a vulnerability representing this host's
    vulnerability that was
                    // found using the UnicodeVulnerability.    Note
    that this vulnerability
                    // may or may not be a UnicodeVulnerability... it
    could be some other
                    // vulnerability.    When you have populated it with
    its specific data, call:
                    newvuln.addToExploitableData(
                            nNewVulnFaultlineID,
                            FASL.getIPAddress( ),
                            uv.getIPAddress( ),
                            "we got this vuln by exploiting Unicode on
    another machine");
            }
    }
```

Debug Messages

There is a function called "debugMessage(<scalar> e)" overloaded for all the scalar types. Mostly it prints what is expected from a debugging system. Int and char print as numbers, boolean prints as "true" or "false", strings print their contents. Binary produces a hex dump output, through debugMessage(binary b), which closely resembles what the MS-DOS DEBUG.EXE "d" option produces. That is, it outputs out lines representing 16 bytes each and the line format is "<0.4 digit hex offset>: <8 2-digit hex numbers separated by space>-<the other 8><16 chars where printable chars are represented as is and non-printable are represented as periods>. For example:

"0060: 67 65 6C 73 20 6C 6F 6F-6B 20 6C 69 6B 65 20 74 gels look like t"

With the functions about to be specified, it is easy to convert other types into strings so you can debugMessage entire expressions . . . i.e. debugMessage("here is what x equals:"+intToString(hex));. There is typically no need to remove or comment out debugMessage calls in scripts that get "signed off," as final as the system execution of scripts will typically ignore the debug output.

String Functions

```
    function string leftTrim(string s)
    {
            // Lops off whitespace up to the first non-whitespace
    character.
    }
    function string, rightTrim(string s)
    {
            // Lops off all trailing whitespace.
    }
    function int stringLength(string s)
    {
            // self-explanatory.
    }
    function string toLower(string s)
    {
            // Makes any characters that are upper-case lower-case.
    }
    function string toUpper(string s)
    {
            // Makes any characters that are lower-case upper-case.
    }
    function int stringToInt(string s)
    {
            // similar to atoi in C.
    }
    function string intToString(int n)
    {
            // i.e 1048576 becomes string "1048576"
    }
    function string intToString(char c)
    {
            // Similar to intToString(int).
    }
    function string intToHexString(int n)
    {
            // i.e. 16383 becomes "3FFF"
    }
    function int hexStringToInt(string s)
    {
            // i.e. "3FFF-blahblahblah" becomes 16383.
    }
    function string intToBinaryString(int n)
    {
            // i.e. 85 becomes "1010101"
    }
    function int binaryStringToInt(string s)
    {
            // i.e. "1010101blahblahblah" becomes 85.
    }
    function string intToIPString(int n)
    {
            i.e. 16777215 becomes "0.255.255.255"
    }
    function string grep(string s1, string s2)
    {
```

-continued

```
        return \"to be implemented\";
}
function int locate(string s1, string s2)
{
        // return 0-based position of s1 in s2 or −1 if s1 not
in s2.
}
function string subString(string s, int nStart, int
nNumChars)
{
        // i.e. subString("one law for the lion and ox is
oppression", 4, 3) = "law"
        // it is smart about boundries... if you ask for more
characters than exist
        // you only get the ones that exist.
}
function string garbageString(char c, int nLength)
{
        // i.e. garbageString('A', 7) = "AAAAAAA"
}
function string garbageString(int nLength)
{
        // return string of nLength length whose characters are
random
        // upper and lower case alphanumerics.
}
----------
```

Binary Functions:

```
----------------
function int binaryLength(binary b)
{
        // self-explanatory.
}
function char binaryNthByte(binary b, int n)
{
        // return nth byte numbered from 0.  If out of bounds,
        // return −1.
}
function boolean binaryChangeByte(binary& b, int n, char c)
{
        // Change byte #n in binary b to c.   If out of bounds,
        // do nothing to b and return false.
}
function binary binaryRight(binary b, int n)
{
        // return a binary which is the rightmost n bytes of b.
If there
        // are not n bytes in b, you get all of b (not padded
to n).
}
function binary binaryLeft(binary b, int n)
{
        // same like binaryRight except from left.
}
function binary binaryMid(binary b, int nStart, int nLength)
{
        // nStart is 0-based... return binary which is the
nLength bytes starting
        // at nStart. If there are not nLength bytes, return
however many there are.
}
----------
```

General Global Functions:

```
--------------
function string getLocalHostIP( )
{
        // return string "xxx.xxx.xxx.xxx" representing the IP
of the machine
        // on which the FASL script is running.
}
function string getTargetHostIP( )
{
        // This is in here for compatibility reasons... you can
get the same
        // effect by doing:
                intToIPString(FASL.getIPAddress( ));
}
function int getTargetPort( )
{
        return FASL.m_nDefaultPort;
}
function boolean RPCCheck(int nRPCProgNum)
{
        // Attempt to make an RPC call on the given nRPCProgNum
to see if it exists
        // on the target machine. Return true if it does.
}
function boolean SMBCheck(string szUserName, string
szPassWord, string szShare)
{
        // Attempt to do a "net use" sort of thing on the given
share... i.e. "IPC$",
        // "\\HOSTNAME\C$", "\\xxx.xxx.xxx.xxx\C$", etc. If it
succeeds then
        // promptly delete the share and return true, otherwise
return false.
}
--------------
```

This implementation of the FASL scripting language permits one to perform active assessment of potential vulnerabilities on a known target computer with known open ports. For example, a FASL script to test a unicode vulnerability has the form:

```
----------
structure UnicodeVulnerability extends Vulnerability
{
    string     m_szUnicodeString;
};
function faslmain( )
{
    UnicodeVulnerability    uv;
    uv.m_szUnicodeString = "The unicode string";
    uv.addToExploitableData(1,    FASL.m_nIPAddress,    "the
string for reporting purposes");
    debugMessage("vulnfind executed.");
}
structure UnicodeVulnerability extends Vulnerability
{
    string     m_szUnicodeString;
};
function faslmain( )
{
    UnicodeVulnerability    uv;
    if (uv.getExploitableData(0))
    {
        debugMessage("getExploitableData( )...
m_nFaultlineID   =   "   +   intToString(uv.m_nFaultlineID)   +   ",
m_nIPAddress   =   "   +   intToIPString(uv.m_nIPAddress)   +   ",
m_szDescription   =   "   +   uv.m_szDescription   +   ",
m_szUnicodeString   =   "   +   uv.m_szUnicodeString);
    }
    else
    {
        debugMessage("getExploitableData( ) failed.");
    }
}
----------------
```

Notably, information collected from a successful vulnerability test, in one embodiment, is used to advantageously further test the vulnerability of the target network and individual target computers. In particular, in the event of a successful vulnerability test, additional ports or levels of account access are typically available on the target computer. Thus, even if other prior vulnerability tests failed, they are advantageously retried after a successful vulnerability test.

Figure 8:
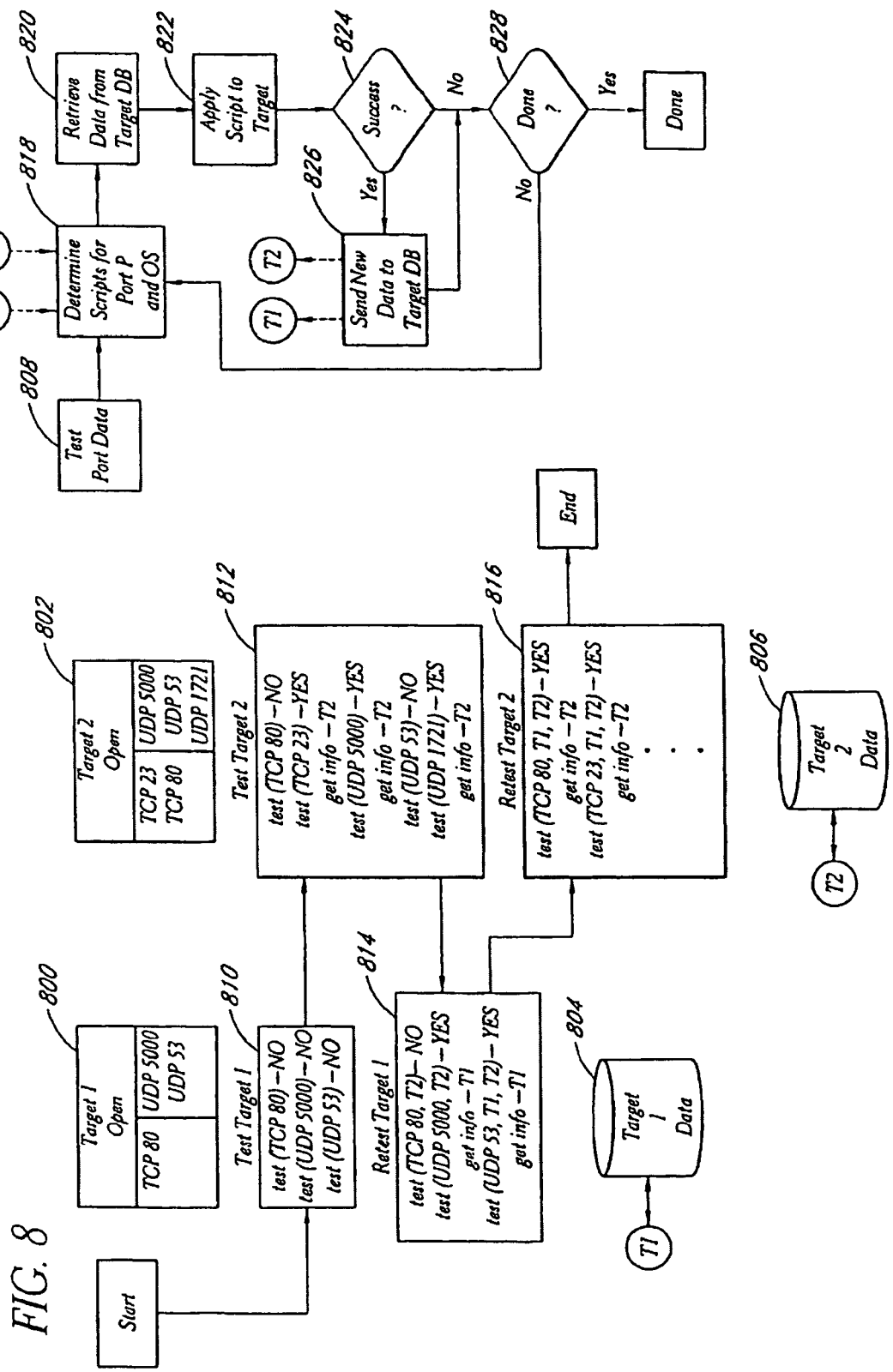
FIG. 8 illustrates one embodiment of active assessment of a vulnerability of a target computer on a target network.

FIG. 8 illustrates one embodiment of active assessment of a vulnerability of a target computer on a target network. For simplicity, the network is shown as having a target 1 computer 800 and a target 2 computer 802. For simplicity, a single vulnerability is assumed to apply to all TCP and UDP ports of the two computers. A single vulnerability "TEST" is tested on various TCP and UDP ports on both target computers. Prior host discovery and port discovery have provided target 1 data 804 and target 2 data 806 that includes an identification of open ports found on each target computer. Specifically, in the example illustrated in FIG. 8, TCP port 80 and UDP ports 5000 and 53 were found open on the target 1 computer 800, and TCP ports 23 and 80 and UDP ports 500, 53, and 1721 were found open on the target 2 computer 802. The active assessment process starts in a step 806 and begins by executing a TEST routine 808 that applies the TEST vulnerability to each port on the target 1 computer 800. In the example of FIG. 8, in a first round 810 of testing the target 1 computer 800, the testing of ports 80, 5000 and 53 result in no successful applications of the vulnerability. The system then moves in to a first round 812 of testing the target 2 computer, where testing of ports 80 and 53 are unsuccessful, but testing of ports 23, 5000 and 1721 are successful. Upon successful testing, an attempt is made to strip useful information from the target computer, and any information retrieved is stored in the target 2 data 806. Based on the new information retrieved, a second round 814 of testing the target 1 computer is attempted. In this attempt, testing of port 80 is still unsuccessful, but testing of ports 5000 and 53 is now successful with the inclusion of the additional information gathered from the target 2 data 806. In this manner, a second round 816 of testing the target 2 computer is attempted. The rounds of testing are repeated until vulnerability assessments can be actively completed for the entire target network.

Known vulnerabilities are typically stored in a database for inclusion in vulnerability assessment testing, active assessment and reporting. In one embodiment, the "Vulns" table called "static data," which only changes when deploying new patches incorporating new vulnerabilities. This would happen, for example, as new vulnerabilities are discovered and existing in-the-field system installations need to be made aware of them. The present system uses, in one example, the VulnsFound table below to indicate which vulnerabilities it has found on a particular scan. VulnsFound is simply an index into the Vulns table which keeps us from otherwise repeating the same data a multitude of times and wasting space.

```
-----
TABLE: Vulns
    COLUMN: BID, TYPE: varchar(10)
    COLUMN: CVE, TYPE: varchar(20)
        //"Common Vulnerabilities and Exposures" number.
    COLUMN: CyberID, TYPE: int(10)
    COLUMN: Description, TYPE: text(2147483647)
    COLUMN: ExploitDataType, TYPE: varchar(64)
        //Name of the FASL type, where applicable, that
        contains extra data for this vulnerability.
    COLUMN: ExploitDate, TYPE: smalldatetime(16)
    COLUMN: ExploitLink, TYPE: varchar(255)
        //Site where you can download the exploit/patch.
    COLUMN: FaultlineID, TYPE: int(10)
        //Primary key field... linked to VulnsFound table.
    COLUMN: Impact, TYPE: tinyint(3)
```

-continued

```
    COLUMN: ISSID, TYPE: int(10)
    COLUMN: LHF, TYPE: bit(1)
        //short term intrusion opportunity... true or
        false.
    COLUMN: Name, TYPE: varchar(128)
    COLUMN: NID, TYPE: int(10)
    COLUMN: Observation, TYPE: text(2147483647)
    COLUMN: Person, TYPE: varchar(50)
    COLUMN: Popularity, TYPE: tinyint(3)
    COLUMN: Recommendation, TYPE: text(2147483647)
    COLUMN: Risk, TYPE: tinyint(3)
    COLUMN: RiskText, TYPE: text(2147483647)
    COLUMN: Simplicity, TYPE: tinyint(3)
    COLUMN: Type, TYPE: varchar(50)
        //web, router, unix, trojan, etc.
TABLE: VulnsFound
    COLUMN: ConfigurationID, TYPE: int(10)
    COLUMN: CustomerID, TYPE: int(10)
    COLUMN: FaultlineID, TYPE: int(10)
    COLUMN: HostID, TYPE: int(10)
    COLUMN: JobID, TYPE: int(10)
    COLUMN: VulnFoundID, TYPE: int identity(10)
-------
```

VII. Quantitative Scoring of Target Network Vulnerability

Network vulnerabilities have traditionally been rated on a "low risk," "medium risk," and "high risk" scale. This subjective scale is based on the level of access to a target system granted by a vulnerability, the ease of detecting and exploiting the vulnerability, the public knowledge of a vulnerability, the percentage of computers subject to the vulnerability, and the like. However, this subjective scale lacks objective indicia allowing comparison of otherwise heterogeneous networks for the purpose of comparing relative security. Further, this subjective three-level scale provides little information about security improvement or added risks over time.

In one embodiment, the present system provides objective, quantitative indicia of the overall security of the target network. Advantageously, this quantitative indicia can be any quantitative scale of sufficient granularity to provide meaningful distinctions due to changes in network vulnerabilities over time, with a range of between 1-10, 1-100, and the like. Further, this objective indicia applies a standard formula to the various vulnerabilities discovered on the target network and network configuration, such that a valid comparison can be made between the security of otherwise heterogeneous network configurations, operating systems, and computers.

For example, the objective indicia is a risk measurement algorithm, such as a FoundScore F. In one embodiment illustrated by the flowchart in FIG. 9, the FoundScore F is defined as:

$$F=100-V-E \quad \text{(Eq. 1)}$$

where,
F=FoundScore
V=Vulnerability Loss
E=Exposure Loss.

More specifically, in one preferred embodiment, the vulnerability loss V is defined as the sum of values assigned to each vulnerability found on the target network. For each of the n vulnerabilities found on the target network, that vulnerability is assigned a weight.

Thus, for a particular vulnerability $V_x$, where $1 \leq x \leq n$, the vulnerability weight $V_{w,x}$ is defined as:

$$V_{w,x} = \begin{cases} \{50 \mid PEA(V_x) \geq 2\} \\ \{10 \mid 2 > PEA(V_x) \geq 1\} \\ \{5 \mid 1 > PEA(V_x)\} \end{cases} \quad \text{(Eq. 2)}$$

where:

$$PEA(V_x) = \text{floor}\left(\frac{\{P(V_x) + E(V_x) + A(V_x)\}}{3}\right) \quad \text{(Eq. 3)}$$

and:
- floor(x) is the standard floor function,
- $P(V_x)$ is the popularity of the vulnerability on a 1-3 scale,
- $E(V_x)$ is the ease of exploitation of the vulnerability on a 1-3 scale,
- $A(V_x)$ is the level of access/privileges granted by the vulnerability on a 1-3 scale,
- where the higher the score on the scale the greater the risk.

Alternatively, the vulnerability can be simply defined as the risk level associated with the vulnerability, such as where:

$$PEA(V_x) = R(V_x) \quad \text{(Eq. 3a)}$$

where,
$R(V_x)$ is the risk associated with the vulnerability on a 1-3 scale.

Typically, the factors used to determine the PEA(V) for a particular vulnerability are provided from the vulnerability database discussed previously. In other embodiments, the vulnerability base function (e.g., PEA(V)) can be defined from a number of different variables, including, for example, ease of distribution of a vulnerability, ease of preventing the vulnerability, and the like. Thus, the total vulnerability score V is, in one embodiment, equal to:

$$V = \min(50, \Sigma_{x=1 \rightarrow n}\{V_{w,x}\}) \quad \text{(Eq. 4)}$$

where:
- n = number of vulnerabilities found on the target network,
- Σ = the summation symbol,
- $V_{w,x}$ = the vulnerability weight defined above, and,
- min (x,y) = the standard minimum function.

The total exposure score E is, in one embodiment, defined as:

$$E = \min(50, \Sigma_{y=1 \rightarrow q}\{10 \times U_y + 5 \times I_y + N_y + 2 \times M_y\}) \quad \text{(Eq. 5)}$$

where:
- q = the number of live target computers found on the target network,
- $U_y$ = the open UDP ports found on the yth target computer, except DNS,
- $I_y$ = the open ICMP ports found on the yth target computer,
- $N_y$ = the non-essential services found on the yth target computer,
- $M_y$ = a penalty for target computers with no essential services,
- Σ = the summation symbol, and,
- min (x,y) is the standard minimum function.

In particular, the number of live target computers q is typically deduced from the host discovery process described above. The number of open UDP ports $U_y$ found on the yth target computer is typically deduced from the service discovery and active assessment process described above. The number of non-essential services $N_y$ found on the yth target computer is typically deduced from the service discovery of TCP and UDP ports, and in one preferred embodiment, counts all open ports found on each target computer, except for certain predetermined services. Table 11 lists examples of predetermined services that are not included in the count of nonessential services $N_y$ in accordance with one embodiment of the present invention.

TABLE 11

Example Essential Services not Included in $N_y$ count

| Essential Service | Ports |
|---|---|
| HTTP | 80, 8000, 8080 |
| SSL/HTTPS | 443 |
| FTP | 21 |
| DNS | 53 |
| SMTP | 25 |

Other combinations of essential services are also possible, based on changes in operating system, protocols, and the like. Finally, the no essential services penalty flag $M_y$ is set to 1 for each target computer that has $N_y > 0$, and has no essential services running such as those shown in Table 7. Otherwise, $M_y$ is set to 0.

As a result, the FoundScore F=100−V−E provides a quantitative score between 0 and 100 representing an objective indicia of the relative security of the target network. Generally, the higher the Foundscore (i.e., the higher F is), the greater the relative security of the target network. Other embodiments are possible, such as, for example, where:

$$E_{alt} = [\Sigma_{y=1 \rightarrow q}\{(5 \times U_y + 2 \times I_y + 2 \times N_y + 2 \times M_y)^2\}]^{1/2}/q \quad \text{(Eq. 7)}$$

$$V_{alt} = [\Sigma_{x=1 \rightarrow n}\{(V_{w,x})^2\}]^{1/2}/n \quad \text{(Eq. 8)}$$

$$F_{alt} = E_{alt} + V_{alt} \quad \text{(Eq. 9)}$$

In this alternative scoring regiment, the higher the $F_{alt}$ score the worse the target network security.

Figure 9:
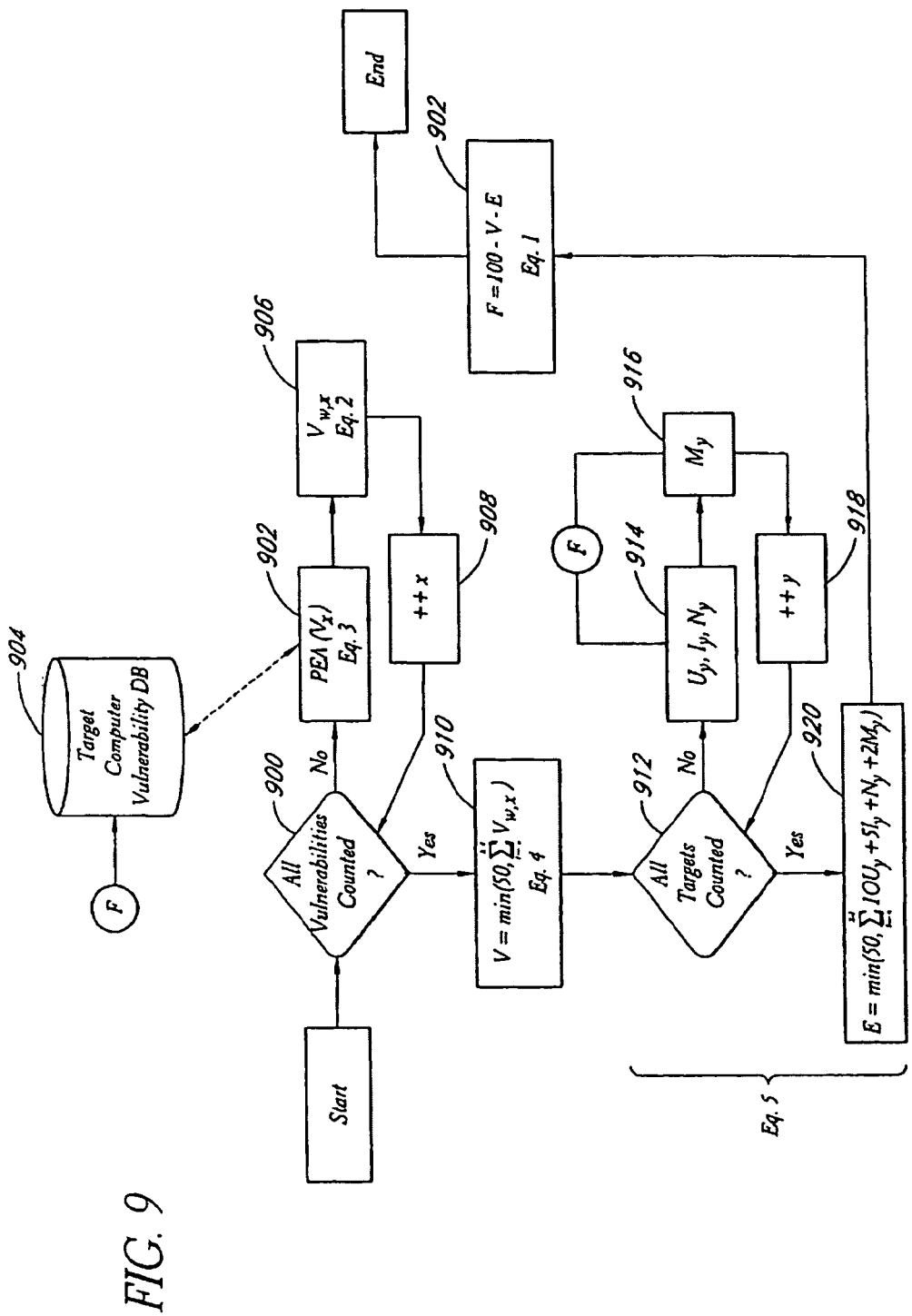
FIG. 9 illustrates one embodiment of a methodology for determining the security score for a target network.

FIG. 9 illustrates one embodiment of a methodology for determining the security score for a target network. In a first decision step 900, the method determines whether all vulnerabilities found in the target network have been counted. If not, the method calculates $PEA(V_x)$ (Eq. 3) above, or a variation thereof, in a step 902 for vulnerability number x based on predetermined values stored in a vulnerability database 904. The value of $PEA(V_x)$ is used to calculate the weighted vulnerability $V_{w,x}$ (Eq. 2) for a vulnerability x in a step 906. Typically, the vulnerability counter is then incremented in a step 908 if necessary for a particular embodiment. Thereafter, the method returns to the decision step 900 and again determines if all the vulnerabilities have been counted.

After all the vulnerabilities have been counted, then in preferred embodiments, the total vulnerability V is calculated in a step 910. As discussed above, the total vulnerability V is the lesser of either 50 or the sum of all weighted vulnerability scores $V_{w,x}$ in this embodiment. Alternatively, other scores are possible, or the tabulation of the total score V can be combined with the prior loop.

Then, in a decision step 912, the method determines whether all target computers found in the target network have been counted. If not, the exposure values are determined in a step 914. In preferred embodiments, the exposure values include $U_y$ (the open UDP ports found on the yth target computer, except DNS on port 53), $I_y$ (the open ICMP ports found on the yth target computer), and $N_y$ (the non-essential services found on the yth target computer), are determined. The exposure values are determined dynamically based on the network security test, and are, in one embodiment, stored in the target computer vulnerability database 904 or in another database. In a step 916, a penalty $M_y$ is determined for target computers with no essential services present. Preferably, the exposure counter is then incremented in a step 918, and the method returns to the decision step 912 to determine whether all the target computers have been counted.

When all the target computers are counted, the total exposure E is calculated in a step 920 as the lesser of either 50 or the sum of a weighted sum of the exposure values found. Then, in preferred embodiments, the score F is calculated in a step 992 as 100 minus the total vulnerability and exposure scores to generate a representation of a network security score. In preferred embodiments, a greater value of F implies greater network security on an objective scale.

Other exemplary embodiments apply various permutations of the factors associated with vulnerability scoring and exposure scoring, and are similarly foreseen as within the disclosure herein.

VIII. Graphical Hierarchical Reporting of Target Network Topology and Vulnerabilities Generally, a conventional network security system provides reporting information in a text dump format. The collected data records regarding network topology, target computers, vulnerabilities, and the like are dumped into an ASCII file that requires substantial effort to interpret. Such data dumps are used conventionally because, other than alerting the network security user to the presence of high danger vulnerabilities, existing systems do not provide an interactive, hierarchical, and graphical representation of the data representing the network, target computers, and vulnerabilities found to assist the user in identifying and correcting the specific vulnerabilities.

The present system compiles the data discovered during security testing into a graphical, informationally hierarchical, and interactive set of documents for review at various levels of detail and documentation. Thus, in one embodiment of the present invention, the reports engine produces (1) a dynamic graphical display representing the network topology, the target computers found, and the vulnerabilities found throughout the target network; (2) a comprehensive list of target computers, vulnerabilities found, and vulnerability explanations; (3) an objective scoring report describing the approximate security rating of the target network; (4) an exposure report describing the ports, services, and (5) detailed information that sets forth testing results on a per-machine, per-port, or per-vulnerability basis. Certain individuals within an organization may want different levels of detail. For example, upper management may only want the objective scoring report (3) that describes the approximate security rating of the target network. In contrast, the network administrator wants to receive all reports, particularly, the detailed information report (5) that enables the administrator to identify the machines and ports on the machines that need to be corrected.

For example, a functional representation of a report generated by the report engine typically includes a quantitative score representation including (1) the actual score, (2) a color representation of the score exposure, and (3) a graphical representation of the quantitative score. The actual score is the F score or an alternative embodiment, such as, for example, a 1 to 100 numerical rating as described previously. The color representation represents the overall vulnerability range of the score. Thus, in one embodiment, a score between 1 and 33 will have a red color signifying high vulnerability, a score between 34 and 66 will have a yellow color signifying medium vulnerability, and a score above 66 will have a green color signifying low vulnerability. Other colors, ranges, and representations, such as, for example, using icons or pictures to represent the vulnerability level, are foreseen.

Figure 10:
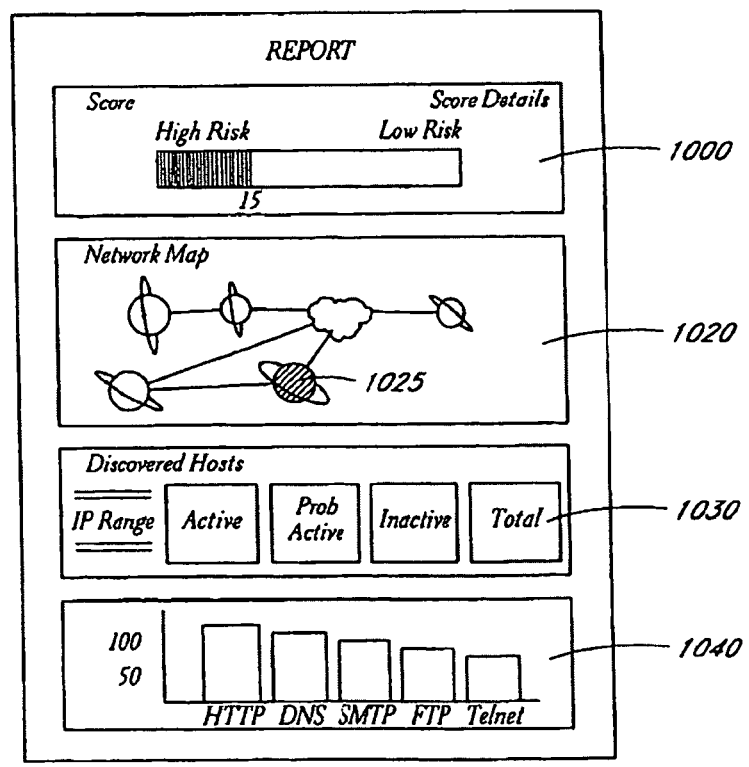
FIG. 10 illustrates one embodiment of a hierarchical security report, including a graphical representation of network topology and network vulnerabilities.

FIG. 10, for example, illustrates an embodiment of a hierarchical security report 1000 presented on a display for viewing by a user. The hierarchical security report includes a representation 1010 of the Foundstone score, showing a value of 15 corresponding to a relatively high risk. The security report further includes a graphical representation 1020 of the mapped network topology, including the live target computers and the services located on the target computers. The security report further includes a list 1030 of discovered hosts, and a list 1040 of discovered services.

Figure 11:
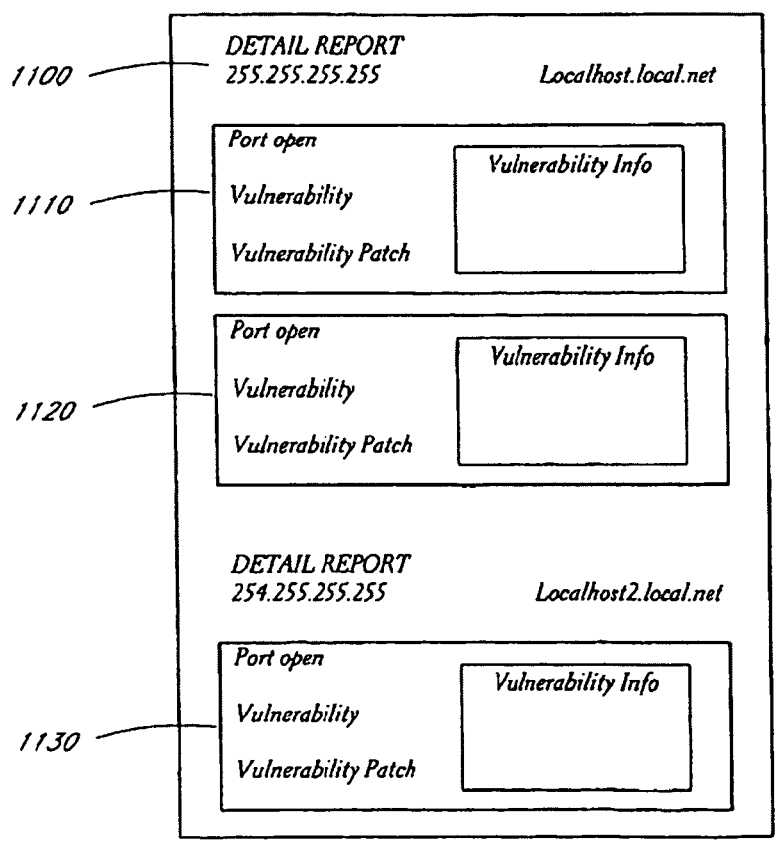
FIG. 11 illustrates a second embodiment of a hierarchical security report in greater detail.

The user may select any of the reports shown in FIG. 10 (or other reports that are not shown) and request additional details. FIG. 11, for example, illustrates an embodiment of a hierarchical security report 1100 that provides greater detail regarding the vulnerabilities of two target computers. For example, an upper portion of the display identifies a first target computer ("localhost.local.net" at IP address 255.255.255.255) having a first open port represented by a window 1110 and a second open port represented by a window 1120. Each of the open ports of the first target computer has a respective vulnerability and may identify a vulnerability patch to install on the target computer to reduce the vulnerability. As a further example, a lower portion of the security report 1100 identifies a second target computer ("localhost2local.net" at IP address 254.255.255.255) having a single open port represented by a window 1130. The information in the window 1130 indicates that the service on the port is out of date, suggesting that it should be removed, and advantageously identifies a vulnerability patch to install if the service is to be retained.

There is an "object layer" implemented in C++ which represents the hierarchy of data objects that the system deals with, as described above with respect to the FASL scripting language. All objects follow the model of 1) containing the data directly relevant to that object as data members (these are 1-1 correspondent with a row in the database) and 2) possibly containing lists of other objects that also follow this convention. Each object has a Load( ) and Save( ) member that deals with the data for which that object is directly responsible by loading or saving it from the database. For the "child" object lists, the UpdateToDatabase( ) and UpdateFromDatabase( ) member functions are used. These call the object's Save( ) or Load( ) members respectively. They then recursively call the child lists' UpdateToDatabase( ) or UpdateFromDatabase( ) members. In this way, objects and their children can be selectively loaded from any point in the hierarchy. This was done because the objects are generally too unwieldy to deal with all at once.

Once the data is loaded, an object which represents a single scan has a GenerateReport member function which programmatically generates all the html, gif, jpg, and png files that constitute the report. The html files are generated by loading a "template" html file that contains boilerplate source and key words and replacing the key words with the html source representing the report data. The gifs and jpgs are simply background graphics that do not change from report to report so they are written as is without the report mechanism having to know the details of gif and jpg encoding. For images that do need to be dynamically calculated, the png graphics format is used. This is a public (non-licensed) format for which there exists a public library which we are linking into the system executable. The images are drawn onto a Windows HDC (windows software object that represents a display device) and then converted into png by a custom class which wraps the object in the proper format.

An exemplary Scan Summary Report is illustrated in FIGS. 13A-13E. A corresponding exemplary FoundScore Report is illustrated in FIGS. 14A-14B. A corresponding Network Topology Report is illustrated in FIGS. 15A-15F.

Figure 12B:
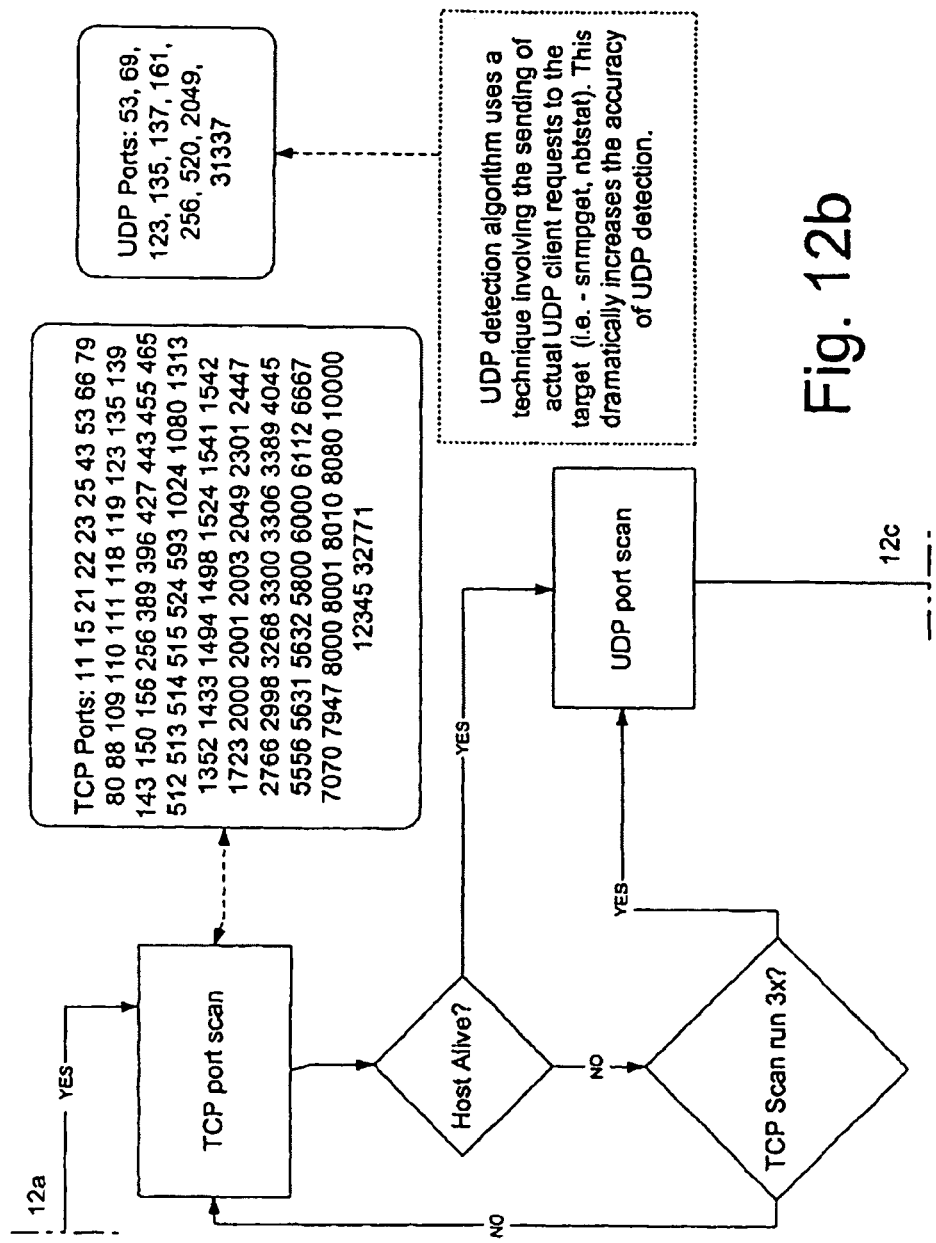
FIG. 12 illustrates a second embodiment of the comprehensive testing method.
Figure 12C:
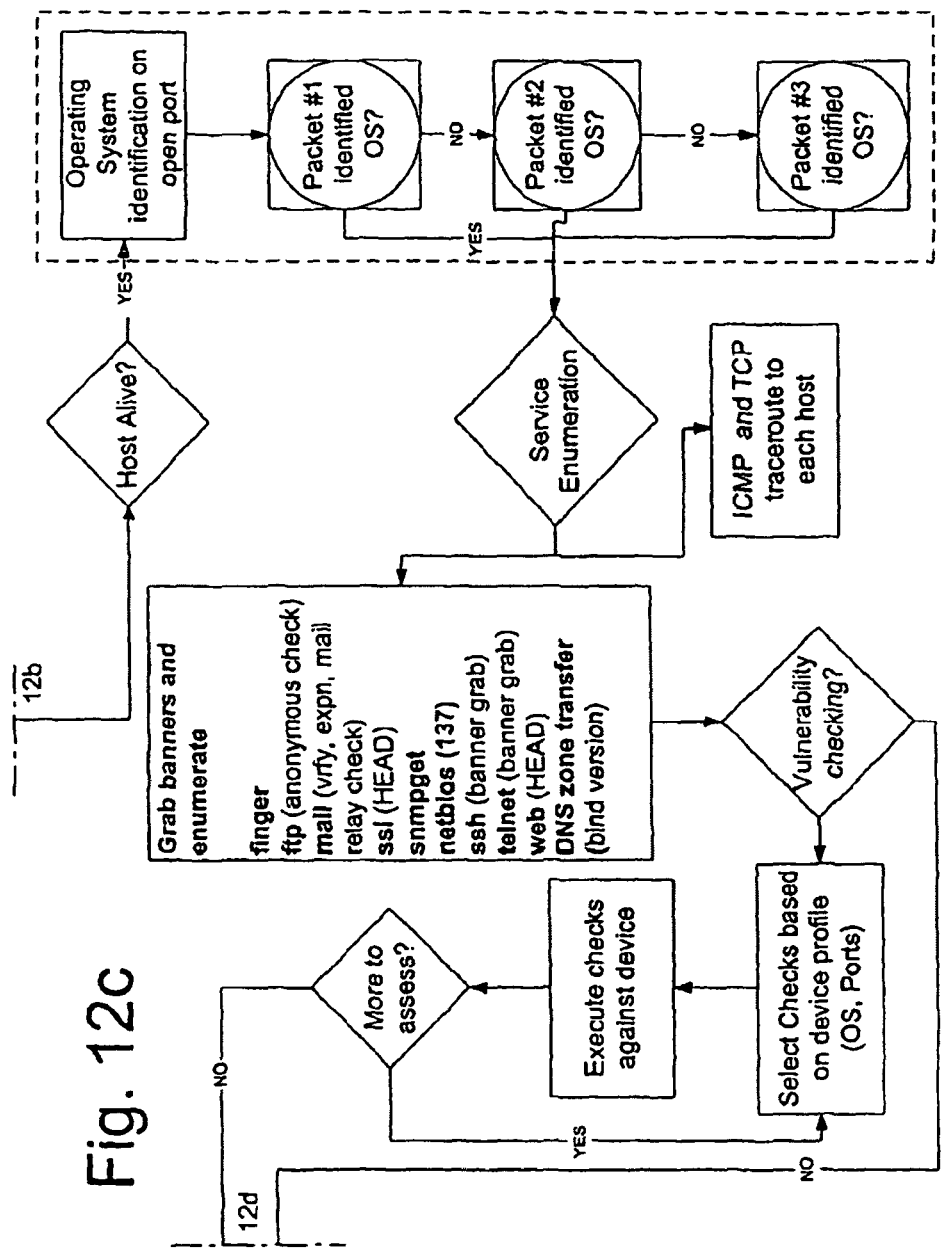
Figure 13B:
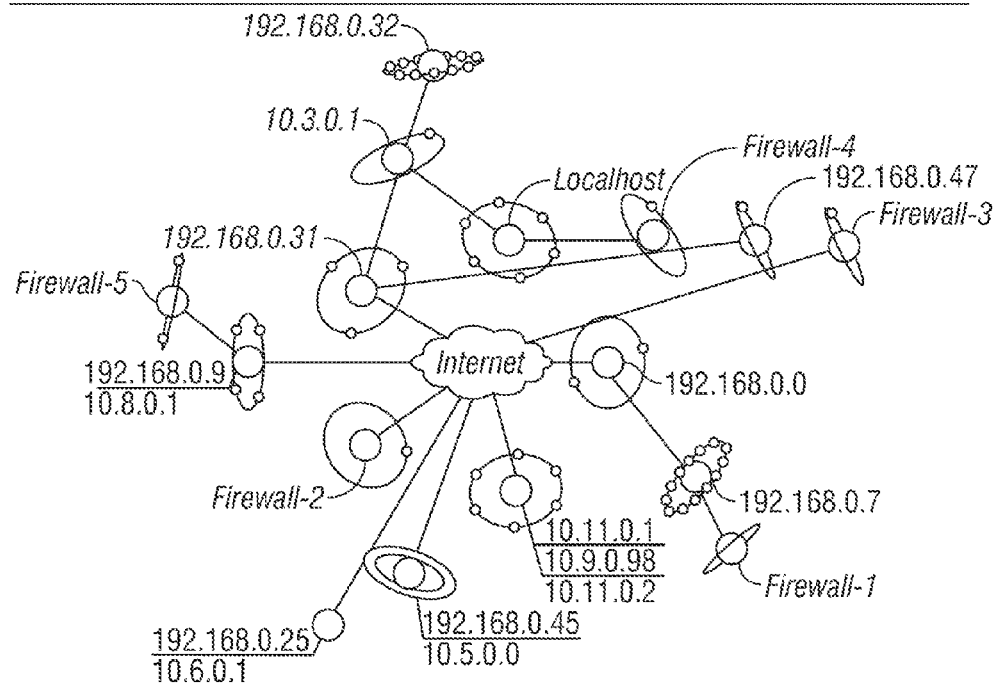
Figure 13C:
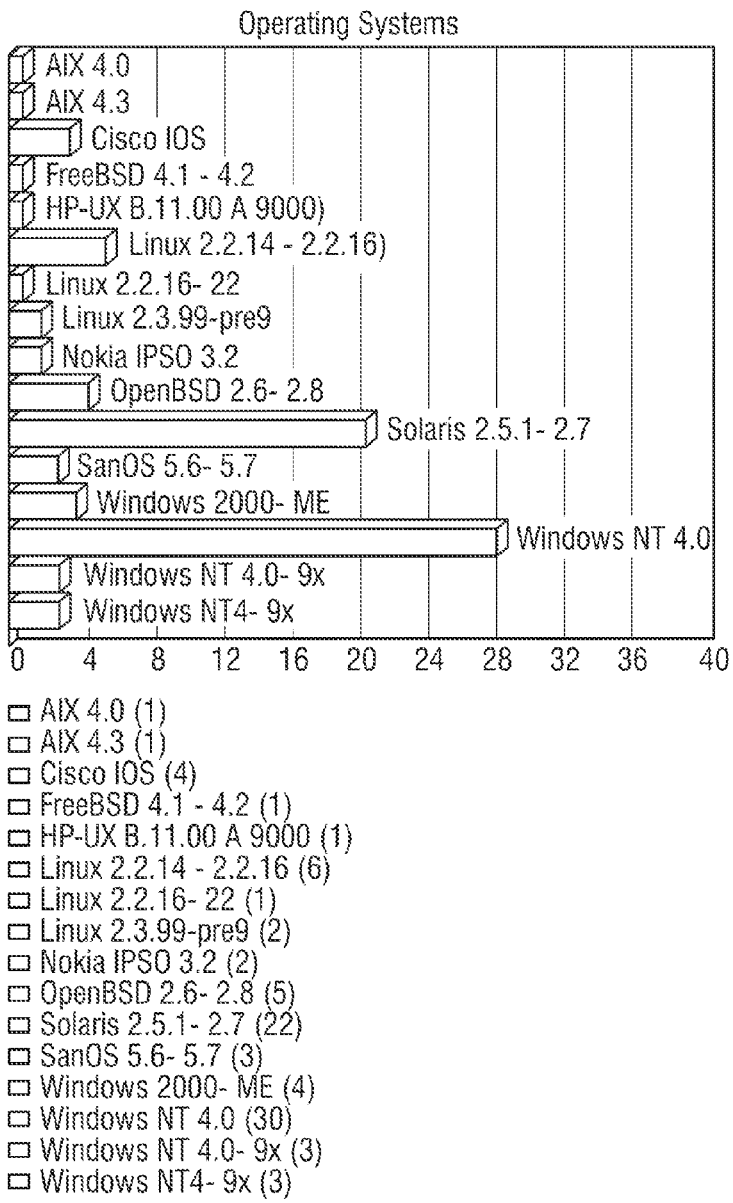
Figure 13D:
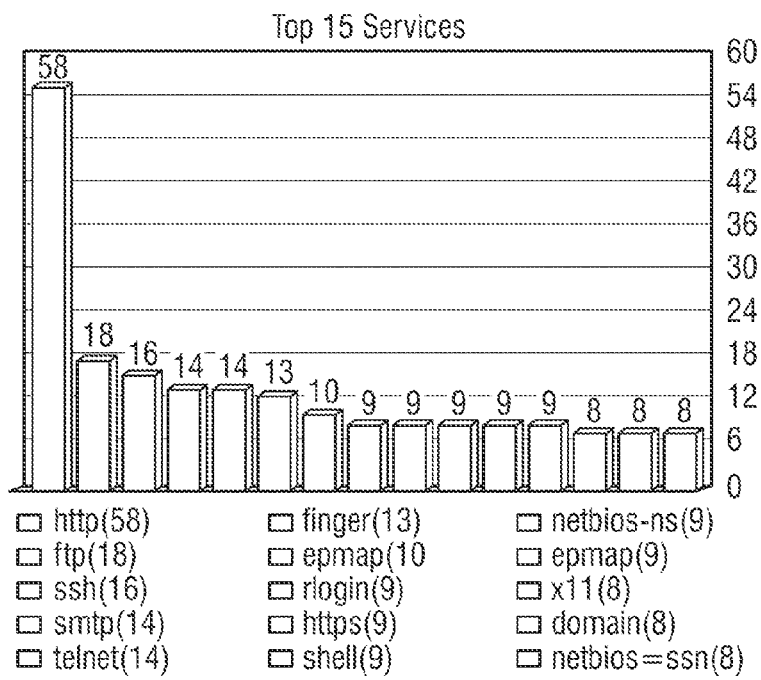
Figure 13D:
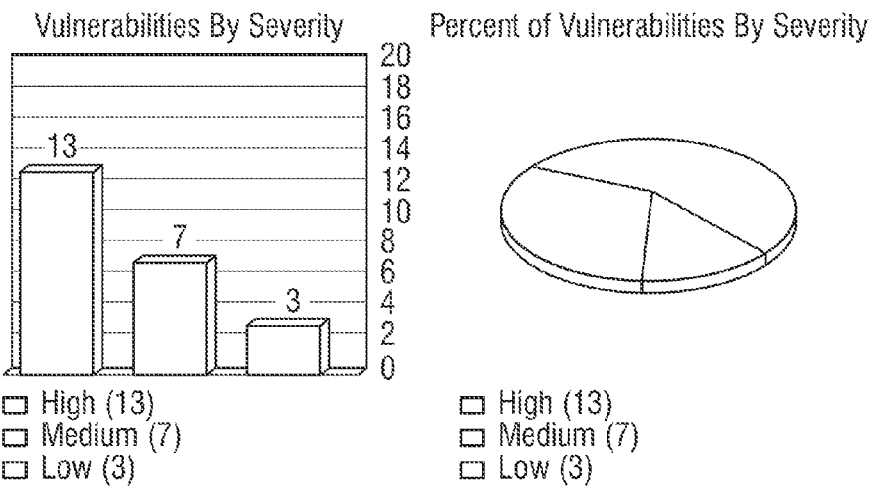
Figures 13E, 14A:
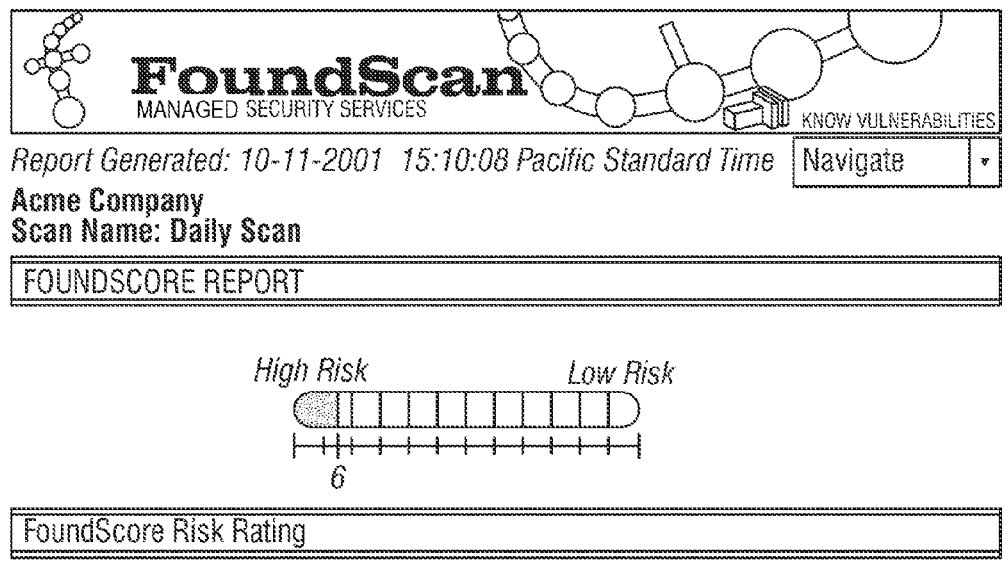
Figure 15C:
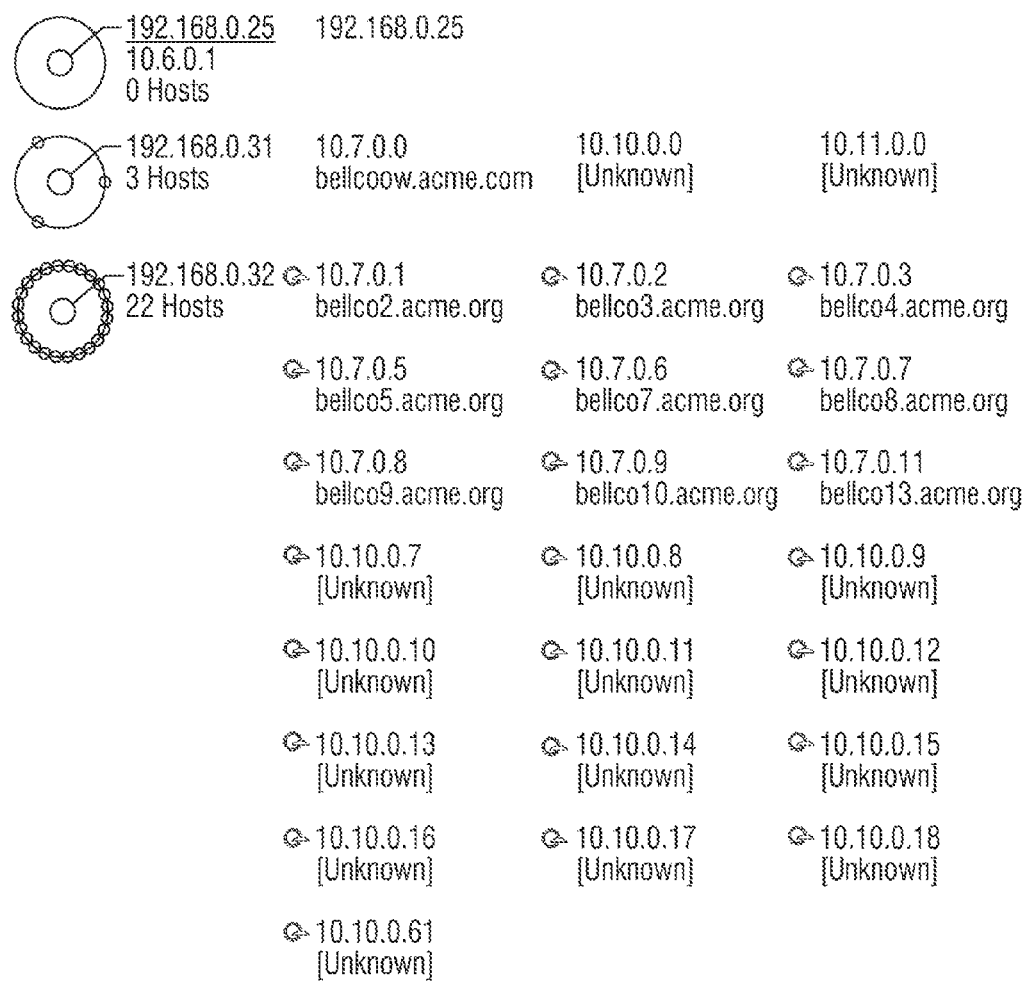
Figure 15D:
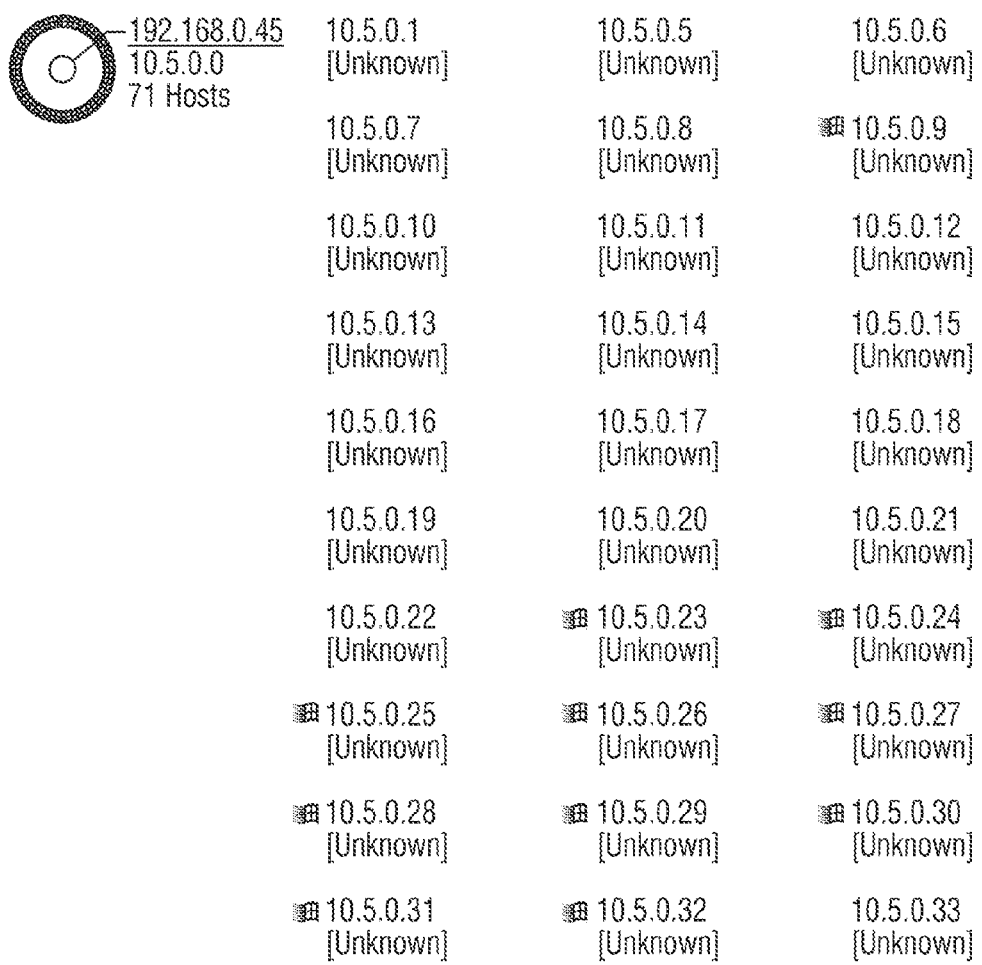
Figure 15F:
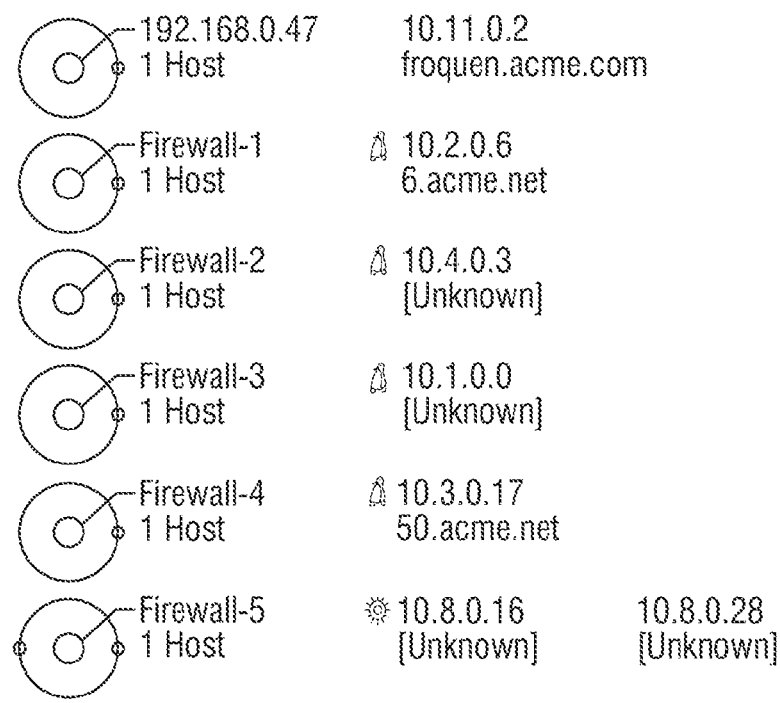

Although the above description of the present invention includes at least one embodiment of the system, it should be understood that various changes, substitutions and alterations can be made to the system without departing from the spirit and scope of the invention as defined by the claims herein. For example, one alternative embodiment of the methodology described above is exemplified in FIG. 12.

The invention claimed is:

1. A method comprising:
sending a set of TCP packets to one or more computer devices in a plurality of computer devices on a network;
sending a set of UDP packets to one or more computer devices in the plurality of computer devices;
identifying responsive computer devices among the plurality of computer devices based at least in part on responses received to the sent sets of TCP packets and UDP packets;
identifying vulnerabilities of the responsive computer devices; and
determining a security score for the plurality of computer devices based at least in part on the identified vulnerabilities, wherein the security score is to indicate a relative security of the plurality of computer devices and is dependent on a vulnerability exposure level determined for the plurality of computer devices based at least in part on information included in the responses.

2. The method of claim 1, further comprising sending a set of ICMP packets to one or more computer devices in the plurality of computer devices, wherein responsive computer devices are identified based at least in part on responses received to the sent set of ICMP packets.

3. The method of claim 2, wherein:
the set of ICMP packets are sent to each computer device in the plurality of computer devices and a first set of responsive computer devices is identified in the plurality of computer devices responsive to the ICMP packets;
the set of TCP packets are sent to at least the computer devices in the plurality of computer devices not included in the first set of responsive computer devices and a second set of responsive computer devices is identified responsive to the TCP packets;
the set of UDP packets are sent to at least the computer devices in the plurality of computer devices not included in at least one of the first and second sets of responsive computer devices and a third set of responsive computer devices is identified in the plurality of computer devices responsive to the UDP packets.

4. The method of claim 1, further comprising determining a device-specific security score for each of the responsive computer devices.

5. The method of claim 1, wherein the security score is a score for the network of computer devices.

6. The method of claim 1, wherein the security score is further dependent on vulnerability risk levels of the identified vulnerabilities.

7. The method of claim 6, wherein the security score is derived from a formula of form $F=a-V-E$, wherein F is the security score, a is a constant, V is an indicia of the vulnerability risk levels, and E is an indicia of the vulnerability exposure level.

8. The method of claim 7, wherein the indicia V is dependent on a weighted sum of vulnerability risk levels of the identified vulnerabilities.

9. The method of claim 8, wherein the indicia V is derived from a formula of form $V=\min(f, \Sigma_{(x-1-n)}(V_{w,x}))$, where min( . . . , . . . ) is the typical standard minimum function, $\Sigma$ is a summation symbol, $V_{w,x}$ is a vulnerability weight value of a computer device x, n is the number of computer devices in the plurality, and f is a maximum vulnerability loss value.

10. The method of claim 9, wherein the vulnerability weight value $V_{w,x}$ of a vulnerability is dependent at least on the vulnerability risk level of the vulnerability.

11. The method of claim 1, further comprising identifying attributes of the responsive computer devices from the information.

12. The method of claim 11, wherein each identified attribute is at least one of an operating system of the computer device, active ports of the computer device, and a service of the computer device.

13. The method of claim 11, wherein identifying vulnerabilities of the responsive computer devices includes scanning each responsive computer devices for vulnerabilities included in a respective set of vulnerabilities relevant to the identified attributes of the respective responsive computer device.

14. The method of claim 1, further comprising:
stripping information from responses received to the sent sets of TCP packets and UDP packets; and
storing the stripped information in association with the corresponding responsive computer device.

15. The method of claim 14, wherein the stored stripped information is used in the identifying of vulnerabilities on the associated corresponding computer device.

16. The method of claim 1, wherein TCP packets in the sets of TCP packets include TCP SYN packets.

17. The method of claim 1, wherein UDP packets in the sets of UDP packets are sent to particular ports of the one or more responsive computer devices and are adapted to solicit a response from a particular service identified as potentially using the corresponding particular port.

18. At least one non-transitory, machine-accessible storage medium having instructions stored thereon, the instructions when executed on a machine, cause the machine to:
send a set of TCP packets to one or more computer devices in a plurality of computer devices on a network;
send a set of UDP packets to one or more computer devices in the plurality of computer devices;
identify responsive computer devices among the plurality of computer devices based at least in part on responses received to the sent sets of TCP packets and UDP packets;
identify vulnerabilities of the responsive computer devices; and
determining a security score for the plurality of computer devices based at least in part on the identified vulnerabilities, wherein the security score is to indicate a relative security of the plurality of computer devices and is dependent on a vulnerability exposure level determined for the plurality of computer devices based at least in part on information included in the responses.

19. A system comprising:
at least one processor device;
at least one memory element; and
a network security engine, adapted when executed by the at least one processor device to:
send a set of TCP packets to one or more computer devices in a plurality of computer devices on a network;
send a set of UDP packets to one or more computer devices in the plurality of computer devices;

identify responsive computer devices among the plurality of computer devices based at least in part on responses received to the sent sets of TCP packets and UDP packets;

identify vulnerabilities of the responsive computer devices; and determine a security score for the plurality of computer devices based at least in part on the identified vulnerabilities, wherein the security score is to indicate a relative security of the plurality of computer devices and is dependent on a vulnerability exposure level determined for the plurality of computer devices based at least in part on information included in the responses.

* * * * *

UNITED STATES PATENT AND TRADEMARK OFFICE
CERTIFICATE OF CORRECTION

| | | |
|---|---|---|
| PATENT NO. | : 8,615,582 B2 | |
| APPLICATION NO. | : 13/397514 | |
| DATED | : December 24, 2013 | |
| INVENTOR(S) | : Stuart C. McClure et al. | |

It is certified that error appears in the above-identified patent and that said Letters Patent is hereby corrected as shown below:

On the title page, item (60), in column 1, under "Related U.S. Application Data", line 5, delete "10/050,575," and insert -- 10/050,675, --, therefor.

Signed and Sealed this
Sixth Day of May, 2014

Michelle K. Lee
*Deputy Director of the United States Patent and Trademark Office*